(12) United States Patent
Vinciarelli

(10) Patent No.: US 6,930,893 B2
(45) Date of Patent: Aug. 16, 2005

(54) FACTORIZED POWER ARCHITECTURE WITH POINT OF LOAD SINE AMPLITUDE CONVERTERS

(75) Inventor: Patrizio Vinciarelli, Boston, MA (US)

(73) Assignee: VLT, Inc., Sunnyvale, CA (US)

(*) Notice: Subject to any disclaimer, the term of this patent is extended or adjusted under 35 U.S.C. 154(b) by 0 days.

(21) Appl. No.: 10/264,327

(22) Filed: Oct. 1, 2002

(65) Prior Publication Data

US 2003/0142513 A1 Jul. 31, 2003

Related U.S. Application Data

(63) Continuation-in-part of application No. 10/066,418, filed on Jan. 31, 2002, now abandoned.

(51) Int. Cl.⁷ .............................................. H02M 3/335
(52) U.S. Cl. .............................. 363/17; 363/26; 363/97; 363/98
(58) Field of Search .............................. 363/17, 24, 25, 363/26, 97, 98; 323/266

(56) References Cited

U.S. PATENT DOCUMENTS

| | | | |
|---|---|---|---|
| 3,596,165 A | 7/1971 | Andrews | 363/19 |
| 4,128,868 A | * 12/1978 | Gamble | 363/26 |

(Continued)

FOREIGN PATENT DOCUMENTS

| | | | |
|---|---|---|---|
| DE | 4319800 | 6/1994 | H02M/3/28 |
| DE | 19546936 | 6/1997 | H02M/3/28 |
| DE | 19837639 | 3/2000 | H02H/7/10 |
| EP | 0550167 | 7/1993 | H02M/3/335 |
| EP | 0848485 | 6/1998 | H02M/3/335 |
| WO | WO98/11658 | 3/1998 | H02M/3/337 |

OTHER PUBLICATIONS

Alvarez–Barcia, L., et al., "Low Power Multioutput Converter with Post–Regulation based on Synchronous Rectification and Windings Integrated in the PCB", IEEE, Sep. 1998, pp. 191–197.

Casey et al., "A High–Frequency, Low Volume, Point–of–Load Power Supply for Distributed Power Systems," IEEE Transactions on Power Electronics, vol. 3, No. 1, Jan. 1988.

Chen, W., et al., "Design of High Efficiency, Low Profile, Low voltage Converter with Integrated Magnetics", IEEE, Feb. 1997, pp. 911–917.

(Continued)

Primary Examiner—Jeffrey Sterrett
(74) Attorney, Agent, or Firm—Fish & Richardson P.C.

(57) ABSTRACT

A Factorized Power Architecture ("FPA") includes a power regulator providing controlled DC bus voltages distributed and converted to load voltages, at the load, using DC voltage transformation modules ("VTMs") having fixed transformation ratios. Optional feedback from the load improves regulation. A Sine Amplitude Converter ("SAC") VTM locks the conversion frequency to resonance of a resonant circuit including a transformer, uses complementary primary switches, balanced switching, and a high conversion duty cycle, and may use primary ZVS and secondary ZVS and ZCS, low Q, and a low profile core structure, and may exhibit greater than 400 Watts/cubic-inch power density and 95% efficiency. Common-source gate-control topologies efficiently drive switches higher than 1 MHz. Symmetrical power trains reduce common-mode noise. Modulated converter output resistance controls $V_{out}$, limits $I_{out}$, or improves current sharing. Gate drive circuitry recycles energy from the transformer magnetizing inductance. A DC—DC converter includes a non-isolated converter followed by a SAC.

122 Claims, 55 Drawing Sheets

U.S. PATENT DOCUMENTS

| | | | |
|---|---|---|---|
| 4,443,840 A | | 4/1984 | Geissler et al. ............... 363/24 |
| 4,533,986 A | | 8/1985 | Jones .......................... 363/17 |
| 4,648,017 A | | 3/1987 | Nerone ........................ 363/28 |
| 4,661,897 A | * | 4/1987 | Pitel ............................ 363/71 |
| 4,841,220 A | | 6/1989 | Tabisz et al. ............... 323/282 |
| 4,853,832 A | | 8/1989 | Stuart .......................... 363/17 |
| 4,855,888 A | | 8/1989 | Henze et al. ................. 363/17 |
| 4,860,184 A | * | 8/1989 | Tabisz et al. ................. 363/17 |
| 4,931,716 A | | 6/1990 | Jovanovic et al. .......... 323/285 |
| 4,953,068 A | | 8/1990 | Henze ......................... 363/17 |
| 5,113,334 A | * | 5/1992 | Tuson et al. .................. 363/25 |
| 5,179,512 A | | 1/1993 | Fisher et al. ............... 363/127 |
| 5,235,501 A | * | 8/1993 | Stuart et al. .................. 363/17 |
| 5,274,539 A | | 12/1993 | Steigerwald et al. .......... 363/20 |
| 5,327,337 A | * | 7/1994 | Cripe ......................... 363/134 |
| 5,331,533 A | * | 7/1994 | Smith .......................... 363/20 |
| 5,434,770 A | | 7/1995 | Dreifuerst et al. ............ 363/65 |
| 5,442,540 A | * | 8/1995 | Hua et al. ..................... 363/98 |
| 5,448,467 A | | 9/1995 | Ferreira ....................... 363/17 |
| 5,450,305 A | * | 9/1995 | Boys et al. ................... 363/24 |
| 5,491,388 A | | 2/1996 | Nobuyuki et al. .......... 315/308 |
| 5,500,791 A | | 3/1996 | Kheraluwala et al. ........ 363/17 |
| 5,514,921 A | | 5/1996 | Steigerwald ................ 307/125 |
| 5,576,940 A | | 11/1996 | Steigerwald et al. .......... 363/17 |
| 5,594,635 A | | 1/1997 | Gegner ....................... 363/124 |
| 5,615,093 A | | 3/1997 | Nalbant ....................... 363/25 |
| 5,805,432 A | * | 9/1998 | Zaitsu et al. .................. 363/16 |
| 5,946,200 A | * | 8/1999 | Kim et al. ..................... 363/17 |
| 5,991,171 A | | 11/1999 | Cheng .......................... 363/21 |
| 5,999,417 A | | 12/1999 | Schlecht ....................... 363/16 |
| 6,069,811 A | | 5/2000 | Moriguchi et al. .......... 363/142 |
| 6,147,881 A | * | 11/2000 | Lau .............................. 363/17 |
| 6,147,886 A | * | 11/2000 | Wittenbreder ................ 363/95 |
| 6,222,742 B1 | | 4/2001 | Schlecht ....................... 363/16 |
| 6,310,792 B1 | | 10/2001 | Drobnik ..................... 363/147 |
| 6,330,169 B2 | | 12/2001 | Mullett et al. ................. 363/16 |
| 6,381,150 B2 | | 4/2002 | Telefus ......................... 363/15 |
| 6,583,999 B1 | * | 6/2003 | Spindler et al. .............. 363/98 |
| 6,650,556 B2 | | 11/2003 | Dinh et al. .................... 363/65 |

OTHER PUBLICATIONS

Jang, Y., et al., "New Quasi–Square Wave and Multi–Resonant Integrated Magnetic Zero Voltage Switching Converters", IEEE, Oct. 1993, pp. 721–727.

Strydom, J.T., et al., "Some Limits of Integrated LCT Modules for Resonant Converters at 1MHz", IEEE, Oct. 1999, pp. 1141–1417.

Morrison et al., "A New Modulation Strategy for a Buck–Boost Input AC/DC Converter," IEEE Transactions on Power Electronics, vol. 16, No. 1, pp. 34–45, Jan. 2001.

Tabisz et al., "Present and Future of Distributed Power Systems," APEC '92 Conference Proceedings, Mar. 1992, pp. 11–18.

Mweene et al, "A High–Efficiency 1.5 kW, 390–50V Half–Bridge Converter Operated at 100% Duty Ratio," APEC '92 Conference Proceedings, Mar. 1992, pp. 723–730.

Choi et al., "Dynamics and Control of DC–to–DC Converters Driving Other Converters Downstream," IEEE Transactions on Circuits and Systems—I: Fundamental Theory and Applications, Oct. 1999, pp. 1240–1248.

Lee et al., "Topologies and Design Considerations for Distributed Power Systems Applications," Proceedings of the IEEE, Jun. 2001, pp. 939–950.

Steigerwald, "A Comparison of Half–Bridge Resonant Converter Topologies," IEEE Transactions on Power Electronics, vol. 2, No. 2, Apr., 1988.

Baker, "High Frequency Power Conversion with FET–Controlled Resonant Charge Transfer," PCI Proceedings, Apr. 1983.

Divan, "Design Considerations for Very High Frequency Resonant Mode DC/DC Converters," IEEE Transactions on Power Electronics, vol. PE–2, No. 1, Jan., 1987.

Bo Yang et al., "LLC Resonant Converter for Front End DC–DC Conversion," CPES Seminar 2001, Blacksburg, VA, Apr. 23, 2001, pp. 44–48.

Bo Yang et al., "Low Q Characteristic of Series Resonant Converter and Its Application," CPES Seminar 2001, Blacksburg, VA, Apr. 23, 2001, pp. 170–173.

Palz, "Stromversorgung von Satelliten—Wanderfeldröhren hoher Leistung" ("Power Supply for Satellites—High Capacity Traveling–Wave Tubes"), Siemens Zeitschrift, vol. 48, 1974, pp. 840–846, (with English translation).

Data sheet, "Preliminary Tech Spec, Narrow Input, Isolated DC/DC Bus Converter," SynQor Document No. 005–2BQ512J, Rev. 7, Aug., 2002, pp. 1–7.

Erickson and Maksimovic, "Fundamentals of Power Electronics," $2^{nd}$ Edition, Kluwer Academic Publishers, 2001, Dec.

Hua et al., "Novel Zero–Voltage Transition PWM Converters," IEEE Transactions on Power Electronics, vol. 9, No. 2, Mar., 1994, p. 605.

Vinciarelli, Buck–Boost DC–DC Switching Power Conversion, U.S. Appl. No. 10/214,859, filed Aug. 8, 2002.

Colson, "Intel Platform Solutions," Issue 23, Sep. 3, 1999, pp. 1, 20–21.

Reynolds, "Intel Development Forum Highlights: Fall 1999," published by Gartner, Dataquest, Nov. 30, 1999.

Strassberg, "Tiny Titans: Choose 'Em With Care," EDN Magazine, May 2, 2002, pp. 41–42, 44, 46 & 48.

Morrison, "Distributed Power Moves to Intermediate Voltage Bus", Electronic Design Magazine, Sep. 16, 2002, pp. 55, 58, 60 & 62.

Yao et al., "A Novel Resonant Gate Driver for High Frequency Synchronous Buck converters," IEEE Transactions on Power Electronics, vol. 17, No. 2, Mar. 2002, pp. 180–186.

Stanford, "New Processors Will Require New Powering Technologies," Power Electronics Technology Magazine, Feb. 2002, pp. 32–42.

Balogh, "Distributing On–Card Power—Choosing the Right Board–Level Architecture for a Range of Power Needs", Texas Instruments, High–Performance Analog, Apec '03, Miami, FL, pp. 1–24, Dec., 2003.

Ren et al., "A Novel Simple and High Efficiency 'DC/DC Transformer'," Center for Power Electronics Systems, CPES Seminar 2002, Blacksburg, VA, Apr. 14, 2002, pp. 173–177.

Weinberg et al., "A New Zero Voltage and Zero Current Power–Switching Technique," IEEE Transactions on Power Electronics, vol. 7, No. 4, Oct. 1992, pp. 655–665.

Miller, "The Use of Resonant Circuits in Power Conditioning Equipment," PCSC '71 Record, 1971, pp. 94–100.

Schwarz, "A Method of Resonant Current Pulse Modulation for Power Converters," IEEE Transactions on Industrial Electronics and Control Instrumentation, vol. 4, No. 4, Oct. 1989, pp. 209–221.

Ray et al., "A Cascaded Schwarz Converter for High Frequency Power Distribution," IEEE Transactions on Power Electronics, vol. 4, No. 4, Oct. 1989, pp. 478–485.

Schmidtner, "A New High Frequency Resonant Converter Topology," HFPC, May 1988 Proceedings, pp. 390–403.

Batarseh, "Resonant Converter Topologies with Three and Four Energy Storage Elements," IEEE Transactions on Power Electronics, vol. 9, No. 1, Jan. 1944, pp. 64–73.

Ye et al., "Investigation of Topology Candidates for 48V VRM," 2002 APEC Conference, Mar. 2002.

Alou et al., "Buck+Half Bridge (d=50%) Topology Applied to Very Low Voltage Converters," Applied Power Electronics Conference and Exposition, APEC 2001, Vol. 2, pp. 715–721, Feb. 2001.

Ren et al., "Two–Stage 48V Power Pod Exploration for 64–Bit Microprocessor," Applied Power Electronics Conference and Exposition, Sep. 2003, vol. 1.

"SynQor's Bus Converter delivers 240 Watts in Quater–brick," SynQor Press Release, Aug. 2, 2002.

Severns and Bloom, "Modern DC–to–DC Switchmode Power Conversion Circuits, 'DC Transformers'" ISBN 0–442–21396–4, pp. 78–111, Dec. 1985.

Severns et al., "Modern DC–to–DC Switchmode Power Converter Circuits, 'Buck–Derived Circuits,'" ISBN 0–442–21396–4, pp. 114–117, Dec. 1985.

Severns et al., "Modern DC–to–DC Switchmode Power Converter Circuits, 'Boost–Derived Circuits,'" ISBN 0–442–21396–4, pp. 136–139, Dec. 1985.

Patterson, "Pseudo–Resonant Full Bridge DC/DC Converter", IEEE Transaction on Power Electronics, vol. 6, No. 4, Oct. 1991, pp. 671–678.

* cited by examiner

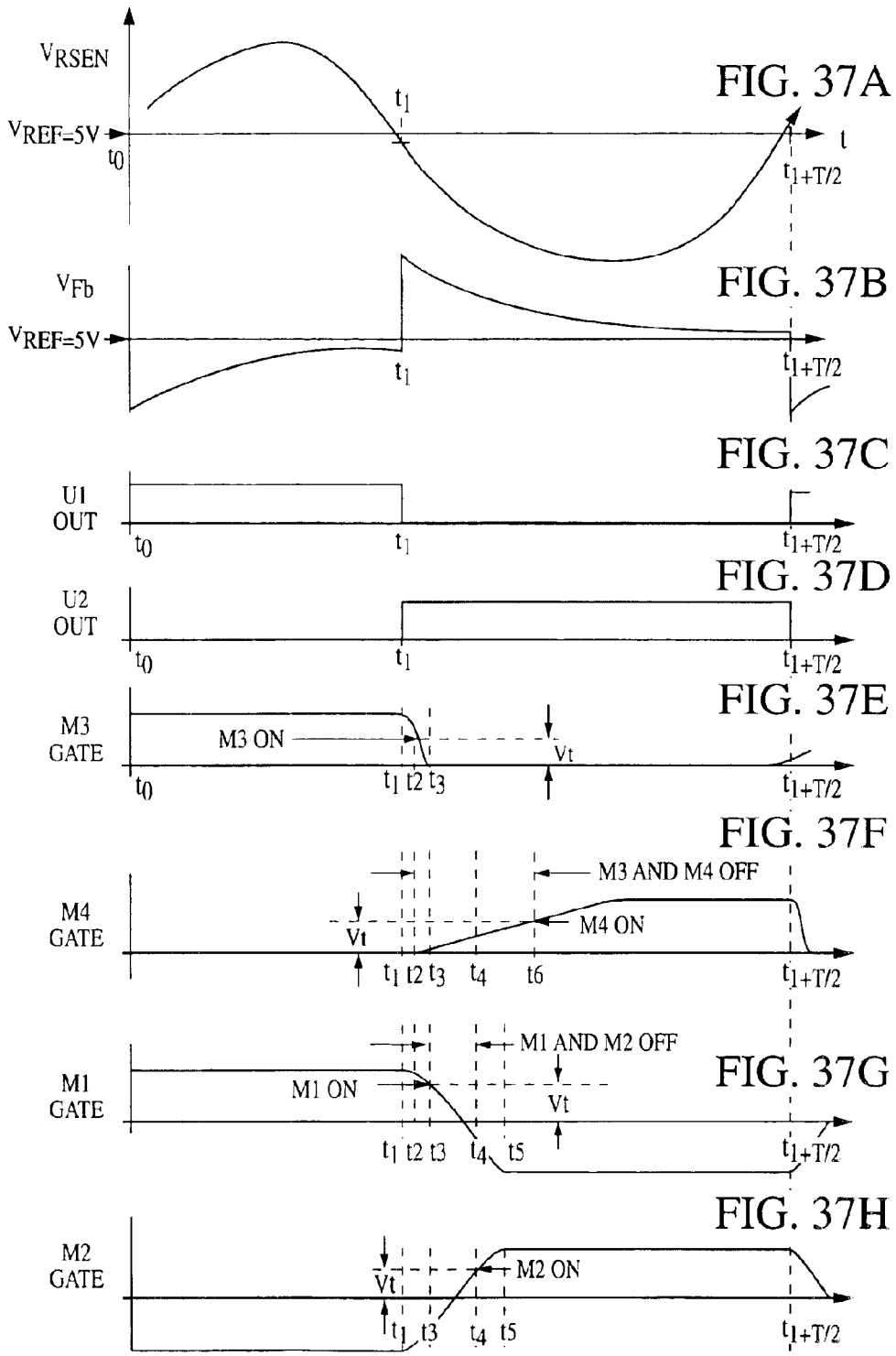

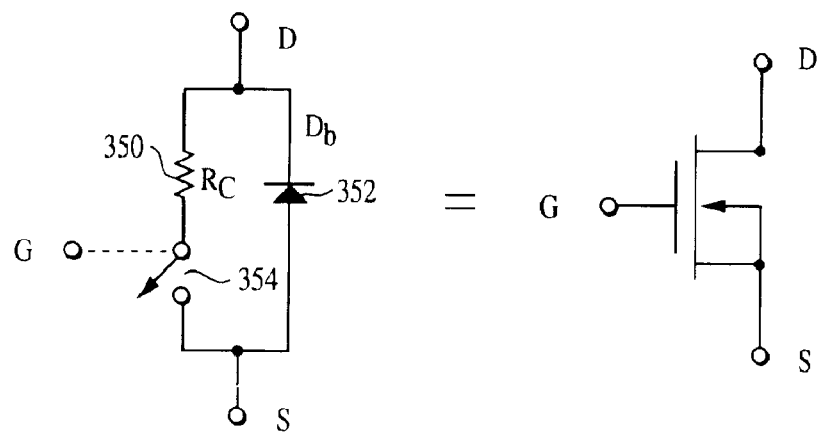
FIG. 38
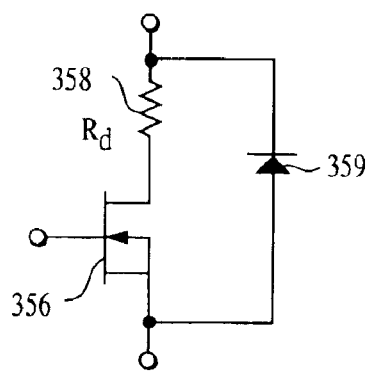 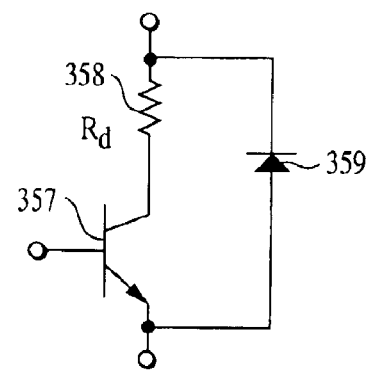
FIG. 39A  FIG. 39B

FACTORIZED POWER ARCHITECTURE WITH POINT OF LOAD SINE AMPLITUDE CONVERTERS

TECHNICAL FIELD

This application is a continuation-in-part of U.S. application Ser. No. 10/066,418, filed Jan. 31, 2002 now abandoned.

This invention relates to the field of electrical power conversion and more particularly to distributed electronic power conversion systems.

BACKGROUND

DC—DC converters transfer power from a DC electrical input source to a load by transferring buckets of energy between windings of an isolation transformer. The DC output voltage delivered to the load is controlled by adjusting the timing of internal power switching elements (e.g., by controlling the converter switching frequency and/or the switch duty cycle and/or the phase of switches). As defined herein, the functions of a "DC—DC converter" comprise: a) isolation between the input source and the load; b) conversion of an input voltage to an output voltage; and c) regulation of the output voltage. DC—DC converters may be viewed as a subset of a broad class of switching power converters, referred to as "switching regulators," which convert power from an input source to a load by processing energy through intermediate storage in reactive elements. As defined herein, the functions of a "Switching Regulator" comprise: a) conversion of an input voltage to an output voltage, and b) regulation of the output voltage. If the required output voltage is essentially a positive or negative integer (or rational) multiple of the input voltage, the conversion function may also be efficiently performed by a capacitive "Charge Pump," which transfers energy by adding and subtracting charge from capacitors.

The introduction of commercial DC—DC converters capable of efficiently switching at high frequencies (e.g., 1 MHz) has brought about significant miniaturization of the DC—DC converter function. The reduction in switching losses made possible by the invention, in the early 1980's, of zero current switching ("ZCS") and zero voltage switching ("ZVS") power conversion topologies, led to an increase in converter operating frequency that translated into a commensurate breakthrough in power density. The power density of DC—DC converters jumped from about 1 Watt/cubic inch to over 20 Watts/cubic inch. The reduction of DC—DC converter volume per unit of power delivered, and the corresponding reduction in DC—DC converter weight, created many new opportunities for the deployment of DC—DC converters and enabled the development of more advanced power systems and power system architectures for electronic products and systems. These products and systems have also benefited from advances in power density and efficiency of commercial Switching Regulators and Charge Pumps.

High frequency DC—DC converters have been packaged to provide flexibility in mechanical mounting and thermal management. A typical DC—DC converter (FIG. 1) is an enclosed assembly 10 comprising a metal surface 12 for extracting heat and connection pins 13 for connecting the converter to the source and the load. Contemporary DC—DC converters, commercially available from many vendors, offer power densities up to 100 Watts per cubic inch and the height of the overall assembly, exclusive of the pins, is typically 0.5 inch.

It is known that there is a tradeoff between DC—DC converter operating efficiency and power density on the one hand, and the range of input voltages over which the converter is designed to operate on the other. Narrower input voltage operating ranges may allow for more efficient converters and higher power densities. It is also known that, for a given level of power delivery, the efficiency of a power converter typically decreases with decreasing output voltage. For example, a converter delivering 2V at 100 Amperes (100 Watts) will typically exhibit higher losses than a converter delivering 5V at 20 Amperes (100 Watts).

Certain electronic systems contain a multiplicity of subsystems on printed circuit boards ("PCBs"), closely spaced and interconnected within an enclosure or rack, each PCB requiring a complement of voltages suitably adapted to the unique power requirements of the circuitry on the PCB. Prior to the availability of high density and low profile (0.5 inch tall) DC—DC converters, most such systems relied on a "centralized power architecture" ("CPA"). In the CPA architecture, the various well-regulated voltages required by the PCBs (e.g., 2V, 5V, 12V) are generated in a centralized power supply and bussed around the system for delivery to each of the PCB subassemblies. With the CPA architecture, high currents at relatively low voltages need to be delivered over substantial distances and the management of power losses and voltage drops throughout the system is difficult and costly. The advent of high-density DC—DC converters enabled a migration from the CPA to a "distributed power architecture" ("DPA"). In the DPA architecture, these problems are overcome by bussing a relatively higher, less well-regulated, voltage around the system (e.g., 300V, 48V, 24V) to provide input power to DC—DC converters on the PCBs, which perform the functions of isolation, voltage conversion and regulation at the point-of-load. In addition to simplifying power distribution, the DPA provides system design flexibility, since each subsystem can be provided with DC—DC converters which deliver whatever voltages are needed without requiring modifications to a centralized power supply or distribution system. System design flexibility is further enhanced by the availability of high density Switching Regulators and Charge Pumps.

The DPA architecture is discussed in Tabisz et al, "Present and Future of Distributed Power Systems," APEC '92 Conference Proceedings, 1992, pp. 11–18; in Mweene et al, A High-Efficiency 1.5 kW, 390–50V Half-Bridge Converter Operated at 100% Duty Ratio," APEC '92 Conference Proceedings, 1992, pp. 723–730; in Choi et al, "Dynamics and Control of DC-to-DC Converters Driving Other Converters Downstream," IEEE Transactions on Circuits and Systems-I: Fundamental Theory and Applications, October 1999, pp. 1240–1248; and in Lee et al, "Topologies and Design Considerations for Distributed Power System Applications," Proceedings of the IEEE, June 2001, pp. 939–950.

Non-resonant full-bridge, half-bridge, and push-pull DC-to-DC transformer topologies are known. See e.g., Severns and Bloom, "Modem DC-to-DC Switchmode Power Conversion Circuits," ISBN 0-442-21396-4, pp. 78–111. Series, parallel, and other resonant forms of switching power converters are also known. See e.g., Steigerwald, "A Comparison of Half-Bridge Resonant Converter Topologies," IEEE Transactions on Power Electronics, Vol. 2, No. 2, April, 1988. Variable frequency, series resonant, half-bridge converters for operation from an input voltage source are described in Baker, "High Frequency Power Conversion With FET-Controlled Resonant Charge Transfer," PCI Proceedings, April 1983, and in Nerone, U.S. Pat. No.

4,648,017. Half-bridge, single-stage, ZVS, multi-resonant, variable frequency converters, which operate from an input voltage source are shown in Tabisz et al, U.S. Pat. No. 4,841,220 and Tabisz et al, U.S. Pat. No. 4,860,184. A variable frequency, full-bridge, resonant converter, in which an inductor is interposed between the input source and the resonant converter is described in Divan, "Design Considerations for Very High Frequency Resonant Mode DC/DC Converters," IEEE Transactions on Power Electronics, Vol. PE-2, No. 1, January, 1987. A variable frequency, ZVS, half-bridge LLC series resonant converter is described in Bo Yang et al, "LLC Resonant Converter for Front End DC—DC Conversion," CPES Seminar 2001, Blacksburg, Va., April 2001. Analysis and simulation of a "Low Q" half-bridge series resonant converter, wherein the term "Low Q" refers to operation at light load, is described in Bo Yang et al, "Low Q Characteristic of Series Resonant Converter and Its Application," CPES Seminar 2001, Blacksburg, Va., April 2001.

Fixed-frequency half-bridge and full-bridge resonant converters are also known in which output voltage control is achieved by controlling the relative timing of switches. A half-bridge, single-stage, ZVS, multi-resonant, fixed-frequency converter that operates from an input voltage source is shown in Jovanovic et al, U.S. Pat. No. 4,931,716. A full-bridge, single-stage, ZVS, resonant, fixed-frequency converter that operates from an input voltage source is shown in Henze et al, U.S. Pat. No. 4,855,888.

A full-bridge, single-stage, ZCS, series-resonant, fixed-frequency converter, operating at a frequency equal to the characteristic resonant frequency of the converter, is shown in Palz, "Stromversorgung von Satelliten—Wanderfeldrohren hoher Leistung" ("Power Supply for Satellites-High Capacity Traveling-Wave Tubes"), Siemens Zeitschrift, Vol. 48, 1974, pp. 840–846. Half and full-bridge, single-stage, ZVS, resonant, converters, for powering fluorescent tubes are shown in Nalbant, U.S. Pat. No. 5,615,093.

A DC-to-DC Transformer offered for sale by SynQor, Hudson, Mass., USA, called a "BusQor™ Bus Converter," that converts a regulated 48VDC input to a 12 VDC output at a power level of 240 Watts and that can be paralleled with other similar converters for increased output power delivery, and that is packaged in a quarter brick format, is described in data sheet "Preliminary Tech Spec, Narrow Input, Isolated DC/DC Bus Converter," SynQor Document No. 005-2BQ512J, Rev. 7, August, 2002.

The art of resonant power conversion, including operation below or above resonant frequency, utilizing either ZCS or ZVS control techniques and allowing the resonant cycle to be either completed or purposely interrupted, is summarized in Chapter 19 of Erickson and Maksimovic, "Fundamentals of Power Electronics," 2nd Edition, Kluwer Academic Publishers, 2001.

Cascaded converters, in which a first converter is controlled to generate a voltage or current, which serves as the source of input power for a DC-to-DC transformer stage, are known. A discussion of canonical forms of cascaded converters is given in Severns and Bloom, ibid, at, e.g., pp. 114–117, 136–139. Baker, ibid, discusses the use of a voltage pre-regulator cascaded with a half-bridge, resonant, variable-frequency converter. Jones, U.S. Pat. No. 4,533,986 shows a continuous-mode PWM boost converter cascaded with both PWM converters and FM resonant half-bridge converters for improving holdup time and improving the power factor presented to an AC input source. A zero-voltage transition, current-fed, full-bridge PWM converter, comprising a PWM boost converter delivering a controlled current to a PWM, full-bridge converter, is shown in Hua et al, "Novel Zero-Voltage Transition PWM Converters," IEEE Transactions on Power Electronics, Vol. 9, No. 2, March, 1994, p. 605. Stuart, U.S. Pat. No. 4,853,832, shows a full-bridge series-resonant converter cascaded with a series-resonant DC-to-DC transformer stage for providing AC bus power to distributed rectified loads. A half-bridge PWM DC-to-DC transformer stage for use in providing input power to point-of-load DC—DC converters in a DPA is described in Mweene et al, ibid. Schlecht, U.S. Pat. Nos. 5,999,417 and 6,222,742 shows DC—DC converters which incorporate a DC-to-DC transformer stage cascaded with a switching regulator. Vinciarelli, "Buck-Boost DC—DC Switching Power Conversion," U.S. patent application Ser. No. 10/214,859, filed Aug. 8, 2002, assigned to the same assignee as this application and incorporated by reference, discloses a new, high efficiency, ZVS buck-boost converter topology and shows a front-end converter comprising the disclosed topology cascaded with a DC—DC converter and a DC-to-DC transformer.

A power distribution architecture proposed by Intel Corporation, Santa Clara, Calif., USA, called NPSA ("New Power Supply Architecture"), is described by Colson in "Intel Platform Solutions," Issue 23, September, 1999, and by Reynolds in "Intel Development Forum Highlights: Fall 1999," published by Gartner, Dataquest, November, 1999. NPSA comprises a front-end converter which generates a 30 VAC, 1 MHz, distribution bus for delivery to regulating AC-DC converters located near distributed loads. A power distribution architecture comprising a front-end converter which generates a 12 VDC distribution bus for use by point-of-load isolated and non-isolated converters is described briefly in "Tiny Titans: Choose 'Em and Use 'Em With Care," EDN magazine, May 2, 2002, p. 48. A power distribution architecture comprising a front-end isolated bus converter which generates an unregulated 12 VDC distribution bus for use by point-of-load non-isolated regulating DC—DC converters is described in "Distributed Power Moves To Intermediate Voltage Bus," Electronic Design magazine, Sep. 16, 2002, p. 55.

A series resonant converter in which ZVS is accomplished by exploiting the flow of magnetizing current in a transformer, or in an inductor connected in parallel with the primary winding of a transformer, is described in Ferreira, U.S. Pat. No. 5,448,467.

Low-loss gate drivers for driving capacitive gate terminals of power switching devices are described in Yao et al, "A Novel Resonant Gate Driver for High Frequency Synchronous Buck Converters," IEEE Transactions on Power Electronics, Vol. 17, No. 2, March 2002 and in Fisher et al, U.S. Pat. No. 5,179,512, in Steigerwald, U.S. Pat. No. 5,514,921 and Schlecht, ibid.

A variety of isolated power conversion topologies are compared for use as voltage regulator modules ("VRM") in Ye et al, "Investigation of Topology Candidates for 48V VRM," 2002 APEC Conference. Projected trends in performance requirements for VRMs and a proposed technology roadmap for achieving those requirements are summarized in Stanford, "New Processors Will Require New Powering Technologies," Power Electronics Technology magazine, February 2002.

Modulating the channel resistance of a MOSFET synchronous rectifier switch as a means of regulating an output voltage of a switching power converter is described in Mullett et al, U.S. Pat. No. 6,330,169 B2.

SUMMARY

In general, one aspect features a method for converting power from an input source for delivery to a load where the load may vary over a normal operating range. The method includes providing a transformer and forming a resonant circuit including the transformer and having a characteristic resonant frequency and period. Output circuitry connected to the transformer is provided for delivering a rectified output voltage to the load. Two or more primary switches are provided to drive the resonant circuit. A switch controller is provided to operate the primary switches in a series of converter operating cycles. Each converter operating cycle includes two power transfer intervals of essentially equal duration. One or more of the primary switches are ON and power is transferred from the input to the output via the transformer during the power transfer intervals.

In a first embodiment of the method the resonant circuit has a Q less than 13, each power transfer interval has a duration less than the characteristic resonant period, and the conversion efficiency from the source to the load has a peak greater than 90% within the normal operating range.

In a second embodiment of the method the converter operating cycles include energy-recycling intervals having an essentially constant duration over the normal operating range during which the primary switches are OFF. The switch controller is used to turn the primary switches OFF essentially at times when the current in a secondary winding returns to zero and magnetizing current is used to charge and discharge capacitances during the energy-recycling intervals.

In a third embodiment of the method the converter operating cycles include energy-recycling intervals during which the primary switches are OFF and during which currents in the converter are used to charge and discharge capacitances in the converter. The switch controller turns the primary switches OFF at times essentially when the current in a secondary winding returns to zero. An essentially constant voltage gain $K=V_{out}/V_{in}$ at a load current, where $V_{in}$ is the input source voltage and $V_{out}$, is the rectified output voltage across the load, is provided for the power conversion.

In a fourth embodiment the power transfer intervals have a substantially equal duration over the normal operating range. The converter operating cycles have energy-recycling intervals during which the primary switches are OFF and during which magnetizing current is used to charge and discharge capacitances. The converter operating cycles have an essentially constant duration over the normal operating range.

Implementations of the methods may include one or more of the following features. A resonant portion of current through the primary switches at the beginning and end of the power transfer intervals may be essentially zero. The converter operating cycles may have a period which has an essentially constant duration over the normal operating range. The power transfer intervals may be separated in time by energy-recycling intervals during which the primary switches are OFF. Currents in the converter may be used to charge and discharge capacitances in the converter during the energy-recycling intervals. A power conversion duty cycle greater than 80% over the normal operating range and a characteristic resonant frequency greater than 1.5 MHz may be used. A power conversion duty cycle greater than 90% over the normal operating range and a characteristic resonant frequency greater than 1.0 MHz may be used. A power conversion duty cycle greater than 94% over the normal operating range and a characteristic resonant frequency greater than 500 KHz may be used. Two or more secondary switches in the output circuitry may be provided for rectifying power from the transformer. A switch controller may be provided to turn the secondary switches ON and OFF at times of essentially zero current. The controller may be adapted to turn the secondary switches ON and OFF at times of essentially zero voltage across the secondary switches. The transformer may have a number of primary turns Np, a number of secondary turns Ns, and a ratio of Ns/Np which determines the voltage gain $K=V_{out}/V_{in}$ of the conversion, where $V_{in}$ is the input source voltage to the apparatus and $V_{out}$ is the rectified output voltage. A series resonant circuit may be used. A series-resonant circuit having a Q less than 10 may be used. A characteristic resonant frequency greater than 500 kHz and a Q less than 10 may be used. The duration of the energy-recycling intervals may be essentially equal to a time interval sufficient to minimize losses due to charging and discharging of parasitic circuit capacitances when the primary switches are turned ON. A characteristic resonant frequency greater than 500 kHz and a Q less than 8 may be used. The period of the converter operating cycles may be greater than the characteristic resonant period by a time interval sufficient to minimize losses due to charging and discharging of parasitic circuit capacitances when the primary switches are turned ON. A transformer core having an effective permeability less than 100 and a characteristic resonant frequency greater than 500 kHz may be used. The effective permeability of the transformer core may be less than 25 and the characteristic resonant frequency may be greater than 1 MHz. Voltage excursions across a capacitive element in the resonant circuit may be clamped to limit output current. A regulated auxiliary output for supplying power at an auxiliary voltage $V_{aux}$ may be connected in series with the input source and the auxiliary output voltage, $V_{aux}$, may be adjusted to maintain a desired input voltage $V_{in}$ to the converter. The output voltage $V_{out}$ may be sensed and the auxiliary voltage may be adjusted to regulate the output voltage $V_{out}$, of the converter. A two-stage method of converting power may include a buck regulator connected to receive power from the input source and an output for delivering a regulated voltage for conversion by any of the above methods. A two-stage method of converting power may include a boost regulator having an input connected to receive power from the input source and an output for delivering a regulated voltage for conversion by any of the above methods. A symmetrical power train may be used to reduce common-mode noise. A two-stage method of converting power may include a pre-regulator having an input connected to receive power from the input source and an output for delivering a regulated voltage for conversion by any of the above methods. The pre-regulator may be a buck-boost switching regulator. The pre-regulator may be a ZVS buck-boost regulator.

In general, another aspect features an apparatus for converting power from an input source for delivery to a load, where the load may vary over a normal operating range. The apparatus has a resonant circuit including a transformer and having a characteristic resonant frequency and period, output circuitry connected to the transformer for delivering a rectified output voltage to the load, two or more primary switches connected to drive the resonant circuit; and a switch controller adapted to operate the primary switches in a series of converter operating cycles. Each converter operating cycle has two power transfer intervals of essentially equal duration, during which one or more of the primary switches are ON and power is transferred from the input to the output via the transformer.

In a first embodiment of the apparatus the resonant circuit has a Q less than 13, each power transfer interval has a duration less than the characteristic resonant period, and the conversion efficiency has a peak greater than 90%.

In a second embodiment of the apparatus the converter operating cycles include two energy-recycling intervals, each having an essentially constant duration over the normal operating range, during which the primary switches are OFF and during which magnetizing current is used to charge and discharge capacitances. The switch controller is adapted to turn the primary switches OFF essentially at times when the current in a secondary winding returns to zero.

In a third embodiment of the apparatus the power transfer intervals have a substantially equal duration over the normal operating range. The converter operating cycles include two energy-recycling intervals during which the primary switches are OFF and magnetizing current is used to charge and discharge capacitances. The converter operating cycles have a period of essentially constant duration over the normal operating range. An essentially constant voltage gain $K=V_{out}/V_{in}$ at a load current, where $V_{in}$ is the input source voltage and $V_{out}$ is the rectified output voltage, is used for the power conversion.

Implementations of the apparatuses may include one or more of the following features. The switch controller may be adapted to turn the primary switches ON and OFF essentially at times when a resonant portion of current is zero. The output circuitry may have two or more secondary switches for rectifying power from the transformer and the switch controller may be adapted to turn the secondary switches ON and OFF essentially at times of zero current. The output circuitry may have two or more secondary switches for rectifying power from the transformer and the switch controller may be adapted to turn the secondary switches ON and OFF essentially at times of zero voltage across the secondary switches. The transformer may have a number of primary turns $N_p$, a number of secondary turns $N_s$, and a ratio of $N_s/N_p$ which determines the voltage gain $K=V_{out}/V_{in}$ of the apparatus, where $V_{in}$ is the input source voltage to the apparatus and $V_{out}$ is the rectified output voltage of the apparatus. The duration of the energy-recycling intervals may be essentially equal to a time interval sufficient to minimize losses due to charging and discharging of parasitic circuit capacitances when the primary switches are turned ON. The resonant circuit may have a Q less than 13 or less than 8. The resonant circuit may have a characteristic resonant frequency greater than 500 kHz and a Q less than 10. A series-resonant circuit may be used. The converter operating cycles may have a period of essentially constant duration over the normal operating range. The period of the converter operating cycles may be greater than the characteristic resonant period by a time interval sufficient to minimize losses due to charging and discharging of parasitic circuit capacitances when the primary switches are turned ON. A duty cycle greater than 80% over the normal operating range and a characteristic resonant frequency greater than 1.5 MHz may be used. A power conversion duty cycle greater than 90% over the normal operating range and a characteristic resonant frequency greater than 1.0 MHz may be used. A power conversion duty cycle greater than 94% over the normal operating range and a characteristic resonant frequency greater than 0.5 MHz may be used. The transformer magnetic core may have an effective permeability less than 100 and the characteristic resonant frequency may be greater than 500 kHz. The effective permeability may be less than 25 and the characteristic resonant frequency may be greater than 1 MHz. One or more clamp diodes may be connected across a capacitive element in the resonant circuit to limit output current. Control circuitry for sensing a rate of change of voltage across a capacitive element in the resonant circuit may be used to control output current or voltage. Each power transfer interval may be essentially equal to one half of the characteristic resonant period and the controller may turn the switches ON and OFF at times essentially when a resonant portion of current in the switches is zero. A plurality of the above apparatuses may be connected in parallel to form a power sharing array where an open-loop output resistance of each apparatus determines its respective share of the power delivered to the load. The output voltage may be regulated by feedback to the input source. The output circuitry may include two separate output circuits for delivering two rectified output voltages. A resonant inductance and a resonant capacitance may be connected in series with a primary winding of the transformer forming a primary circuit and the resonant inductance may include a leakage inductance of the transformer. Exactly two primary switches may be used to drive the transformer. A first end of the primary circuit may be connected to a positive input terminal via a first primary switch and connected to a negative input terminal via a second primary switch. The resonant capacitance may include a first capacitor having one end connected to the positive input terminal and a second capacitor having one end connected to the negative input terminal. A first end of the primary circuit may be connected to a positive input terminal via a first primary switch and connected to a negative input terminal via a second primary switch. A second end of the primary circuit may be connected to the positive input terminal via a third primary switch and connected to the negative input terminal via a fourth primary switch. A first end of the primary circuit may be connected to a first primary switch, a second end of the primary circuit may be connected to a second primary switch, and the second primary switch may be connected to the first primary switch. The output circuitry may include synchronous-rectifier devices controlled by a synchronous rectifier controller. The output circuitry may include 2 or more synchronous rectifier devices, a snubber circuit connected to the synchronous rectifiers, a control circuit connected to the synchronous rectifiers for turning the synchronous rectifiers OFF, and the snubber circuit may be adapted to dampen ringing in the output circuit as a first one of the synchronous rectifiers is turned OFF and use energy recovered from dampening to charge a control terminal of a second one of the synchronous rectifiers biasing the second synchronous rectifier toward ON. A filter capacitor and a damping circuit may be connected across the filter capacitor. The switch controller may be adapted to sense completion of a power transfer interval and to turn the primary switches OFF at the completion of the power transfer interval. The power transfer interval may be equal to one half of the characteristic period of the resonant circuit. A switching frequency greater than 500 kHz may be used and the apparatus may exhibit a power density greater than 200 Watts/cubic-inch. A switching frequency greater than 1 MHz may be used and the apparatus may exhibit a power density greater than 300 Watts/cubic-inch. A regulated auxiliary output for supplying power at an auxiliary voltage $V_{aux}$ may be connected in series with the input source and the auxiliary output voltage, $V_{aux}$, may be adjusted to maintain a desired input voltage $V_{in}$ to the converter. The output voltage $V_{out}$ may be sensed and the auxiliary voltage may be adjusted to regulate the output voltage $V_{out}$ of the converter. A DC—DC converter may include a buck regulator connected to receive power from the input source and an output for delivering a regulated voltage to any of the above apparatuses. A DC—DC converter may include a boost regulator connected to receive power from the input source and an output for delivering a regulated voltage to any of the above apparatuses. The transformer and resonant circuit may be configured with symmetry to reduce common-mode noise coupled by parasitic capacitances into the output circuitry. The transformer may include first and second primary windings and the primary switches may drive the first and second primary windings out of phase. The primary switches may form a full-bridge circuit and the resonant circuit may have a resonant capacitor connected in series with and between two primary windings. The primary switches may form a full-bridge circuit and the resonant circuit may have first and second resonant capacitors connected at a respective end of the primary winding. The transformer may have a center-tapped primary winding and the primary switches may form a push-pull driver to drive the primary winding. Two half-bridges may be driven out of phase. A DC—DC converter may include a pre-regulator having an input connected to receive power from the input source and an output for delivering a regulated voltage to any of the above apparatuses. The pre-regulator may be a buck-boost switching regulator. The pre-regulator may be a ZVS buck-boost regulator.

Implementations of the above methods or apparatuses may include one or more of the following features. A power conversion duty cycle that is essentially constant and greater than 80 percent over the normal operating range and which decreases when the range is exceeded may be used. A converter operating period which is essentially constant over the normal operating range and which increases when the range is exceeded may be used. The duration of the energy-recycling interval may vary when the normal operating range is exceeded. The load may include a microprocessor. A Q of less than 10 and a characteristic resonant frequency greater than 1 MHz may be used with a microprocessor load. The transient response time may be shorter than 4 converter operating cycles for a step change in load.

In general, another aspect features a method of distributing power from an input source to a load, where the load may vary over a normal operating range. A first regulator is used at a first location to convert power from the input source at a source voltage, $V_{source}$, and deliver a controlled DC voltage, $V_f$, to a factorized bus. The factorized bus is used to carry power from the first regulator to a remote location separated by a distance from the first location. A voltage transformation module ("VTM") having an output resistance, $R_{out}$, is used at the remote location to convert power, via a transformer, from the factorized bus at an input voltage $V_{in}$, essentially equal to the voltage delivered to the bus, $V_f$, to a DC output voltage, $V_{out}$.

In a first embodiment of the method, an essentially constant voltage gain, $K=V_{out}/V_{in}$, at a load current is used in the VTM. The load is supplied with a voltage, $V_{load}$, essentially equal to the output voltage of the VTM, $V_{out}$, which is regulated by the first regulator using the factorized bus.

In a second embodiment of the method, the VTM has two or more power switches, has an input for receiving an input voltage, $V_{in}$, essentially equal to the voltage delivered to the bus, $V_f$, has an output for delivering an output voltage, $V_{out}$, essentially equal to the load voltage, $V_{load}$, uses a power conversion duty cycle greater than 80% and uses an essentially constant voltage gain, $K=V_{out}/V_{in}$, at a load current.

In a third embodiment of the method, the VTM has two or more primary switches connected to drive a transformer, an input for receiving an input voltage, $V_{in}$, essentially equal to the bus voltage, $V_f$, and an output for delivering an output voltage, $V_{out}$, essentially equal to the load voltage, $V_{load}$. The primary switches are operated in a series of converter operating cycles having two power transfer intervals of essentially equal duration, during which one or more of the primary switches are ON and power is transferred from the input to the output via the transformer, and two energy-recycling intervals during which the primary switches are OFF. The load voltage, $V_{load}$, is regulated by the first regulator using the factorized bus.

In general, another aspect features a method of providing a power density greater than 200 Watts/cubic-inch in point-of-load converters for efficiently supplying a regulated DC voltage, $V_{load}$, to a load, where the load may vary over a normal operating range, from an input source. The method includes factorizing away from the point-of-load a power-conversion function of voltage regulation by using a first regulator to convert power from the input source to a controlled voltage, $V_f$, delivered to a factorized bus. A function of DC voltage transformation is localized at the point-of-load by converting the factorized bus voltage at the point-of-load, $V_{in}$, to an output voltage, $V_{out}$, essentially equal to $V_{load}$, with a voltage transformation module ("VTM"). The VTM is adapted to operate at or above 500 KHz, to convert power via a transformer, and to provide an essentially constant DC voltage gain, $K=V_{out}/V_{in}$, at a load current. The load voltage, $V_{load}$, is regulated by controlling the voltage of the factorized bus, $V_f$.

In general, another aspect features a method for providing scalable electric power conversion capability in which power is converted from an input source and delivered to a load at a regulated DC output voltage, where the load may vary over a normal operating range. The method includes using a first regulator to convert power from the input source at a source voltage, $V_{source}$, to a controlled DC voltage, $V_f$, delivered to a factorized bus. Two or more voltage transformation modules ("VTMs"), each comprising a transformer and an output resistance $R_{out}$, are operated in parallel to convert power, via the transformers, from an input voltage, $V_{in}$, essentially equal to the factorized bus voltage, $V_f$, to a DC output voltage, $V_{out}$. An essentially constant voltage gain, $K=V_{out}/V_{in}$, at a load current, is used in each of the VTMs. The power provided to the load is shared by each of the VTMs in inverse proportion to the output resistance. The output voltage provided to the load, $V_{load}$, is essentially equal to the output voltage of each of the VTMs, $V_{out}$, and is regulated by the first regulator using the factorized bus.

Implementations of the above methods may include one or more of the following features. The controlled bus voltage, $V_f$, may be controlled using a feedback signal derived from the load voltage, $V_{load}$. The VTM transformer may be used to galvanically isolate the load from the factorized bus. A plurality of VTMs may be connected to the factorized bus. A plurality of VTMs may be connected to the factorized bus and operated in parallel to share the power delivered to the load. The VTMs may be distributed over a multiplicity of locations. The load voltage, $V_{load}$, may be programmed to a selected value using a feedback signal to control the factorized bus voltage, $V_f$. An output switch in series with the output of the VTM may be used to selectively connect the VTM to the load and to protect the load from a fault within the VTM. An input switch in series with the input of the VTM may be used to selectively connect the VTM to the factorized bus and to protect the factorized bus from a fault within the VTM. An input device may be used in series with the input of the VTM to selectively connect the VTM to the factorized bus and to limit the voltage applied to the VTM. A front end converter may be used at a first location to convert power from the input source and deliver a DC voltage, $V_{bus}$, to a first bus and a power regulator module ("PRM") may be used at a second location, separated from the first location by a distance, to convert the DC voltage from the first bus and deliver the controlled DC voltage, $V_f$, to the factorized bus, wherein the first regulator comprises the front end converter and the PRM. The PRM may be controlled to adjust the factorized bus voltage, $V_f$, using a feedback signal derived from the load voltage, $V_{load}$. The VTMs may incorporate the foregoing power conversion methods or apparatuses. The VTM may use a power conversion duty cycle greater than 80 percent over the normal operating range. A method of distributing electrical power in a vehicle may use the above methods with the first regulator located near a source of power in the vehicle, the factorized bus distributing the controlled DC voltage, $V_f$, to a plurality of locations throughout the vehicle, and a plurality of VTMs distributed throughout the vehicle to provide power to loads distributed throughout the vehicle.

In general, another aspect features an apparatus for distributing power from an input source to a load, where the load may vary over a normal operating range. The apparatus includes a first regulator at a first location having a first input, and a first output, the first regulator having circuitry adapted to convert power from the input source at a source voltage, $V_{source}$, and deliver a controlled DC voltage, $V_f$, to the first output. A factorized bus is connected to the first output of the first regulator and extends to a remote location separated by a distance from the first location. A voltage transformation module ("VTM") at the remote location has circuitry, including a transformer, adapted to convert power from an input voltage, $V_{in}$, essentially equal to the voltage delivered to the bus, $V_f$, to a DC output voltage, $V_{out}$ and has an output resistance, $R_{out}$.

In a first embodiment of the apparatus the VTM has an essentially constant voltage gain, $K=V_{out}/V_{in}$, at a load current and the load is supplied with a voltage, $V_{load}$, essentially equal to the output voltage, $V_{out}$, and regulated by the first regulator using the factorized bus.

In a second embodiment of the apparatus the VTM has two or more power switches, a power conversion duty cycle greater than 80% over the normal operating range and an essentially constant voltage gain, $K=V_{out}/V_{in}$, at a load current and the load is supplied with a voltage, $V_{load}$, essentially equal to the output voltage, $V_{out}$.

In a third embodiment of the apparatus the VTM has two or more primary switches connected to drive a transformer with power received from the input and a switch controller adapted to operate the primary switches in a series of converter operating cycles. Each converter operating cycle includes two power transfer intervals of essentially equal duration, during which one or more of the primary switches are ON and power is transferred from the input to the output via the transformer, and two energy-recycling intervals during which the primary switches are OFF. The load is supplied with a voltage, $V_{load}$, essentially equal to the output voltage, $V_{out}$, and regulated by the first regulator using the factorized bus.

In general, another aspect features an apparatus for converting power at a point-of-load from a factorized bus driven by a source of controlled DC voltage, $V_f$, for delivering a regulated DC voltage, $V_{load}$, to a load where the load may vary over a normal operating range. A voltage transformation module ("VTM") has an enclosure for housing power conversion circuitry, an input terminal, and an output terminal. The power conversion circuitry has an input connected to the input terminal and adapted to receive a DC input voltage, $V_{in}$, essentially equal to $V_f$, an output connected to the output terminal and adapted to deliver a DC output voltage, $V_{out}$, essentially equal to $V_{load}$, a transformer, two or more primary switches connected to drive the transformer with power received from the input, and a controller adapted to operate the primary switches in a series of converter operating cycles. Each converter operating cycle includes two power transfer intervals of essentially equal duration during which one or more of the primary switches are ON and power is transferred from the input to the output via the transformer, two energy-recycling intervals during which the primary switches are OFF, and a period less than 2 micro seconds. The VTM has a power density greater than 250 Watts/cubic-inch, an essentially constant DC voltage gain, $K=V_{out}/V_{in}$, at a load current, and an output resistance, $R_{out}$, and regulates the load voltage, $V_{load}$, as a fraction, K, of the factorized bus voltage, $V_f$.

In general, another aspect features an apparatus for providing scalable electric power conversion capability in which power is converted from a factorized bus driven by a voltage source of controlled DC voltage, $V_f$, and delivered to a load at a regulated DC output voltage, $V_{load}$, where the load may vary over a normal operating range. The apparatus includes two or more voltage transformation modules ("VTMs") connected in parallel. Each VTM has an input adapted to receive a DC input voltage, $V_{in}$, essentially equal to $V_f$, an output adapted to deliver an output voltage, $V_{out}$, essentially equal to $V_{load}$, a transformer, two or more primary switches connected to drive the transformer with power received from the input, a controller for operating the primary switches in a series of converter operating cycles, an essentially constant voltage gain $K=V_{out}/V_{in}$ at a load current, and an output resistance, $R_{out}$. The power delivered to the load is shared by each VTM in inverse proportion to the output resistance of each VTM and the output voltage supplied to the load, $V_{load}$, is essentially equal to the output voltage, $V_{out}$, of each of the VTMs and is regulated by the factorized bus voltage $V_f$.

Implementations of the apparatuses may include one or more of the following features. A feedback controller may be used to adjust the voltage, $V_f$, of the factorized bus using a feedback signal derived from the load voltage, $V_{load}$. Galvanic isolation from the input to the output may be provided by the VTM. A plurality of VTMs may be connected to the factorized bus. A plurality of VTMs may be connected to the factorized bus and operated in parallel to share the power delivered to the load. The VTMs may be distributed over a multiplicity of locations. An output controller may be used to adjust the voltage, $V_f$, of the factorized bus to program the load voltage, $V_{load}$, to a selected value. An output switch may be connected in series between the output of the VTM and the load, and an output switch controller may be used to detect a normal state and a fault state of the VTM and operate the output switch in its ON and OFF states to disconnect the VTM from the load in the event of a fault state. An input switch may be connected in series between the input of the VTM and the load, an input switch controller may be used to detect a normal state and a fault state of the VTM and operate the input switch in its ON and OFF states to disconnect the VTM from the factorized bus in the event of a fault state. An input device may be connected in series between the input of the VTM and the load; and an input switch controller may be used to detect the factorized bus voltage and operate the input device to limit the voltage applied to the VTM. The VTM may operate at a greater than 90 percent power conversion duty cycle over the normal operating range. The first regulator may have a front end converter and a power regulator module ("PRM"), with the front end converter situated at a first location and having an input connected to receive power from the input source, an output connected to a first bus, and being adapted to convert power from the input source and deliver a DC voltage to the first bus. The PRM is located at a second location has an input connected to the first bus, an output connected to the factorized bus, and is adapted to convert power from the first bus and deliver the controlled DC voltage, $V_f$, to the factorized bus. A feedback controller may be used to adjust the voltage, $V_f$, of the factorized bus using a feedback signal derived from the load voltage, $V_{load}$, and applied to the PRM. The VTMs may incorporate the foregoing power conversion methods or apparatuses. The VTM may include secondary switches turned ON and OFF essentially at times of zero voltage to rectify power from the transformer. The VTM may include secondary switches turned ON and OFF essentially at times of zero current to rectify power from the transformer. A feedback controller may be used for increasing the output resistance, $R_{out}$ of the VTM using a feedback signal related to the output current, $I_{out}$ of the VTM. A feedback controller may be used for decreasing the output resistance, $R_{out}$ of the VTM using a feedback signal related to the output current, $I_{out}$ of the VTM.

In general, another aspect features an apparatus including an electronic assembly with a VTM having an input connected to receive power from a source at a regulated voltage $V_1$ and an output for delivering power at a second voltage, $V_2$, where $V_1$ is not equal to $V_2$, and electronic circuitry, requiring power at levels which may vary over a normal operating range and at the second voltage, $V_2$. A power regulator supplies power at a regulated voltage to the VTM. The VTM is packaged separately from the power regulator. The VTM has a transformer and is adapted to convert power from the input voltage $V_1$ and deliver the second voltage, $V_2$, at an essentially constant voltage gain, $K=V_2/V_1$, at a load current, and with an output resistance, $R_{out}$.

In general, another aspect features a method which includes providing a VTM having a package, an input adapted to receive power from a source external to the package at a DC input voltage $V_{in}$ an output adapted to deliver power to a load external to the package at a DC output voltage, $V_{out}$, and a transformer. The VTM is adapted to convert power from the input voltage $V_{in}$ and deliver the output voltage, $V_{out}$, at an essentially constant voltage gain, $K=V_{out}/V_{in}$, at a load current, and with an output resistance, $R_{out}$. The method includes connecting the input of the VTM to a regulated source and connecting the output of the VTM to electronic circuitry.

Implementations of the preceding apparatus or method may include one or more of the following features. A factorized bus may be used to carry power from the power regulator to the VTM. The electronic circuitry may include a microprocessor. A feedback controller may be used for increasing the output resistance, $R_{out}$ of the VTM using a feedback signal related to the output current, $I_{out}$ of the VTM. A feedback controller may be used for decreasing the output resistance, $R_{out}$ of the VTM using a feedback signal related to the output current, $I_{out}$ of the VTM. The first regulator may be a buck-boost switching regulator. The first regulator may be a buck-boost ZVS regulator. The PRM may a buck-boost switching regulator. The PRM may be a buck-boost ZVS regulator.

In general, another aspect features an apparatus for converting power from an input source to a load, including a circuit board having a plurality of conductive layers, a transformer having a permeable core comprising a plurality of core elements, each core element passing through a hole in the circuit board, and primary and secondary windings formed by respective patterns on a plurality of conductive layers of the circuit board and around a plurality of core elements. A series resonant circuit includes the transformer and has a characteristic resonant frequency. Two or more primary switches are connected to drive the resonant circuit and output circuitry is connected to the transformer for delivering a rectified output voltage.

Implementations of the apparatus may include one or more of the following features. The core element may include a core piece and an end piece. The core piece may have a portion for passing through the hole in the circuit board. The portion of the core piece may be cylindrical and the hole may be a circular hole. The transformer may be a "dog's bones" transformer and the orientation of windings associated with neighboring dog's bones may be poled in opposite directions. The effective permeability of the permeable core may be less than 100. The effective permeability of the permeable core may be less than 50. The circuit board, the transformer, the primary switches, the resonant circuit and the output circuitry may be over molded to form an integrated circuit sized package having a height less than 0.28 inch. The characteristic resonant frequency may be greater than 500 kHz and the power density may be greater than 200 Watts/cubic-inch.

In general, another aspect features an apparatus for driving a control input of one or more power switching devices. The apparatus includes a drive transformer having a secondary winding. A plurality of switches each of which have a control terminal referenced to a common signal reference for turning the switch ON and OFF and an output connected to drive the transformer. The plurality of switches include a first switch and a second switch being respectively poled to induce a magnetic flux in the drive transformer in a first and in a second direction when ON. The secondary winding is connected to drive the control inputs of the one or more power switching devices. A control circuit is connected to the control terminals and configured to operate the first and second switches in a series of control cycles. Each control cycle has two ON intervals during which one of the first and second switches is ON, and two OFF intervals during which both of the first and second switches is OFF and energy stored in the drive transformer is used to charge and discharge parasitic output capacitances of the plurality of switches and a parasitic input capacitance of the one or more power switching devices.

Implementations of the apparatus may include one or more of the following features. The power switching devices may include a pair of complementary switching devices which are OFF during a portion of the OFF interval. The pair of complementary switching devices is connected to drive a power transformer and a magnetizing inductance of the power transformer has a value small enough to allow ZVS of the complementary switching devices during the time period when the complementary switching devices are OFF. The magnetizing inductance of the drive transformer has a value that allows ZVS of the first and second switches during the OFF intervals. The plurality of switches includes exactly two switches and the control terminals of the switches are referenced to ground. The transformer has a primary winding driven by the first and second switches, the first switch is connected as a primary switch, and the second switch is connected to the primary winding and a capacitor as a reset circuit. The transformer has a first and a second primary winding driven respectively by the first and second switches, and the control terminals of the first and second switches are referenced to ground. An inductive clamp circuit is connected across each of the primary windings, each clamp circuit has a clamp switch and a clamp diode, each clamp switch is turned ON during a portion of one of said OFF intervals, and each clamp circuit is poled to carry the magnetizing current flowing in its respective winding when its respective clamp switch is ON. The apparatus may be used in the foregoing power conversion apparatuses or VTMs.

In general, another aspect features a method for driving a control input of one or more power switching devices. The method includes using a secondary winding of a drive transformer to drive the control inputs of the power switching devices, using a plurality of switches to drive the drive transformer, connecting a control terminal of each switch to reference a common signal reference for turning the switch ON and OFF, using a first switch and a second switch to respectively induce a magnetic flux in the drive transformer in a first and in a second direction when ON; and operating the first and second switches in a series of control cycles. Each control cycle includes two ON intervals during which one of the first and second switches is ON and two OFF intervals during which both of the first and second switches is OFF and energy stored in the drive transformer is used to charge and discharge parasitic output capacitances of the plurality of switches and a parasitic input capacitance of the one or more power switching devices.

Implementations of the method may include one or more of the following features. A pair of complementary switching devices may be used for the power switching devices and a sub-interval may be provided during a portion of the OFF interval when the pair of complementary switching devices is OFF. The pair of complementary switching devices may be connected to drive a power transformer and a value of magnetizing inductance may be provided in the power transformer to allow for ZVS of the complementary switching devices during the sub-interval. A value of magnetizing inductance may be provided in the drive transformer to allow for ZVS of the first and second switches during the OFF intervals. The plurality of switches may have exactly two switches and the control terminals of the switches may be referenced to ground. The first switch may be used to drive a primary winding of the drive transformer as a primary switch and the second switch and a capacitor may be used as a reset circuit for the drive transformer. The first and second switches may be used to respectively drive a first and a second primary winding of the drive transformer and the control terminals of the first and second switches may be connected to reference ground. An inductive clamp circuit may be used across the primary windings to carry magnetizing current during a portion of one of the OFF intervals. The method may be used in the above power conversion methods or VTMs.

In general, another aspect features a method of converting power from an input source for delivery to a load, where the load may vary over a normal operating range, including providing a transformer, forming a resonant circuit including the transformer and having a characteristic resonant frequency and period, providing output circuitry connected to the transformer for delivering a rectified output voltage to the load, providing a first pair of primary switches connected in series and a second pair of primary switches connected in series, the first and second pairs connected to drive the resonant circuit, providing a switch controller to operate the first and second pair of primary switches out of phase in a series of converter operating cycles, and arranging the resonant circuit and primary switches symmetrically to reduce common-mode noise.

Implementations of the method may include one or more of the following features. The transformer may have first and second primary windings and the first pair and second pair of primary switches may drive the first and second primary windings out of phase. The first and second pair and the first and second primary windings may form two half-bridges driven out of phase. The primary switches may form a full-bridge circuit to drive the transformer, the transformer may have two primary windings, and the resonant circuit may have a resonant capacitor connected in series with and between the two primary windings. The primary switches may form a full-bridge circuit to drive the transformer, the resonant circuit may have first and second resonant capacitors, and the transformer may have a primary winding connected in series with and between the first and second resonant capacitors. The primary winding may include a plurality of series connected primary windings.

In general, another aspect features a method of converting power from an input source for delivery to a load, where the load may vary over a normal operating range. The method includes providing a transformer, forming a resonant circuit including the transformer and having a characteristic resonant frequency and period and having a Q less than 13, providing output circuitry connected to the transformer for delivering a rectified output voltage to the load, providing a primary switch connected to drive the resonant circuit, providing a switch controller to operate the primary switch in a series of converter operating cycles, and providing a conversion efficiency having a peak greater than 90% from source to load within the normal operating range.

In general, another aspect features a method of making a power converter including providing a resonant inductance including the leakage inductance of a transformer for use in a resonant circuit in the converter, measuring the resonant inductance, selecting a resonant capacitor based upon the measured resonant inductance to achieve a desired resonant frequency for the resonant circuit, and assembling the converter using the resonant inductance and the selected capacitor.

In general, another aspect features a method of making a power converter including providing a resonant inductance including the leakage inductance of a transformer for use in a resonant circuit in the converter, measuring the resonant inductance, selecting an incremental resonant inductor based upon the measured resonant inductance to achieve a desired total resonant inductance for the resonant circuit, and assembling the converter using the resonant inductance and the selected incremental resonant inductor.

In general, another aspect features an apparatus for converting power from an input source for delivery to a load including a transformer, a primary switch connected to drive the transformer and output circuitry connected to the transformer for delivering an output voltage to the load. A switch controller is adapted to operate the primary switches in a series of converter operating cycles and modulation control circuitry is adapted to modulate the ON-resistance of the primary switch.

Implementations of the apparatus may include one or more of the following features. The modulation control circuitry may include an input connected to sense the output voltage and modulate the ON-resistance to control the output voltage or limit the output current. The modulation control circuitry may include an input connected to sense the load current and modulate the ON-resistance to provide a controlled output current during start-up. The input may sense leakage flux in the transformer. The modulation control circuitry may vary a voltage used for driving a gate control input of the primary switch. The voltage may be a supply voltage of a gate drive circuit.

Another implementation of the apparatus may include a resonant circuit including the transformer having a Q less than 13. The primary switch may include two or more primary switches connected to drive the resonant circuit. The output voltage may be rectified and the load may vary over a normal operating range. Each converter operating cycle may be characterized by two power transfer intervals of essentially equal duration each interval having a duration less than the characteristic resonant period, during which one or more of the primary switches are ON and power is transferred from the input to the output via the transformer. The apparatus may have a conversion efficiency from the source to the load having a peak greater than 90% within the normal operating range.

Another implementation of the apparatus may include a resonant circuit including the transformer and having a characteristic resonant frequency and period. The primary switch may be two or more primary switches connected to drive the resonant circuit. The output voltage may be rectified and the load may vary over a normal operating range. Each converter operating cycle may be characterized by (a) two power transfer intervals of essentially equal duration, during which one or more of the primary switches are ON and power is transferred from the input to the output via the transformer; and (b) two energy-recycling intervals each having an essentially constant duration over the normal operating range during which the primary switches are OFF. The switch controller may be adapted to turn the primary switches OFF essentially at times when the current in a secondary winding returns to zero. Magnetizing current may be used to charge and discharge capacitances during the energy-recycling intervals.

Another implementation of the apparatus may include a resonant circuit including the transformer and having a characteristic resonant frequency and period. The primary switch may be two or more primary switches connected to drive the resonant circuit. The output voltage may be rectified and the load may vary over a normal operating range. Each converter operating cycle may be characterized by (a) first and second power transfer intervals during which one or more of the primary switches are ON, power is transferred from the source to the load via the transformer, and voltages and currents in the converter rise and fall at the characteristic resonant frequency; the first and second power transfer intervals being of substantially equal duration over the normal operating range; and (b) two energy-recycling intervals during which the primary switches are OFF; and (c) a period having an essentially constant duration over the normal operating range. The apparatus may have an essentially constant voltage gain $K=V_{out}/V_{in}$ at a load current for the power conversion, where $V_{in}$ is the input source voltage and $V_{out}$ is the rectified output voltage. Magnetizing current may be used to charge and discharge capacitances during the energy-recycling intervals.

In general, another aspect features a method for converting power from an input source for delivery to a load including providing a transformer, a primary switch to drive the transformer; output circuitry connected to the transformer for delivering an output voltage to the load, a switch controller adapted to operate the primary switch in a series of converter operating cycles, and modulation control circuitry adapted to modulate the ON-resistance of the primary switch.

Implementations of the method may include one or more of the following features. The modulation control circuitry may have an input connected to sense the output voltage and modulate the ON-resistance to control the output voltage or limit an output current. The modulation control circuitry may have an input connected to sense the output current and modulate the ON-resistance to provide a controlled output current during start-up. The input may sense leakage flux in the transformer. The modulation control circuitry may vary a voltage used for driving a gate control input of the primary switch. The modulation control circuitry may vary a supply voltage of a gate drive circuit.

Another implementation of the method may include a resonant circuit including the transformer having a Q less than 13 and having a characteristic resonant frequency and period. The output voltage may be rectified and the load may vary over a normal operating range. The primary switch may be two or more primary switches connected to drive the resonant circuit. Each converter operating cycle may be characterized by two power transfer intervals of essentially equal duration each interval having a duration less than the characteristic resonant period, during which one or more of the primary switches are ON and power is transferred from the input to the output via the transformer. A conversion efficiency from the source to the load having a peak greater than 90% within the normal operating range may be provided.

Another implementation of the method may include a resonant circuit including the transformer and having a characteristic resonant frequency and period. Output circuitry connected to the transformer for delivering a rectified output voltage to the load may be provided. The output voltage may be rectified and the load may vary over a normal operating range. The primary switch may be two or more primary switches connected to drive the resonant circuit. Each converter operating cycle may be characterized by (a) two power transfer intervals of essentially equal duration, during which one or more of the primary switches are ON and power is transferred from the input to the output via the transformer; and (b) two energy-recycling intervals each having an essentially constant duration over the normal operating range during which the primary switches are OFF. The switch controller may be used to turn the primary switches OFF essentially at times when the current in a secondary winding returns to zero. Magnetizing current may be used to charge and discharge capacitances during the energy-recycling intervals.

In another implementation, the method may be used in a converter where the primary switch comprises two or more primary switches connected to drive a resonant circuit including the transformer and having a characteristic resonant frequency and period, where the output voltage is rectified, and where the load may vary over a normal operating range. The primary switches may be operated in a series of converter operating cycles. Each converter operating cycle may be characterized by: (a) first and second power transfer intervals during which one or more of the primary switches are ON, power is transferred from the input source to the load via the transformer, and voltages and currents in the converter rise and fall at the characteristic resonant frequency of the resonant circuit; the first and second power transfer intervals being of substantially equal duration; and (b) two energy-recycling intervals during which the primary switches are OFF. The switch controller may turn the primary switches OFF at times essentially when the current in a secondary winding returns to zero. Currents in the converter may be used to charge and discharge capacitances in the converter during the energy-recycling intervals. An essentially constant voltage gain $K=V_{out}/V_{in}$ at a load current for the power conversion, where $V_{in}$ is the input source voltage and $V_{out}$ is the rectified output voltage across the load, may be provided.

In another implementation, the method may be used in a converter where the primary switch comprises two or more primary switches connected to drive a resonant circuit including a transformer and having a characteristic resonant frequency and period, where the output voltage is rectified, and where the load may vary over a normal operating range. The primary switches may be operated in a series of converter operating cycles. Each converter operating cycle may be characterized by: (a) first and second power transfer intervals during which one or more of the primary switches are ON, power is transferred from the source to the load via the transformer, and voltages and currents in the converter rise and fall at the characteristic resonant frequency of the resonant circuit; the first and second power transfer intervals being of substantially equal duration over the normal operating range; and (b) two energy-recycling intervals during which the primary switches are OFF; and (c) a period having an essentially constant duration over the normal operating range. The magnetizing current may be used to charge and discharge capacitances during the energy-recycling intervals.

In general, another aspect features an apparatus for delivering a unipolar control voltage. The apparatus includes a transformer having a primary winding, a secondary winding, and a magnetizing inductance. Drive circuitry connected to drive the primary winding produces a bipolar voltage across the secondary winding. A first output terminal and a reference terminal deliver the control voltage. Switch circuitry connected to the secondary winding may be adapted to (a) connect the secondary winding across the first output terminal and the reference terminal when a voltage across the secondary winding is of a first polarity, (b) clamp the first output terminal to the reference terminal when a voltage across the secondary winding is of a second polarity, and (c) enable recycling of energy between the magnetizing inductance of the transformer and the parasitic capacitances of the switch circuitry and the capacitance between the first output terminal and the reference terminal.

Implementations of the apparatus may include one or more of the following features. The capacitance between the first output terminal and the reference terminal may be a parasitic gate-source capacitance of a MOSFET switch. The switch circuitry may include a MOSFET. A first controlled switch may have a first control input connected to the first output terminal. The switch circuitry may have a first switch connected between a first end of the secondary winding and the reference terminal and a second switch connected between a second end of the secondary winding and the reference terminal. The first output terminal may be connected to the second end of the secondary winding. A first controlled switch may have a first control input connected to the first output terminal, the first switch may have a control input connected to the second switch, the second switch may have a control input connected to the first switch, and the first and second switches may have a control threshold which is less than a control threshold of the controlled switch. A second output terminal may be connected to the first end of the secondary winding for delivering a second unipolar control voltage relative to the reference. A second controlled switch may have a second control input connected to the second output terminal. The switch circuitry may be further adapted to: (d) connect the secondary winding across the second output terminal and the reference terminal when a voltage across the secondary winding is of the second polarity; (e) clamp the second output terminal to the reference terminal when a voltage across the secondary winding is of the first polarity; and (f) enable recycling of energy between the magnetizing inductance of the transformer and the capacitance between the second output terminal and the reference terminal. The first and second switches may include MOSFETs. The first and second switches may include junction transistors. A first series circuit may have a first resistance connected in parallel with a first unidirectional conducting device. The first series circuit may be connected between the control input of the first switch and the second switch. A second series circuit may have a second resistance and a second unidirectional conducting device connected in parallel and the second series circuit may be connected between the control input of the second switch and the first switch. The first and second switches may include junction transistors. A first integrated semiconductor device formed on a common die may have a plurality of FETs each having a gate, a source, and a drain, and having the same threshold voltage. The first device may have a first switch section and a first clamp section. The first switch section may include one or more of the plurality of FETs connected in parallel. The first clamp section may include one or more of the plurality of FETs. The gates of the FETs in the first switch section and first clamp section may be connected to a first gate terminal. The sources of the FETs in the first switch section and first clamp section may be connected to a first source terminal. The switch circuitry may include a first clamp section. The first clamp section may include a drain terminal connected to a first end of the secondary winding. The first source terminal may be connected to the reference terminal. The first gate terminal may be connected to a second end of the secondary winding. A second switch may be connected between the second end of the secondary winding and the reference terminal. A control input of the second switch may be connected to the first end of the secondary winding. The first clamp section may clamp the first end of the secondary winding to the reference terminal and hold OFF the second switch when the first switch section is ON. A second integrated semiconductor device formed on a common die may include a plurality of FETs each having a gate, a source, and a drain, and having the same threshold voltage. The second device may have a second switch section and a second clamp section. The second switch section may include one or more of the plurality of FETs connected in parallel. The second clamp section may include one or more of the plurality of FETs. The gates of the FETs in the second switch section and second clamp section may be connected to a second gate terminal. The sources of the FETs in the second switch section and second clamp section may be connected to a second source terminal. The switch circuitry may include the second clamp section. The second gate terminal may be adapted to be clamped by the first clamp and the first gate terminal is adapted to be clamped by the second clamp. The first clamp section may have a drain terminal connected to a first end of the secondary winding. The second clamp section may have a drain terminal connected to a second end of the secondary winding. The first source terminal and second source terminal may be connected to the reference terminal. The first gate terminal may be connected to the second end of the secondary winding. The second gate terminal may be connected to the first end of the secondary winding. The first clamp section may clamp the first end of the secondary winding to the reference terminal and hold OFF the second switch and second clamp sections when the first switch section is ON. The second clamp section may clamp the second end of the secondary winding to the reference terminal and hold OFF the first switch and first clamp sections when the second switch section is ON. The first and second switch sections may drive a power transformer.

In another implementation of the apparatus, the drive circuitry may include a plurality of switches each having a control terminal referenced to a common signal reference for turning the switch ON and OFF and an output connected to drive the transformer. The plurality of switches may include a first switch and a second switch being respectively poled to induce a magnetic flux in the drive transformer in a first and in a second direction when ON. A control circuit may be connected to the control terminals and configured to operate the first and second switches in a series of control cycles each characterized by: (a) two ON intervals during which one of the first and second switches is ON; (b) two OFF intervals during which both of the first and second switches is OFF and energy stored in the drive transformer is used to charge and discharge parasitic output capacitances of the plurality of switches, parasitic capacitances of the switch circuitry, and a parasitic input capacitance of a power switching device having control inputs connected to the first output terminal and the reference terminal.

In another implementation of the apparatus, the drive circuitry may include a plurality of switches each having a control terminal referenced to a common signal reference for turning the switch ON and OFF and an output connected to drive the transformer. The plurality of switches may include a first switch and a second switch being respectively poled to induce a magnetic flux in the drive transformer in a first and in a second direction when ON. A control circuit may be connected to the control terminals and configured to operate the first and second switches in a series of control cycles each characterized by: (a) two ON intervals during which one of the first and second switches is ON; and (b) two OFF intervals during which both of the first and second switches is OFF and energy stored in the drive transformer is used to charge and discharge parasitic output capacitances of the plurality of switches, parasitic capacitances of the switch circuitry, and parasitic input capacitances of a pair of complementary power switching devices having control inputs connected between the first or second output terminals and the reference terminal. The pair of complementary switching devices may be OFF during a portion of the OFF interval.

In general, another aspect features a method for delivering a unipolar control voltage. A transformer having a primary winding, a secondary winding, and a magnetizing inductance may be provided. Drive circuitry may be provided to drive the primary winding to produce a bipolar voltage across the secondary winding. A first output terminal and a reference terminal may be provided for delivering the control voltage. Switch circuitry may be connected to the secondary winding and adapted to: (a) connect the secondary winding across the first output terminal and the reference terminal when a voltage across the secondary winding is of a first polarity; (b) clamp the first output terminal to the reference terminal when a voltage across the secondary winding is of a second polarity; and (c) enable recycling of energy between the magnetizing inductance of the transformer and the parasitic capacitances of the switch circuitry and the capacitance between the first output terminal and the reference terminal.

In general, another aspect features a method for delivering a unipolar control voltage across a first output terminal and a reference terminal in a circuit using switch circuitry and a transformer having a primary, a secondary winding, and a magnetizing inductance. The primary winding may be driven to produce a bipolar voltage across the secondary winding. The secondary winding may be connected across the first output terminal and the reference terminal when a voltage across the secondary winding is of a first polarity. The first output terminal may be clamped to the reference terminal when a voltage across the secondary winding is of a second polarity. Energy may be recycled between the magnetizing inductance of the transformer and parasitic capacitances of the switch circuitry and parasitic capacitances between the first output terminal and the reference terminal.

Implementations of the methods may include one or more of the following features. The capacitive load across the first output terminal and reference terminal may include a parasitic gate-source capacitance of MOSFET switch. MOSFETs may be used for the switch circuitry. A first controlled switch having a first control input connected to the first output terminal may be provided. A first switch may be used between a first end of the secondary winding and the reference terminal. A second switch may be used between a second end of the secondary winding and the reference terminal. The first output terminal may be connected to the second end of the secondary winding. A first controlled switch having a first control input connected to the first output terminal may be provided. A control input of the first switch may be connected to the second switch. A control input of the second switch may be connected to the first switch. The first and second switches may have a control threshold which is less than a control threshold of the controlled switch. A second output terminal may be connected to the first end of the secondary winding for delivering a second unipolar control voltage relative to the reference. A second controlled switch may be provided having a second control input connected to the second output terminal. The switch circuitry may be further adapted to: (d) connect the secondary winding across the second output terminal and the reference terminal when a voltage across the secondary winding is of the second polarity; (e) clamp the second output terminal to the reference terminal when a voltage across the secondary winding is of the first polarity; and (f) enable recycling of energy between the magnetizing inductance of the transformer and the capacitance between the second output terminal and the reference terminal. MOSFETs may be used for the first and second switches. Junction transistors may be used for the first and second switches. A first series circuit, having a first resistance connected in parallel with a first unidirectional conducting device, may be connected between the control input of the first switch and the second switch. A second series circuit, having a second resistance connected in parallel with a second unidirectional conducting device, may be connected between the control input of the second switch and the first switch. Junction transistors may be used for the first and second switches. A plurality of switches may be used to drive the transformer. A control terminal of each switch may be connected to reference a common signal reference for turning the switch ON and OFF. A first switch and a second switch in the plurality of switches may be used to respectively induce a magnetic flux in the drive transformer in a first and in a second direction when ON. The first and second switches may be operated in a series of control cycles each characterized by: (a) two ON intervals during which one of the first and second switches is ON; and (b) two OFF intervals during which both of the first and second switches is OFF and energy stored in the drive transformer is used to charge and discharge parasitic output capacitances of the plurality of switches, the switch circuitry, and a parasitic input capacitance of one or more power switching devices having control inputs connected across the first output terminal and the reference terminal. The drive circuitry may include a plurality of switches to drive the transformer. A control terminal of each switch may be connected to reference a common signal reference for turning the switch ON and OFF. A first switch and a second switch in the plurality of switches may be used to respectively induce a magnetic flux in the transformer in a first and in a second direction when ON. The first and second switches may be operated in a series of control cycles each characterized by: (a) two ON intervals during which one of the first and second switches is ON; and (b) two OFF intervals during which both of the first and second switches is OFF and energy stored in the drive transformer is used to charge and discharge parasitic output capacitances of the plurality of switches, the switch circuitry, and parasitic input capacitances of the first and second controlled switches. The first and second controlled switches may be configured as a pair of complementary power switching devices to drive a power transformer. A sub-interval may be provided during a portion of the OFF interval when the pair of complementary power switching devices is OFF. The first controlled switch and first switch may be integrated onto a first die and each may be provided with the same threshold voltage. The second controlled switch and second switch may be integrated onto a second die and each may be provided with the same threshold voltage.

In general, another aspect features an apparatus having a first integrated semiconductor device formed on a common die and having a plurality of FETs each having a gate, a source, and a drain, and the same threshold voltage. The first integrated semiconductor device includes a first switch section and a first clamp section. The first switch section includes one or more of the plurality of FETs connected in parallel. The first clamp section includes one or more of the plurality of FETs. First and second circuitry is connected respectively to the first switch and first clamp sections of the first integrated semiconductor device. The second circuitry is configured to be clamped when the clamp section is ON. The gates of the FETs in the first switch section and first clamp section are connected to a first gate terminal. The sources of the FETs in the first switch section and first clamp section are connected to a first source terminal. The clamp section clamps the second circuitry in response to turning ON of the switch section.

Implementations of the apparatus may include one or more of the following features. The gates of the FETs may be connected together within the first integrated semiconductor device and the first gate terminal may be a terminal of the first integrated semiconductor device. The gates of the FETs may be a common gate and the first gate terminal may be a terminal of the first integrated semiconductor device. The sources of the FETs may be connected together within the first integrated semiconductor device and the first source terminal may be a terminal of the first integrated semiconductor device. The sources of the FETs may be a common source and the first source terminal may be a terminal of the first integrated semiconductor device. The first integrated semiconductor device may also include the first gate terminal, the first source terminal, a switch drain terminal connected to the drains of the FETs in the first switch section, and a clamp drain terminal connected to the drains of the FETs in the first clamp section. The first integrated semiconductor device may be a four terminal device. The first integrated semiconductor device may be configured as a synchronous rectifier. The apparatus may include a second integrated semiconductor device formed on a common die and having a plurality of FETs each having a gate, a source, and a drain, and the same threshold voltage. The second integrated semiconductor device may have a second switch section and a second clamp section. The second switch section may include one or more of the plurality of FETs connected in parallel. The second clamp section may include one or more of the plurality of FETs. The gates of FETs in the second switch section and second clamp section may be connected to a second gate terminal. The sources of the FETs in the second switch section and second clamp section may be connected to a second source terminal. The second gate terminal may be clamped by the first clamp section and the first gate terminal may be clamped by the second clamp section. The FETs may be MOSFETs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 37A–37H show waveforms for the converter of FIG. 35.

FIG. 38 shows an equivalent circuit of a switch for use in the gate drive circuit of the converter of FIG. 35.

FIGS. 39A and 39B show alternative embodiments of switches using discrete components.

Like reference symbols in the various drawings indicate like elements.

DETAILED DESCRIPTION

Figure 1:
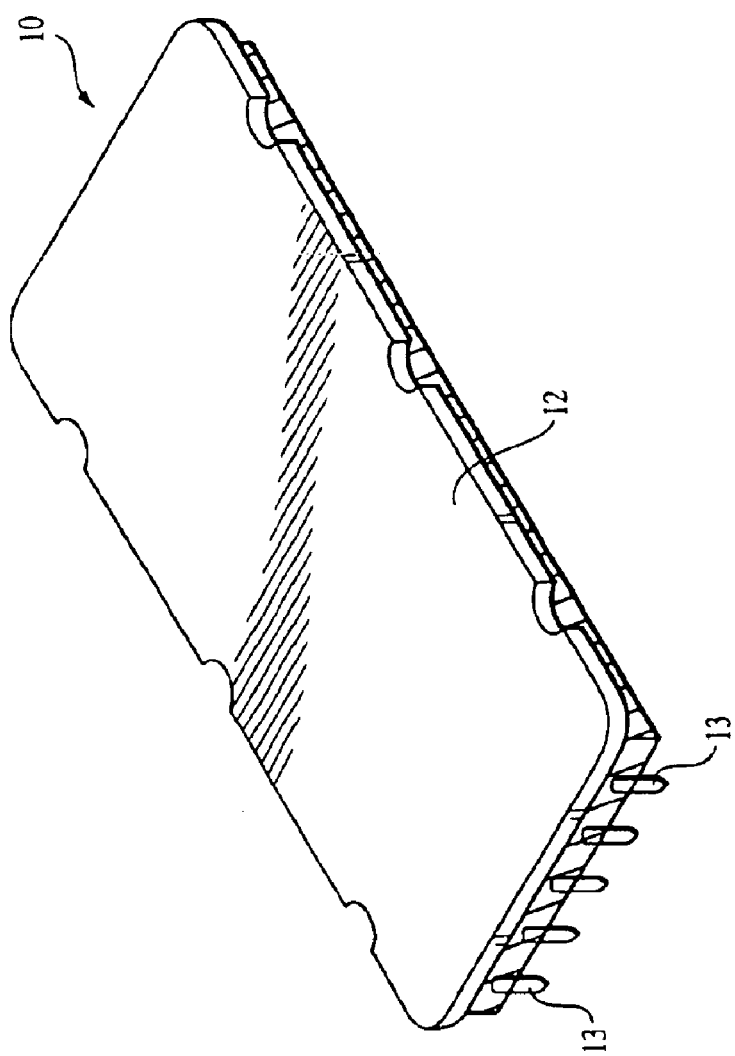
FIG. 1 shows a DC—DC power converter.
Figure 2A:
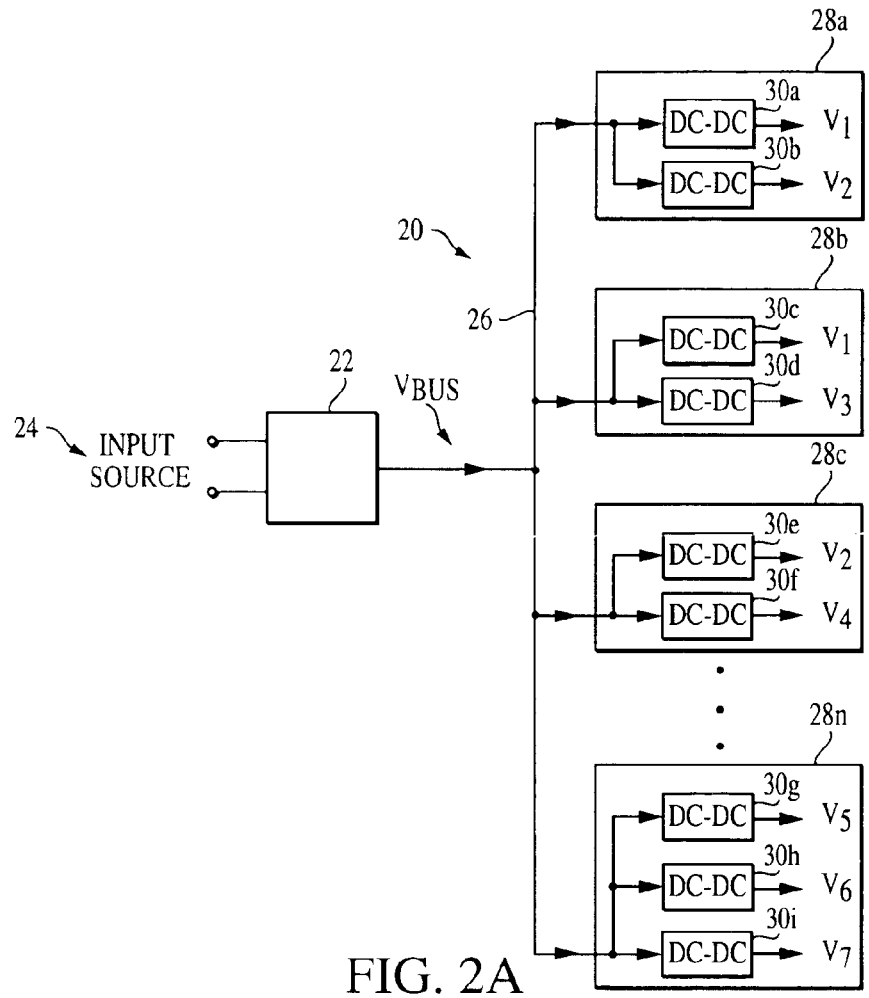
FIGS. 2A and 2B show block diagrams of prior art distributed power architectures.

A system 20 using the prior art distributed power architecture is shown in FIG. 2A. In the system, a front-end power processor 22 accepts power from an input source 24 and converts it into a bus voltage, $V_{bus}$, which is distributed over a distance via a distribution bus 26 to a number of separate electronic circuit subassembly PCBs 28a, 28b, 28c . . . 28n, each of which incorporates one or more DC—DC converters, e.g., DC—DC converters 30a . . . 30i. The bus voltage, $V_{bus}$, is delivered to the inputs of the DC—DC converters 30a . . . 30i and each DC—DC converter delivers regulated output voltages (e.g., voltages $V_1$ to $V_7$) for use by circuitry on the subassembly (not shown). Given that DC—DC converters provide a regulation function which enables them to operate over a range of input voltages, the voltage $V_{bus}$ will typically be an unregulated voltage or one which is regulated, but whose value does not control the output voltages (i.e., voltages $V_1$ to $V_7$) required by the system.

Figure 2B:
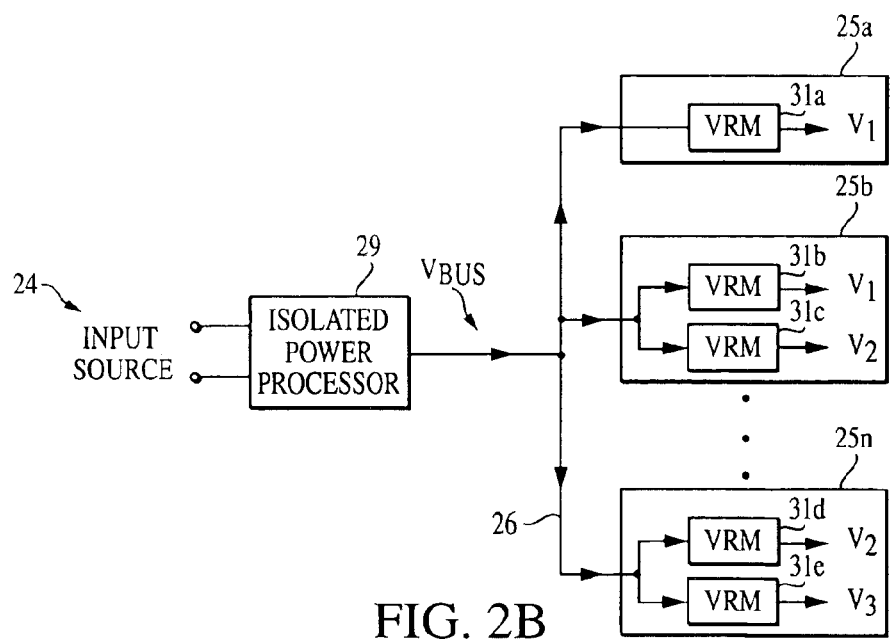

Another prior art DPA system is shown in FIG. 2B. In the system, an isolated front-end power processor 29 accepts power from an input source 24 and converts it into a bus voltage, $V_{bus}$, which is distributed over a distance via a distribution bus 26 to a number of separate electronic circuit subassembly PCBs 25a, 25b . . . 25n, each of which incorporates one or more non-isolated switching regulators, e.g., switching regulators 31a . . . 31e. The bus voltage, $V_{bus}$, is delivered to the inputs of the switching regulators 31a . . . 31e and each switching regulator delivers a regulated output voltage (e.g., voltages $V_1$ to $V_3$) for use by circuitry on the subassembly (not shown). In such a system, the non-isolated switching regulators are sometimes referred to as VRMs ("Voltage Regulator Modules") and one such VRM may be dedicated to power a single integrated circuit device. Given that switching regulators, or VRMs, provide a regulation function which enables them to operate over a range of input voltages, the voltage $V_{bus}$ will typically be an unregulated voltage or one which is regulated, but whose value does not control the output voltages (i.e., voltages $V_1$ to $V_3$) required by the system.

In cases in which the input source is an AC utility source, the front-end power processor 22 or the isolated power processor 29 will comprise rectification circuitry for converting the bipolar AC input voltage and current into unipolar form and may also comprise power-factor-correcting circuitry (neither of which are shown in the Figures).

Compared to the CPA architecture, the benefits of the DPA architecture of FIGS. 2A and 2B include distribution bus simplicity; flexibility in providing many different load voltages without modifying the underlying power distribution scheme or bus voltage $V_{bus}$ (i.e., by simply providing DC—DC converters with the appropriate output voltages); and minimization of interactions between regulated output voltages owing to variations in loads, bus voltage, distribution bus impedance and related factors.

There are, however, drawbacks to the DPA architecture. In the system of FIG. 2A, for example, incorporation of isolated DC—DC converters onto subassemblies uses up valuable board space; the height of the converters above the subassembly PCB sets a lower limit on spacing between subassemblies and interferes with the flow of cooling air over nearby components; and the DC—DC converters themselves dissipate heat which affects the temperature of nearby components and which must be removed from the region of the subassemblies. Furthermore, if a single DC—DC converter cannot provide adequate power or fault-tolerance for a particular output voltage, multiple DC—DC converters will need to be paralleled, creating additional complexity owing to the need to connect remote sense leads from each paralleled converter to a single, common, point and the need for additional circuitry within each paralleled converter to force power sharing among the units.

These drawbacks are compounded by trends toward higher circuit and systems densities and toward lower system voltages (e.g., to 2V, 1V and below) and the attendant relatively poorer efficiency, and higher dissipation, of the DC—DC converters needed to supply them. While the VRMs of FIG. 2B may have higher power density and efficiency than DC—DC converters, they can create ground-loop problems, owing to their lack of isolation, and they have limited voltage step-down capability (e.g., it is difficult to efficiently generate 1 Volt using a non-isolated VRM when operating from a 48 Volt bus). In either case, a significant compromise in point-of-load power density and efficiency results from the DPA system requirement that DC—DC converters and switching regulators be capable of handling arbitrary voltage transformation ratios and provide regulation over a wide range of input voltages. This architectural requirement forces imbalances in the duty cycles (as defined below) of switching elements and reduced transformer utilization in single stage DC—DC converters, limiting their power density and efficiency.

Figure 3A:
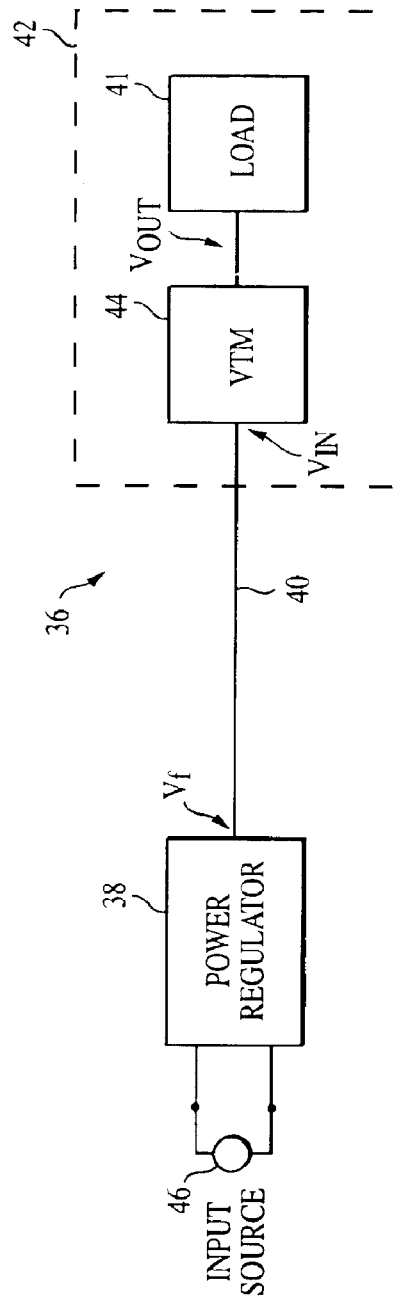
FIGS. 3A and 3B show block diagrams of examples of the factorized power architecture.

A system 36 using a new power distribution architecture, called "Factorized Power Architecture" ("FPA"), is shown in FIG. 3A. In the system 36, a front-end power regulator 38 at a first location accepts power from an input source 46 and converts it into a controlled bus voltage at its output, $V_f$, which is distributed over a distance via a "factorized" distribution bus 40 to a remotely located Voltage Transformation Module ("VTM") 44. The VTM comprises an isolation transformer (not shown) and transforms the voltage $V_f$ into a voltage $V_{out}$, for delivery to a load 41. Unlike the DC—DC converters 30 in the DPA of FIG. 2, a VTM in the FPA system may be designed to operate over a tailored, narrow range of input voltages enabling numerous efficiency and power density enhancing features to be deployed. In the preferred VTM architecture discussed in greater detail below, primary and secondary switching elements may be coupled to the primary and secondary windings of the VTM transformer to perform single stage power processing. The VTM may use balanced switching duty cycles in which each primary switching element of a complementary pair is on for essentially the same amount of time as its complement and each secondary switching element of a complementary pair is ON for essentially the same amount of time as its complement. Additionally, the VTM may operate at greater than 90 percent power conversion duty cycle (as defined below) which is indicative of the fraction of each converter operating cycle during which switches in the converter are enabled (as defined below) and power is being transferred from a primary to a secondary of the VTM transformer. The combination of balanced duty cycles and high power conversion duty cycles, coupled with a short converter operating period, may provide higher power conversion density, efficiency and ease of input/output filtering.

The VTM delivers a DC output voltage, $V_{out}$, which is a fixed fraction of the voltage, $V_{in}$, (nominally $V_f$) delivered to its input. The voltage transformation ratio or voltage gain of the VTM (which may be defined as the ratio, $K=V_{out}/V_{in}$ of its output voltage to its input voltage at a load current) is fixed by design, e.g. by the VTM converter topology, its timing architecture and the turns ratio of the transformer included within it. In certain practical implementations without a feedback loop, using non-idealized components, the effective output resistance of the VTM will cause some droop in output voltage as a function of load current as discussed further below. In a typical FPA application, the VTM 44 is placed on a subassembly 42, so that it is close within the subassembly to the load 41 which it powers, and the voltage $V_{out}$ is lower than the voltage $V_f$ so that power loss and voltage drop in the factorized bus 40 are minimized.

Owing to their fixed gain and effective output resistance, VTMs may be paralleled to operate from the same input voltage, $V_{in}$, nominally $V_f$, and support a common load, with inherent power sharing attributes. This avoids the need for a power sharing protocol and interface and a multiplicity of remote senses. In applications where the load is itself distributed, e.g. across a PCB, multiple VTMs may be separated from each other to remotely deliver individual fractions of the total load current and thus reduce the burden of busing high currents at low voltages, e.g. across power planes.

Figure 3B:
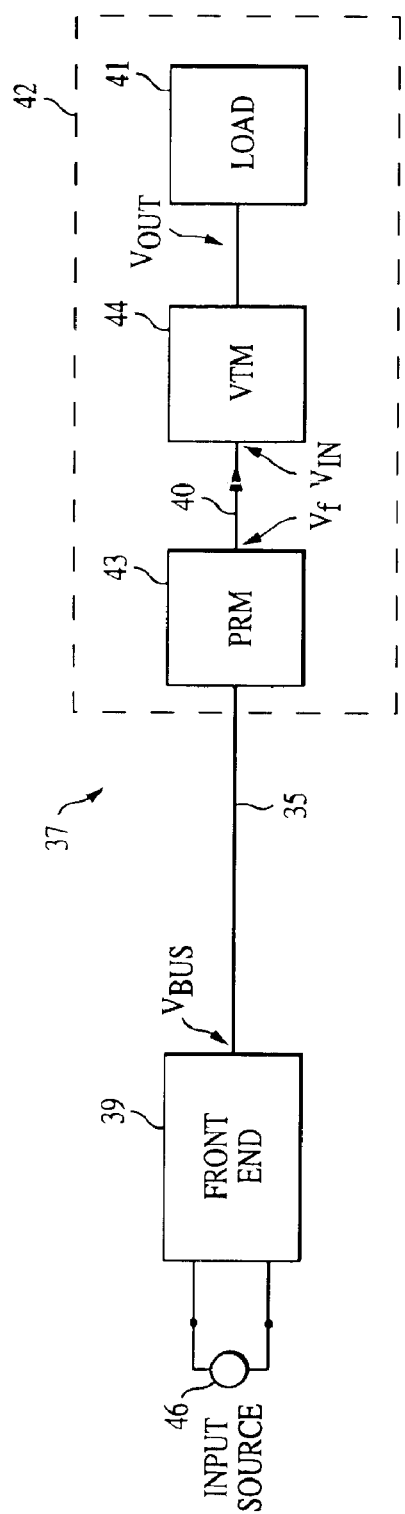

The new Factorized Power Architecture is very flexible. Another configuration of a FPA, system 37, is shown in FIG. 3B. In the Figure, the front-end power regulator 38 of FIG. 3A is factorized into two separate assemblies, a front-end assembly 39 and a power regulator module 43 ("PRM") which may be non-isolated. The front-end assembly accepts power from an input source 46 and converts it into a bus voltage at its output, $V_{bus}$, which is distributed over a distance via a distribution bus 35 to the input of the PRM. The PRM converts $V_{bus}$ to a controlled voltage, $V_f$, which is distributed over a distance by the factorized bus 40, to the input of a VTM 44. The VTM 44 provides single-stage power processing through a transformer and switching elements and delivers a DC output voltage, $V_{out}$, which for a certain load current, is essentially a fixed fraction of the voltage, $V_{in}$ (nominally $V_f$) delivered to its input. The PRM 43 may be located relatively far from the front-end power regulator and/or relatively close to the VTM 44. Other VTMs may be powered from the same PRM 43 to operate in parallel with VTM 44, as discussed above, or to provide additional output voltages, as discussed below. VTMs may also be powered from DC output voltages within the power system, including output voltages generated by other VTMs or other types of converters.

The PRM of FIG. 3B may be embodied as a buck converter, a boost converter or a buck-boost converter. Likewise, in FIGS. 3A and 3B, if the input source 46 is a DC source, the front-end power regulator 38 or the front-end assembly 39 may also be embodied as a buck converter, a boost converter, or a buck-boost converter. A preferred buck-boost DC—DC conversion topology suitable for use as PRMs is described in Vinciarelli, "Buck-Boost DC—DC Switching Power Conversion," U.S. patent application Ser. No. 10/214,859, filed Aug. 8, 2002, assigned to the same assignee as this application and incorporated by reference.

Figure 4A:
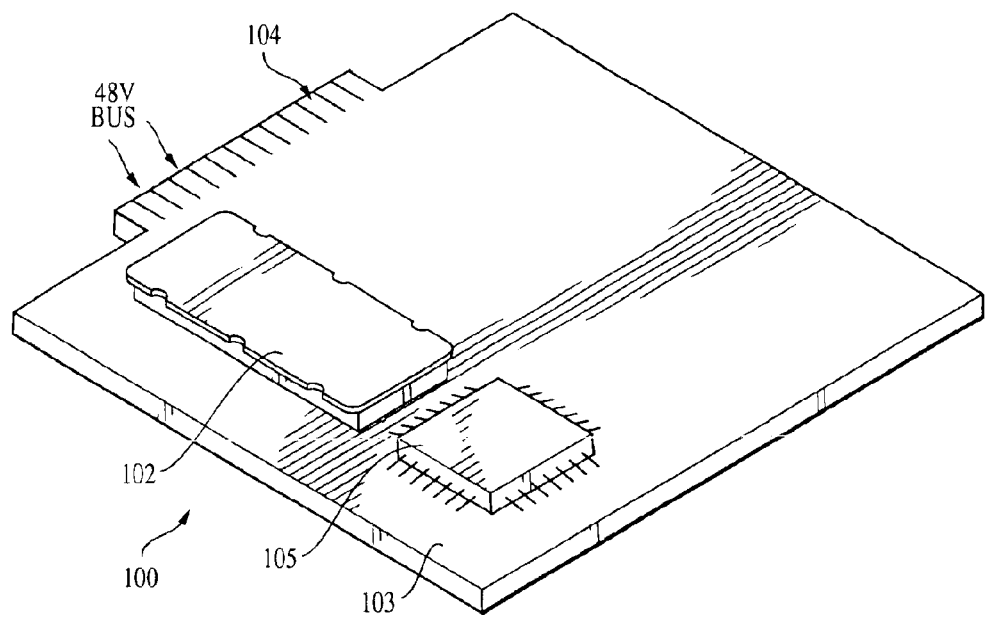
FIG. 4A shows a perspective view of a printed circuit board assembly with a point-of-load DC—DC converter.

Some of the benefits of the invention over prior art architectures may be illustrated with reference to FIGS. 4A, 4B and 4C. FIG. 4A shows an example of a PCB subassembly 100 for use in a system using the prior art DPA approach. The PCB subassembly may include a DC—DC converter 102 (e.g., the type of modular DC—DC converters manufactured by Vicor Corporation) mounted to a PCB 103, that converts a nominal bus voltage, e.g. 48V, (delivered to the card via an edge connector 104) to a 3.3V output and that is rated to deliver up to 150 Watts of power to integrated circuit 105 and, possibly, other electronic circuitry (not shown) on the PCB. The length and width of the DC—DC converter may be 2.28 inch (57.6 mm) and 1.45 inch (36.8 mm), respectively, and its height above the surface of the PCB may be 0.5 inch (12.7 mm). The efficiency of such a converter may typically range up to 90%. Thus, the DC—DC converter may use a PCB area of 3.3 square-inches (21.2 square-cm); occupy 1.65 cubic-inches (26.9 cubic-cm) of volume; and, at its full rated load of 150 Watts, exhibit a power density of 91 Watts/cubic-inch (5.6 Watts/cubic-cm) and dissipate more than 16 Watts of heat into the environment of the subassembly 100.

Figure 4B:
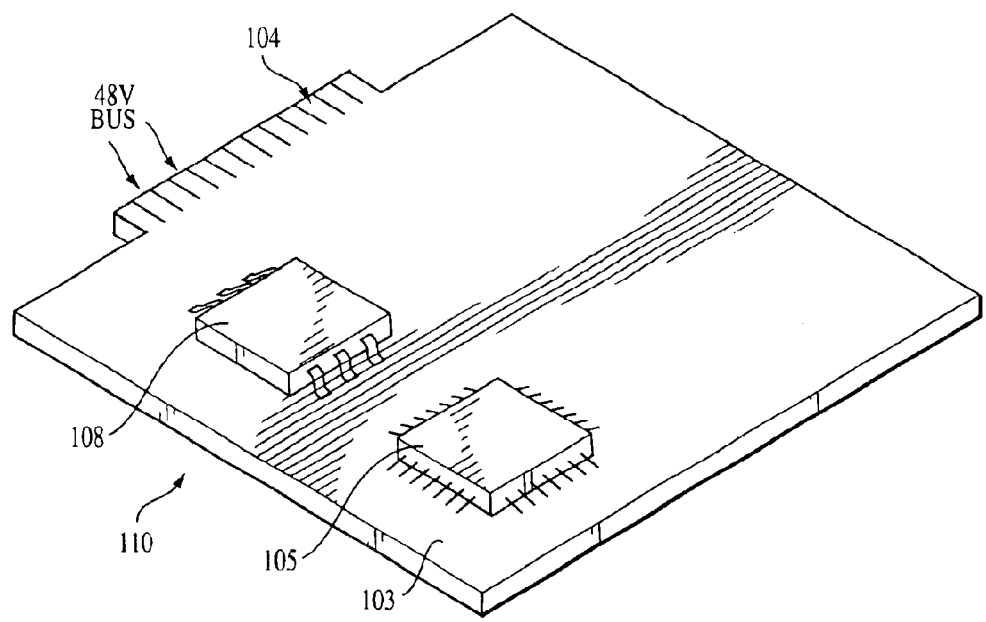
FIG. 4B shows a perspective view of a printed circuit board assembly with a point-of-load voltage transformation module.

FIG. 4B shows an example of a PCB subassembly 110 for use in a system using the FPA shown in FIG. 3A. Every aspect of the PCB subassembly 110 is the same as that of the PCB subassembly 100 of FIG. 4A, except that the PCB subassembly 110 of FIG. 4B incorporates a VTM 108 instead of a DC—DC converter. A VTM operating in the FPA system can be made smaller than a DC—DC converter of equivalent output power, and therefore occupies less volume and its height above the surface of the PCB subassembly may be lower. For example, a VTM for converting a controlled 48V bus voltage to deliver up to 150 Watts at 3.3V output may be fit into a package (e.g., an IC sized package) measuring approximately 1.35 inch (34.3 mm) square and approximately 0.2 inch (5.1 mm) high over the surface of the PCB. The peak efficiency of such a VTM within its normal operating range may be approximately 96%. Thus, the VTM may use a PCB area of 1.82 square-inches (11.8 square-cm); occupy 0.36 cubic-inches (6.0 cubic-cm) of volume; and, at its full rated load of 150 Watts, exhibit a power density of 416 Watts/cubic-inch (25.0 Watts/cubic-cm) and dissipate only 6 Watts of heat into the environment of the subassembly 110.

Figure 4C:
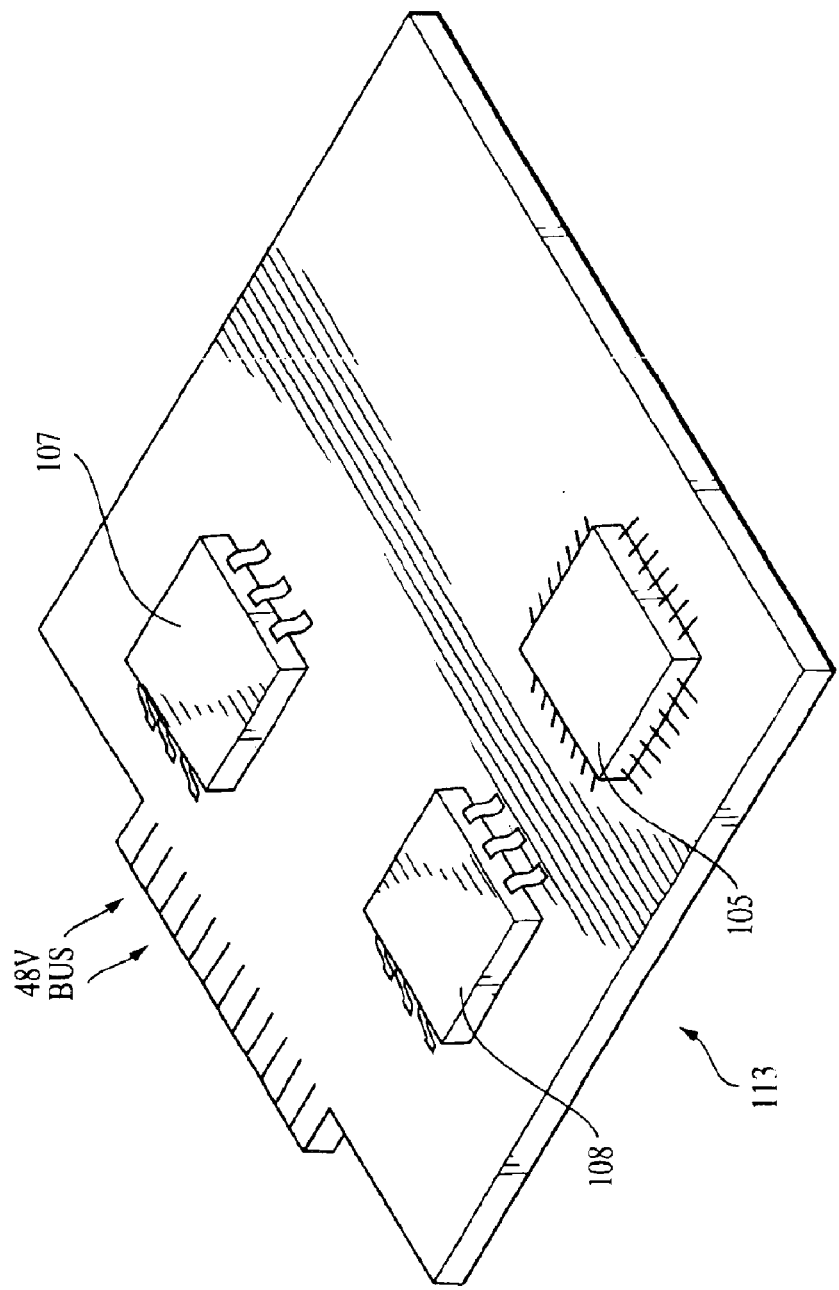
FIG. 4C shows a perspective view of a printed circuit board assembly with a power regulation module and a point-of-load voltage transformation module.

FIG. 4C shows an example of a PCB subassembly 113 for use in a system using the factorized power architecture shown in FIG. 3B. Every aspect of the PCB subassembly 113 is the same as that of the PCB subassembly 100 of FIG. 4A, except that the PCB subassembly 113 of FIG. 4C incorporates a VTM 108 and a PRM 107 instead of a DC—DC converter. By separating the PRM from the VTM, a source of heat may be removed from the point of load and higher power density may be achieved at the point of load with easy to manufacture, cost-effective components.

Figure 5A:
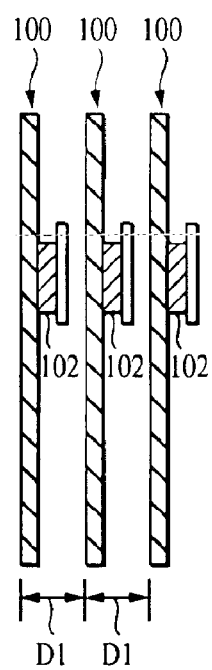
FIG. 5A shows an end view of printed circuit board assemblies incorporating DC—DC converters mounted side-by-side.
Figure 5B:
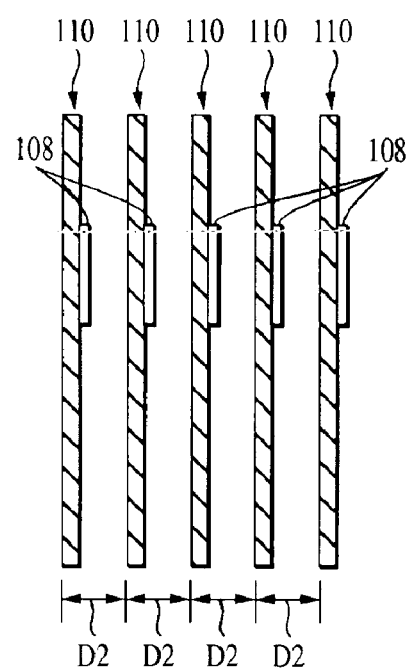
FIG. 5B shows an end view of printed circuit board assemblies incorporating point-of-load voltage transformation modules mounted side-by-side.

As shown by the examples of FIGS. 4B and 4C, the VTM (or PRM and VTM) of the FPA requires significantly less area on the PCB subassembly 110 than the DC—DC converter of the DPA system, leaving more board area for electronic circuitry. The VTM (or PRM and VTM) dissipates significantly less power, easing cooling requirements for the assembly 110 (113). Thermal management is also made easier because the lower height of the VTM 108 (or PRM 107 and VTM 108) above the surface of the board offers less interference to airflow over nearby components. The reduction in height of the VTM (or PRM and VTM) relative to the DC—DC converter also allows PCB subassemblies to be mounted closer together in a system, thereby affording an improvement in overall system density. For example, FIGS. 5A and 5B show end views of groups of several PCB subassemblies as they might appear when mounted side-by-side within a rack mounted electronic system (not shown). FIG. 5A shows the PCB subassemblies 100 of FIG. 4A. FIG. 5B shows the PCB subassemblies 110 of FIG. 4B. Assuming, in each instance, that the DC—DC converters 102 and VTMs 108 are the tallest components on their respective subassemblies 100, 110, then the pitch, D2, between the PCB subassemblies of FIG. 5B can be made 0.3 inch (7.6 mm) smaller than the pitch, D1, between the PCB subassemblies of FIG. 5A, thus potentially doubling system density.

Figure 6:
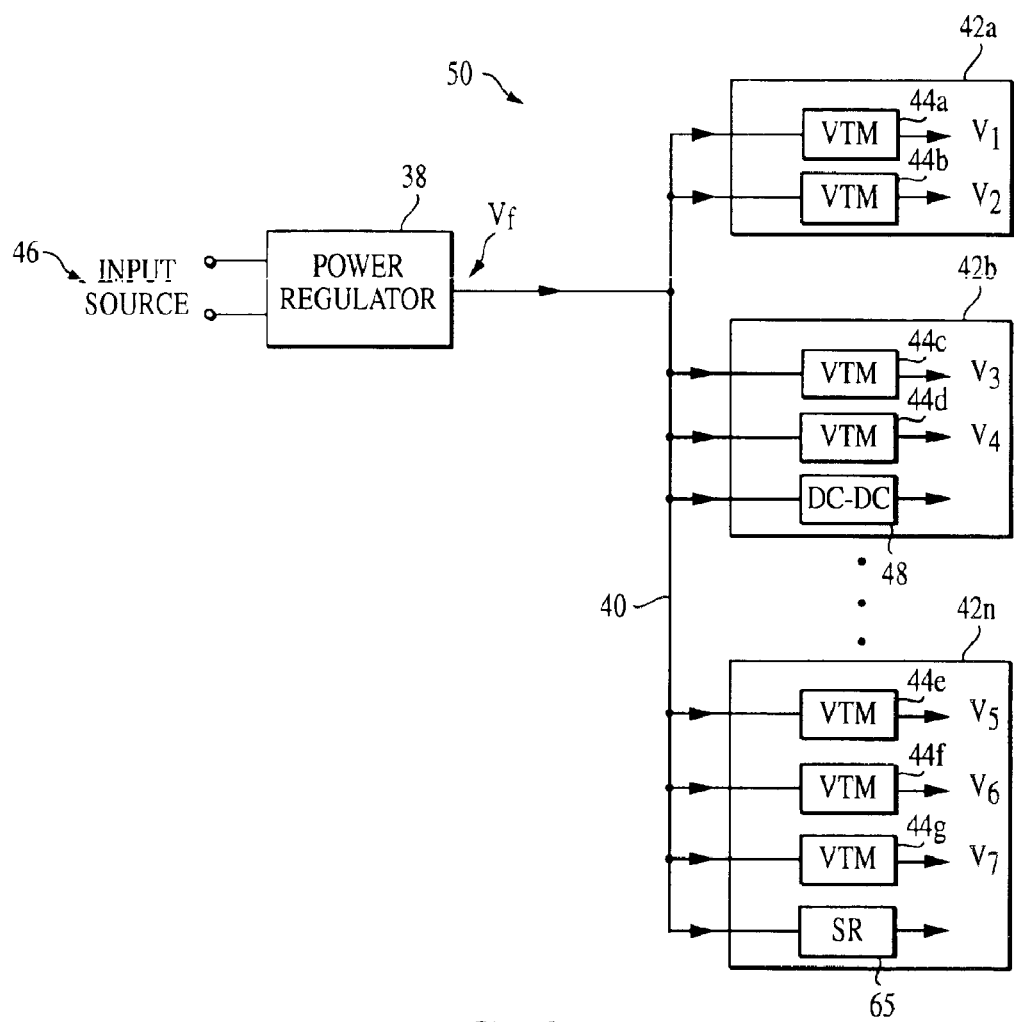
FIG. 6 shows a block diagram of another example of the factorized power architecture.
Figure 7:
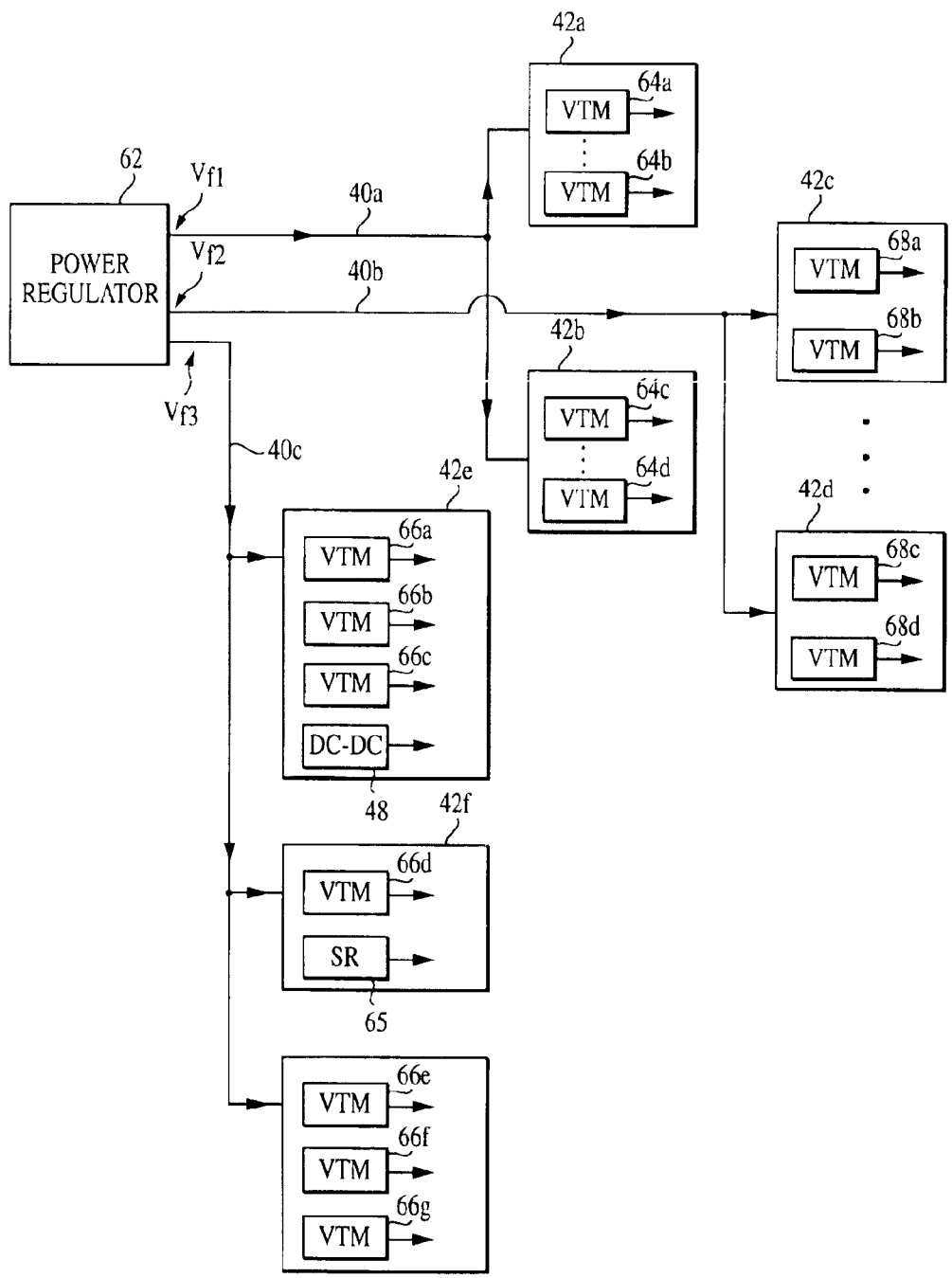
FIG. 7 shows a block diagram of another example of the factorized power architecture.

Alternate embodiments of the FPA are shown in FIGS. 6, 7 and 8. In FIG. 6 the system 50 is an expanded version of the system 36 of FIG. 3. A front-end power regulator 38 accepts power from an input source 46 and converts it into a controlled bus voltage, $V_f$, at its output which is distributed over a distance via a factorized distribution bus 40 to a number of separate electronic circuit subassembly PCBs 42$a$ through 42$n$, each of which incorporates one or more VTMs, e.g., VTMs 44$a$ through 44$g$. The VTMs provide load voltages (e.g., voltages $V_1$ to $V_7$) that power loads (not shown) on the subassembly PCBs. In addition to VTMs, the subassembly PCBs may contain DC—DC converters (e.g., DC—DC converter 48) and/or Switching Regulators (e.g., Switching Regulator 65) and/or Charge Pumps (not shown) to provide certain output voltages.

FIG. 7 shows an example of an FPA system in which a multiple-output power regulator 62 delivers three different controlled bus voltages $V_{f1}$, $V_{f2}$, and $V_{f3}$ to three factorized distribution buses 40a, 40b, and 40c. Each of the three factorized buses is connected to one or more subassemblies. In the Figure, the controlled voltage $V_{f1}$ is delivered to a first factorized bus 40a, which distributes power to VTMs 64a–64d on subassemblies 42a and 42b; the controlled voltage $V_{f2}$ is delivered to a second factorized bus 40b, which distributes power to VTMs 68a–68d on subassemblies 42c and 42d; and the controlled voltage $V_{f3}$ is delivered to a third factorized bus 40c, which distributes power to VTMs 66a–66g on subassemblies 42e, 42f, and 42g. In addition to VTMs, the subassemblies may contain DC—DC converters (e.g., DC—DC converter 48) and/or Switching Regulators (e.g., Switching Regulator 65) and/or Charge Pumps (not shown) to provide certain output voltages.

Figure 8A:
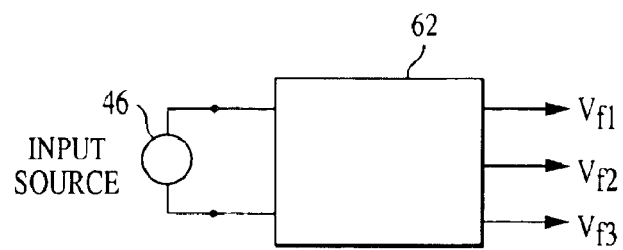
FIGS. 8A through 8C show block diagrams of multiple-output power regulators for use in the factorized power architecture.
Figure 8B:
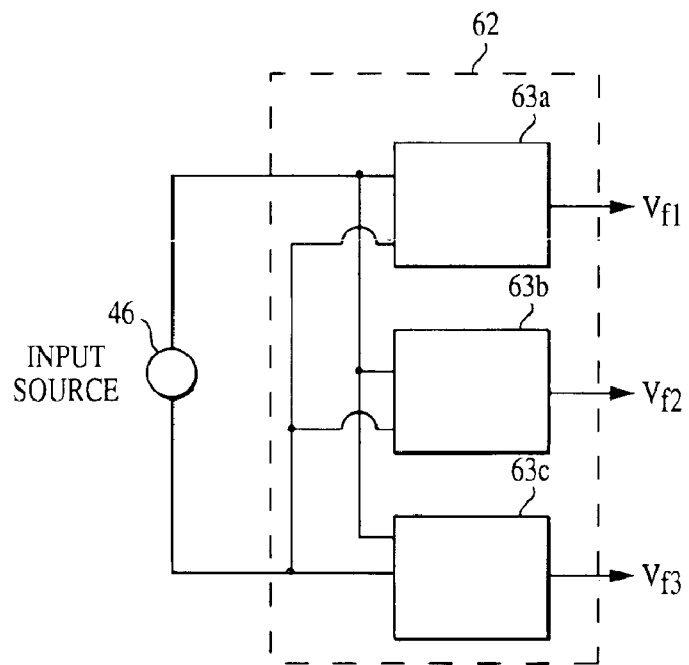
Figure 8C:
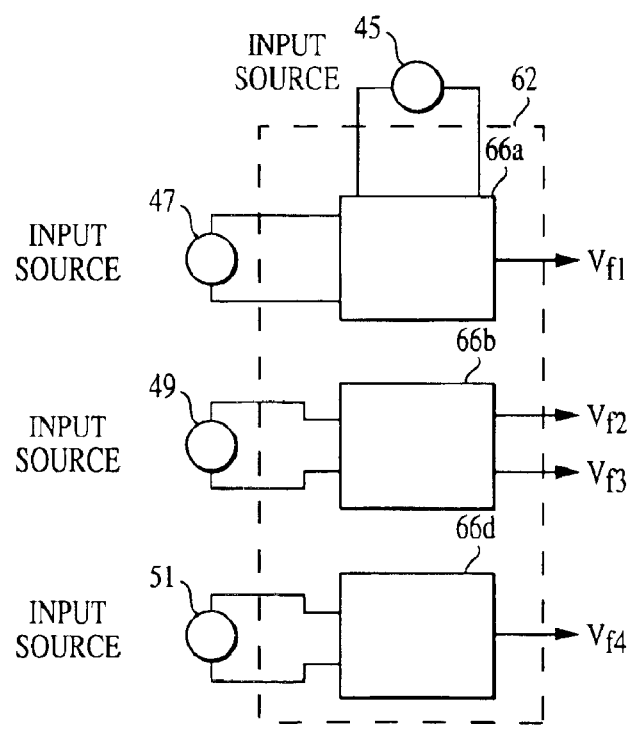

The multiple-output power regulator 62 of FIG. 7 may be embodied in different structures, some examples of which are illustrated in FIGS. 8A, 8B, and 8C. In FIG. 8A, a multiple-output power regulator 62 consists of a multiple output switching regulator that operates off of a single input source 46 and delivers controlled outputs, $V_{f1}$, $V_{f2}$, $V_{f3}$, for delivery to factorized distribution buses. In FIG. 8B, a multi-output regulator 62 comprises several independent power converters 63a, 63b, 63c, which operate off of a single input source 46. Each of the converters delivers a controlled output for delivery to a factorized distribution bus. In FIGS. 8A and 8B the input sources may be either AC or DC sources. In FIG. 8C, the multi-output regulator comprises independent regulators 66a, 66b, 66c which operate off of one or more different input sources. For example, independent regulator 66a operates off of two sources 45, 47, one of which might be an AC source and the other a DC source, such as a battery backup source. The other two independent regulators 66b, 66c are shown operating from independent sources 49, 51. These and a wide variety of other combinations of sources and regulating power supplies can be configured to generate one or more controlled bus voltages for distribution in a FPA system.

Application of FPA is not limited to rack mounted electronic systems. For example, with vehicular electrical power consumption increasing, there has been a trend toward higher bus voltages in vehicles, such as the emerging 42 Volt bus standard in automotive power systems. Factorized power architecture is a cost-effective, lightweight, and energy-efficient solution for providing point-of-load conversion in such applications (e.g., to efficiently power 12 volt loads from a 42 V factorized bus). Other examples of applications which will benefit from the density and efficiency advantages of the FPA may be identified in other markets for electronic products, including, in particular, consumer, medical, industrial and military products.

A DC—DC converter in a prior art DPA system includes power train and control circuitry for regulating the output voltage as the converter input voltage varies over a relatively wide range (e.g., the maximum input operating voltage is typically 2 or more times the minimum input operating voltage) and requires use of components which are capable of operation at full rated load over the entire input voltage range. Specifically, regulation circuitry takes up space in the converter and therefore reduces power density relative to a device without regulation circuitry. As significantly, the characteristics of power train components needed to accept a relatively wide input operating voltage range also reduce power density and efficiency. For example, in certain types of single stage power converters, output rectifiers must be selected to withstand peak voltages associated with operation at maximum input operating voltage and, at the same time, be able to carry an unbalanced share of the load. Primary-side switching elements need to be selected using similar constraints and the presence of significant dead times, during which power is not delivered across the transformer adds to the burden of these elements. In order to simultaneously satisfy both high current and high voltage requirements, switching elements require a large semiconductor die, which will exhibit higher parasitic capacitance and switching losses. If, instead, a smaller die is used, conduction losses will be higher. The ability to accommodate large changes in input voltage also compromises the size or efficiency of energy storage or reactive components, such as transformers.

In DC—DC converters in which a DC-to-DC transformer stage is cascaded with a pre-regulator, voltage and current stresses on rectifiers and switches in the DC-to-DC transformer stage are limited owing to the constancy of the voltage delivered by the pre-regulator, but the components in the pre-regulator must be selected to accept wide input voltage variations and the combination of the pre-regulator with the DC-to-DC transformer stage reduces the power density of the unit. Thus, in cascaded DC—DC converters, as in single stage converters, operation over a wide input voltage range generally translates into limited power density and efficiency at the point-of-load.

In general, the power density, efficiency, and flexibility of a point-of-load power converter, and the power-sharing performance of paralleled arrays of such converters, may be improved by factorizing away the power conversion functions associated with voltage regulation and by providing only essential functions at the point-of-load, such as voltage transformation and/or isolation. Assuming comparable switching frequencies with comparable power conversion topologies and timing architectures, the adoption of the Factorized Power Architecture, may double the power density and efficiency of point-of-load converters relative to the prior art Distributed Power Architecture. VTMs may also provide greater overall performance (e.g., bandwidth), scalability (e.g., inherent power sharing) and reliability (e.g., lower complexity, fault tolerance) at a significantly lower cost per Watt delivered to the point-of-load. These advances may be achieved by optimizing power conversion topologies and timing architectures for use within the VTM.

Although a VTM for use in a FPA system can be based upon any prior art DC-to-DC transformer topology, certain VTM topologies may be superior to others with respect to performance characteristics, including: power density, conversion efficiency, output impedance and "droop" (i.e., variations in output voltage with variations in loading), transient response, radiated noise, and conducted emissions at input and output. High power density and conversion efficiency may be achieved in both half-bridge and full-bridge pulse width modulated ("PWM") topologies by incorporating a ZVS architecture. However, the equivalent circuit of a PWM converter includes the total equivalent series resistance of the circuit plus the impedance of a leakage inductance component serially interposed between the input source and the load. Mweene, ibid. In a VTM, this impedance would impair the VTM open-loop regulation by causing the output voltage to droop as the load is increased (by, e.g., 5%, or more, as the load varied over its full range).

Similarly, high efficiency and power density can be achieved with Frequency Modulated ("FM") quasi-resonant or resonant converter topologies by incorporating a ZCS timing architecture at frequencies below resonance or, alternatively, a ZVS timing architecture at frequencies above resonance. However, here too, the equivalent circuit includes the total equivalent series resistance of the circuit plus the capacitive or inductive impedance of the resonant circuit at the operating frequency. In both cases, with PWM and FM converter topologies, the output impedance of the converter, and its droop characteristics, are degraded by the presence of reactive impedance standing in the way of achieving the low output impedance preferred for a VTM.

A preferred converter topology and timing architecture for the VTMs of the FPA, which will be generally referred to as a Sine Amplitude Converter ("SAC") topology, has many advantages over prior art DC-to-DC transformer topologies. The SAC topology is nominally operated at resonance so that the reactive impedances of the elements of the resonant tank cancel each other out. The SAC uses a resonant topology at resonance so that the impedance of the resonant circuit becomes essentially resistive, minimizing the output impedance and open-loop resistance of the converter, and thus minimizing open-loop voltage droop as a function of changing load. Greater consistency in open-loop DC output resistance, owing to the elimination of dependency on reactive impedances, gives rise to fault tolerant power sharing attributes which are particularly desirable in applications in which multiple, paralleled, VTMs are operated as a power sharing array.

SAC converters are capable of essentially pure sinusoidal waveforms, thus optimizing spectral purity, and hence the converter's conducted and radiated noise characteristics. The SAC control architecture adapts to varying output loads by varying the amplitudes of the voltage and current waveforms while preserving the essentially sinusoidal character of the resonant components. The timing architecture of the SAC topology supports ZVS operation of the primary switches and ZCS and ZVS operation of the secondary switches, virtually eliminating switching losses in the primary switching elements and secondary switching elements, or rectifiers, particularly synchronous rectifiers, enabling higher switching frequencies and higher converter power density and efficiency. Sine Amplitude Converters provide the best combination of attributes to support the requirements of VTMs and high performance DC—DC converters.

Figure 9:
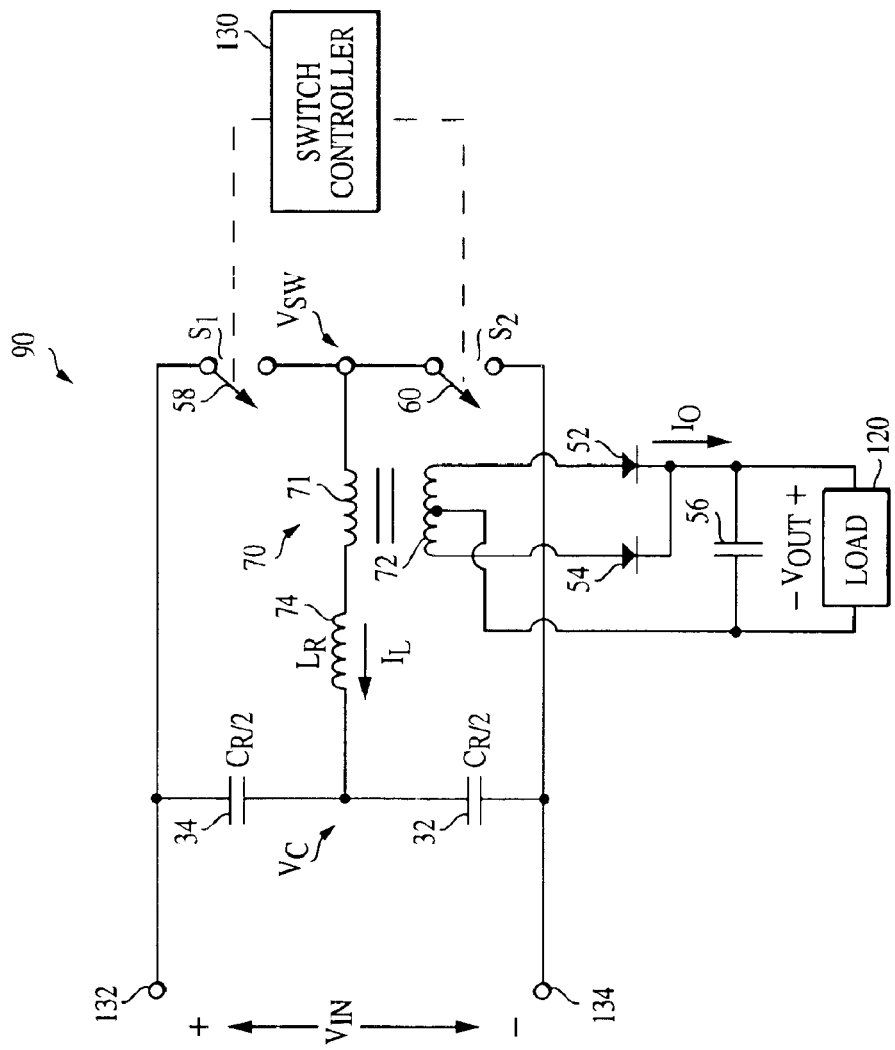
FIG. 9 shows a schematic of a sine amplitude topology for use in a voltage transformation module.

A first SAC topology 90 is shown in FIG. 9. This topology, incorporating a sine amplitude control architecture, enables high operating efficiency, high power density, low noise and low output impedance. In FIG. 9, the SAC comprises a half-bridge series resonant converter controlled by a switch controller 130. Power is delivered to the SAC at an input voltage $V_{in}$ and is delivered to a load 120 at a voltage $V_{out}$. The half-bridge resonant converter comprises primary switches 58 and 60; a resonant circuit including resonant capacitors 32 and 34 of value $C_R/2$ (resulting in an equivalent total resonant capacitance equal to $C_R$) and resonant inductor 74, of value $L_R$; and transformer 70, with primary winding 71 and center-tapped secondary winding 72. In general, the resonant inductance $L_R$ may comprise, in whole or in part, the leakage inductance of the transformer 70. As discussed below, in preferred embodiments the resonant inductance 74 may consist entirely of the transformer leakage inductance. The magnetizing inductance of the transformer may be set to a relatively low value to facilitate energy-recycling and efficient ZVS operation. For switching frequencies above 1 MHz, the effective permeability of the transformer core may be below 100, allowing selection of low-loss ferrite materials. The characteristic resonant frequency of the resonant circuit, and thus the series-resonant converter, is $f_R=1/(2\pi sqrt(C_R*L_R))$ A full-wave rectifier, comprising diodes 52 and 54, may be connected between the secondary winding 72 and the storage capacitor 56 and load 120. Storage capacitor 56 integrates the pulsating current $I_o$ and smoothes the voltage across the load, $V_{out}$. As further described below, the switch controller 130 operates the switches so that the SAC 90 operates at an essentially constant switching frequency over its normal range of loads. The controller's timing architecture provides ZVS operation of the primary switches and ZCS and ZVS operation of the secondary switches.

Figure 10A:
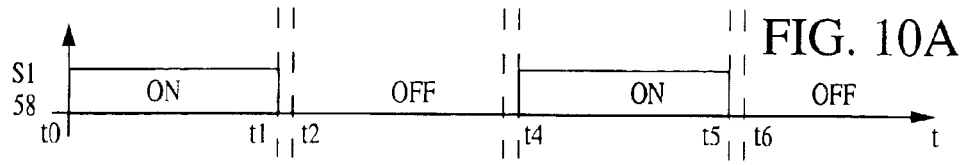
FIGS. 10A through 10H show waveforms for the topology of FIG. 9.
Figure 10B:
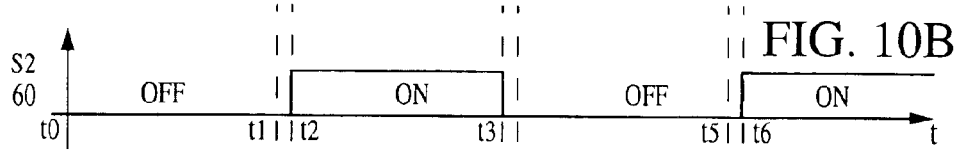
Figure 10C:
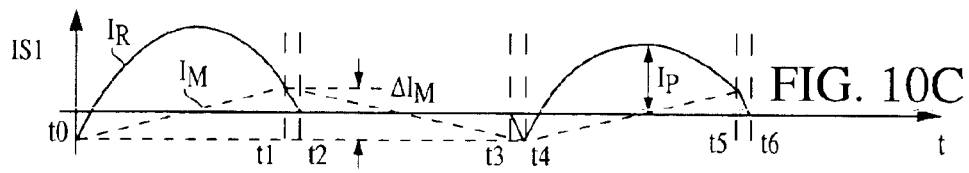
Figure 10D:
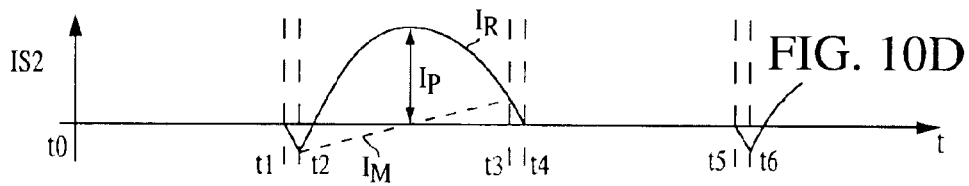
Figure 10E:
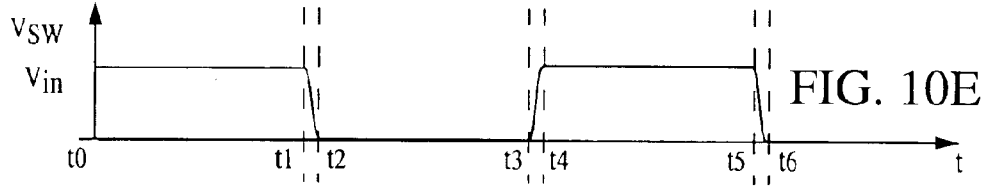
Figure 10F:
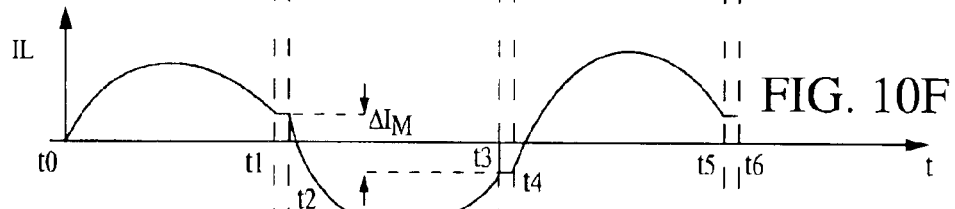
Figure 10G:
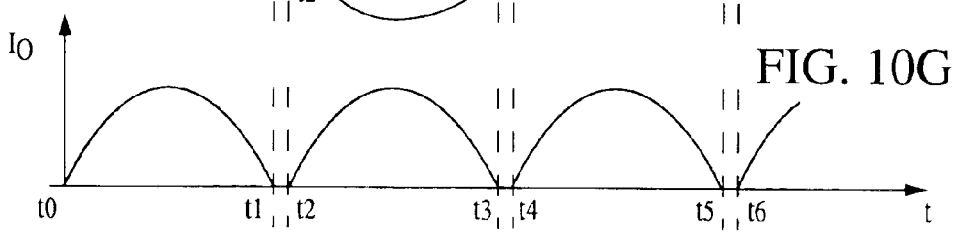
Figure 10H:
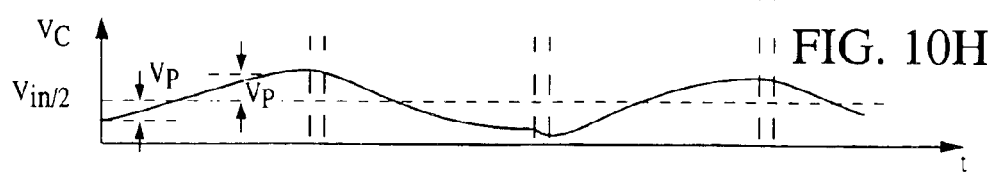
Figure 11:
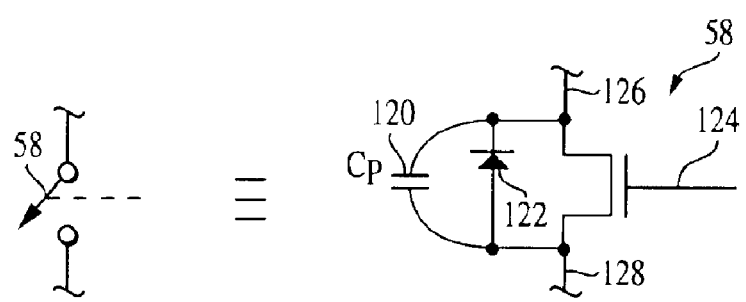
FIG. 11 shows a MOSFET equivalent circuit model.

Steady state operation is explained with reference to FIG. 9 and the waveforms of FIG. 10. The primary switches 58 and 60 may be MOSFET devices (or alternative devices, e.g., GaAs power switches), which, as illustrated in FIG. 11, may comprise a body diode 122 and parasitic capacitance 120. Signals delivered to the gate terminal 124 of the MOSFET (by the switch controller 130) control the conductivity of the MOSFET channel (currents in the body diode 122 and parasitic capacitance 120 are not under control of the gate terminal). The storage capacitor 56 is sufficiently large so that the voltage across it is essentially constant and equal to $V_{out}$ throughout each converter operating cycle. Voltage drops in switches and diodes, when conducting, are assumed to be zero for part of this analysis. The turns ratio of the transformer, which is the number of secondary turns divided by the number of primary turns, is $N_s/N_p$. The input voltage, $V_{in}$, is assumed to be constant. As used herein, the terms "closed," "ON" and "enabled," as applied to a switch, mean that the switch is enabled to conduct current which it could otherwise block and the terms "open," "OFF" and "disabled" mean that a switch is not ON. As defined herein, the term "duty cycle," as applied to a switch in a switching power converter, is defined as the fraction of the converter operating cycle during which the switch is enabled.

In steady state operation, the average value of $V_c$ will be nominally $V_{in}/2$ (i.e., one half of the SAC input voltage, $V_{in}$). The converter uses a series of converter operating cycles (e.g., converter operating cycle $t_0$–$t_4$ in FIG. 10) to convert power from the input for delivery to the output. During each power transfer interval (e.g., time periods $t_0$ to $t_1$ and $t_2$ to $t_3$ in FIG. 10) the resonant circuit is driven (by primary switches 58, 60) with an equivalent voltage source equal essentially to $V_{in}/2$. A short energy-recycling interval may follow each power transfer interval to allow recycling of energy stored in capacitive elements and a reduction in switching losses. As shown in FIG. 10, the converter operating cycles have a period (i.e., the converter operating period, $T_{op}=t_4-t_o$), that is nominally greater than the characteristic resonant period, $T_R=2\pi*sqrt(C_R*L_R)$, in an amount equal to the sum of the durations of the energy-recycling intervals.

At time $t_0$, switch 58 is closed (FIG. 10A) by the switch controller 130. Between times $t_0$ and $t_1$, a current, $I_{s1}$ (FIG. 10C), flows in the circuit formed by switch 58, transformer primary 71, resonant inductance 74 and resonant capacitors 32 and 34. As shown in FIG. 10C, the current $I_{s1}$ comprises a resonant portion, $I_r$, which rises and falls essentially sinusoidally at the characteristic resonant frequency, $f_R$, and a magnetizing current portion, the peak-to-peak fluctuation of which is approximately equal to $V_{in}*(t_1-t_0)/(2*L_M)$, where $V_{in}$ is the SAC input voltage and $L_M$ is the magnetizing inductance of the transformer 70. During the interval $t_0$ through $t_1$ the current in the resonant inductance, $I_L$ (FIG. 10F), is essentially equal to $I_{s1}$.

At time $t_1$, the value of the resonant portion of the current $I_{s1}$ returns to zero, the secondary rectifier current $I_s$ is essentially zero and switch 58 is opened by the switch controller 130, ending the power transfer interval. During an energy-recycling interval, with switches 58 and 60 open (e.g., intervals $t_1$–$t_2$ and $t_3$–$t_4$ in FIG. 10), the transformer magnetizing current may be used to charge and discharge the parasitic capacitances of the switches (e.g., capacitance 120, FIG. 11) and other circuit parasitic capacitances, causing the voltage $V_{sw}$ across switch 60 (FIG. 10E) to be reduced. The rate of change of voltage across the disabled switch during the energy-recycling interval increases in inverse proportion to the magnetizing inductance of the transformer. If the magnetizing current is sufficiently large and the time duration of the energy-recycling interval is sufficiently long, the voltage across the switch may be driven to zero (or essentially zero) volts for ZVS, as shown in FIG. 10E at time $t_2$. Should the energy-recycling interval extend beyond the time necessary to allow the voltage to be reduced to zero, the body diode 122 (FIG. 11) of switch 60 will carry the transformer magnetizing current until switch 60 is turned ON, thereby holding the switch voltage nominally at zero volts. In the case where the controller maintains energy-recycling intervals long enough for ZVS, the energy-recycling intervals may be referred to as ZVS intervals. Given that the ON time of the primary switches is essentially independent of load and that the SAC input voltage is essentially constant, the peak magnitude of the magnetizing current at the ends of the power transfer intervals will also be essentially fixed and independent of load. Therefore, the length of the energy-recycling interval necessary to allow the switch voltage to reach zero will also be essentially independent of load, and ZVS may be achieved using an energy-recycling interval of constant duration.

At time $t_2$, switch 60 is turned ON (FIG. 10B) by the switch controller 130. Because the voltage across switch 60 is reduced relative to $V_{in}$, or, for sufficiently low values of magnetizing inductance and long energy-recycling intervals, essentially zero, and because the secondary rectifier current is essentially zero at turn ON and turn OFF, both primary and secondary switching losses are essentially eliminated. Operation of the SAC 90 between times $t_2$ and $t_3$ is the same as between times $t_0$ and $t_1$, except that a reverse current ($I_{s2}$, FIG. 10D) flows in inductor 74 and switch 60. The mirroring of magnetizing current during the second power transfer interval, $t_2$–$t_3$, resets the core of the transformer.

At time $t_3$ the value of the resonant portion of the current 1,2 returns essentially to zero and switch 60 is opened by the switch controller 130. During the energy-recycling interval, between times $t_3$ and $t_4$, both switches 58 and 60 are OFF and the flow of magnetizing current will charge and discharge parasitic capacitances so that the subsequent turn ON of switch 58, at time $t_4$, can also be accomplished essentially without loss, thus completing a full cycle.

Use of magnetizing current to effect ZVS of primary switches upon essential completion of the resonant half cycles allows commutation of secondary switching elements, or rectifiers, at essentially zero current and zero voltage without substantial increase of the root mean square ("RMS") current (and conduction losses) in primary switches. The essentially sinusoidal variation of the current $I_L$ and the AC component of the voltage $V_c$ are illustrated in FIGS. 10F and 10H, respectively. FIG. 10G shows the rectified current, $I_o$, which is delivered to the storage capacitor 56 and the load 120. The storage capacitor 56 is sufficiently large so that the voltage across it may be considered to be essentially constant throughout an operating cycle of the SAC 90. The SAC 90 responds to changes in load resistance and load current with corresponding changes in the amplitude of the resonant current, $I_p$, and thus the amplitude of the current through primary and secondary switching elements. Conduction losses are therefore minimized under all load conditions.

The SAC operates at a high power conversion duty cycle (where the term "power conversion duty cycle" means the fraction of the operating cycle during which switches are ON and power is being transferred from the input of the SAC to the load, i.e., in FIG. 10 the sum of the power transfer intervals, $(t_1-t_0)+(t_3-t_2)$, divided by the duration of the operating cycle, $(t_4-t_0)$) and using balanced duty cycles (the power transfer interval using switch 58, interval $t_0$–$t_1$, is essentially equal to the power transfer interval using switch 60, interval $t_2$–$t_3$). For example, in a SAC having a characteristic resonant frequency of 1.5 Megahertz, the total duration of the two power transfer intervals will be 667 nanoseconds and each energy-recycling interval (assuming a selection of transformer magnetizing inductance low enough to rapidly slew the parasitic capacitances of MOSFET switches) may be approximately 20 nanoseconds, resulting in a total operating cycle of 707 nanoseconds and power conversion duty cycle of 94%. Thus, a SAC according to the invention can be expected to achieve power conversion duty cycles greater than 80% and, for optimized units, power conversion duty cycles greater than 90%. At lower operating frequencies, power conversion duty cycles approaching 100% are possible.

The virtual elimination of switching losses (due to primary ZVS and secondary ZCS and ZVS operation), minimization of conduction losses under all load conditions (due to amplitude modulation), constant (resonant) frequency operation, reduction or elimination of filter components (due to spectral purity of the sine wave), and high switching frequency contribute to the high efficiency and high power density realizable using the Sine Amplitude Converter topology 90.

One way of controlling the switches in the SAC is to turn them ON and OFF using signals whose frequency, relative timing and ON and OFF intervals are pre-determined. This, however, requires that the relative timing of the switch control signals be adjusted to compensate for variations in the characteristic resonant frequency due, for example, to component value variations in individual units. A preferred way to control the switches is to provide an "automatic switch controller" which automatically turns the switches OFF at times when the sinusoidal component of the currents $I_{s1}$ and $I_{s2}$ (FIGS. 10C, 10D) returns essentially to zero and which provides an energy-recycling interval sufficient for ZVS at each switch transition prior to turning the complementary switch ON. The benefits of using an automatic switch controller include minimization of switching and conduction losses and maximization of converter efficiency; elimination of timing adjustments in individual SAC units due to variations in values of circuit elements resulting from component tolerances; optimization in current sharing accuracy among SACs in a parallel array, as discussed below; optimization of soft switching, i.e. primary ZVS and secondary ZCS and ZVS; and maximization of the spectral purity of the sinusoidal waveforms in the converter.

Figure 22:
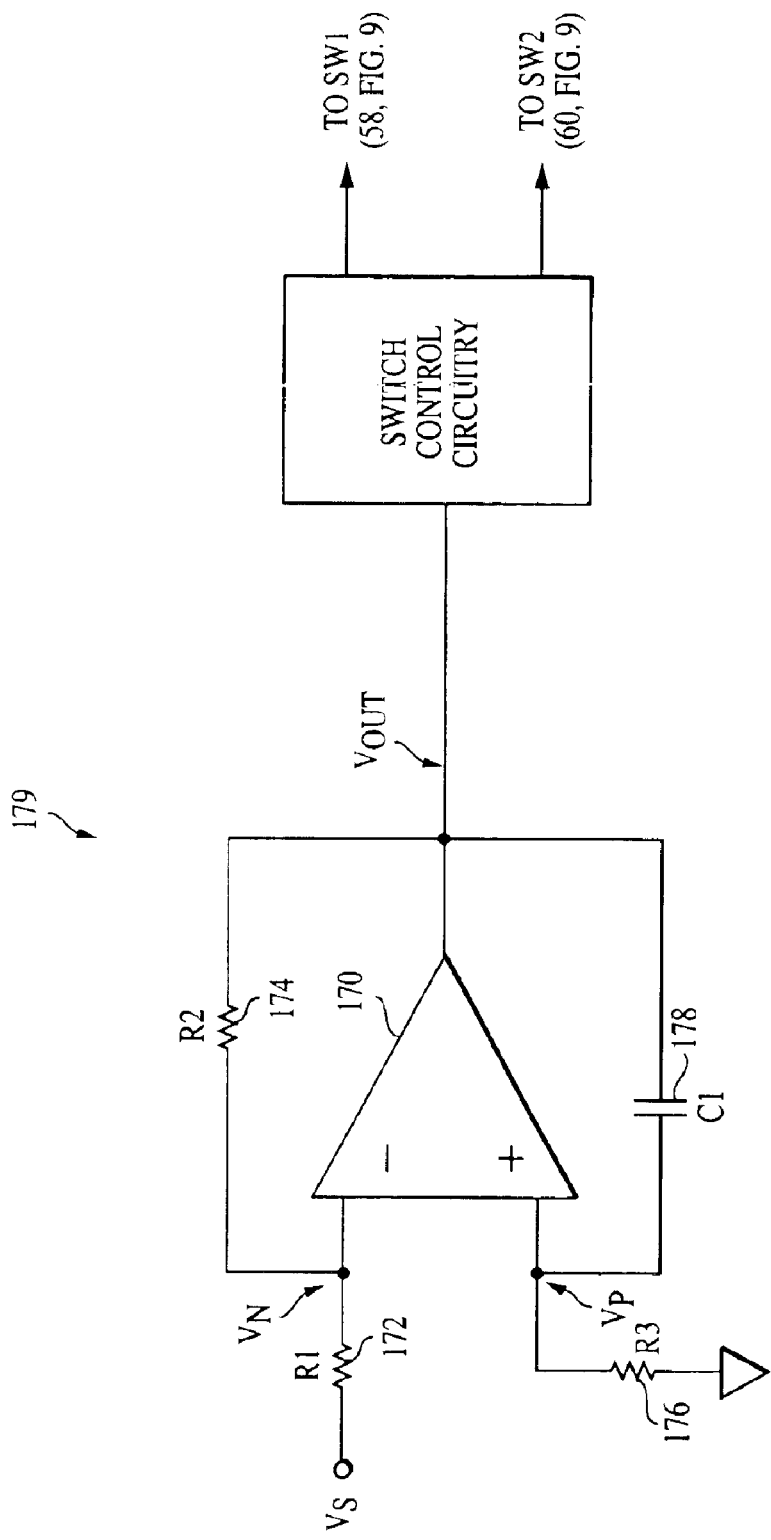
FIG. 22 shows a schematic of an automatic switch controller.
Figure 23A:
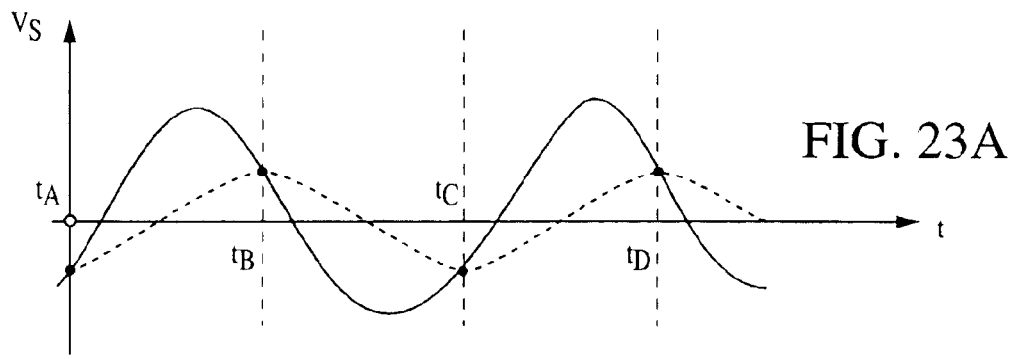
FIGS. 23A–23D show waveforms for the automatic switch controller of FIG. 22.
Figure 23B:
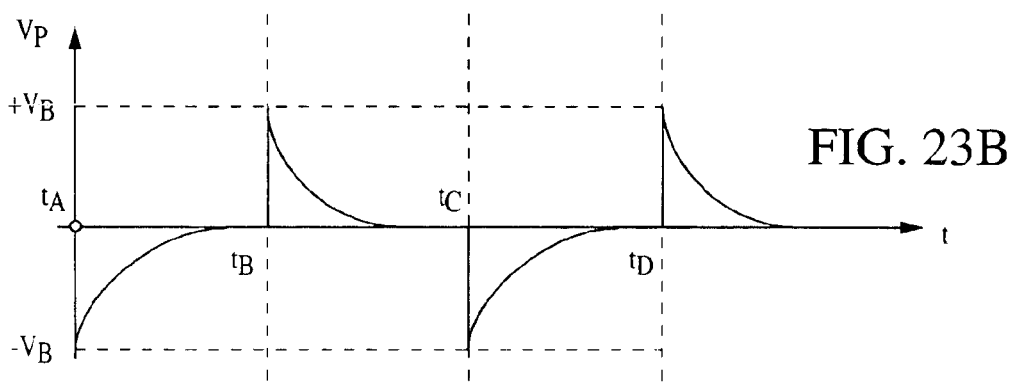
Figure 23C:
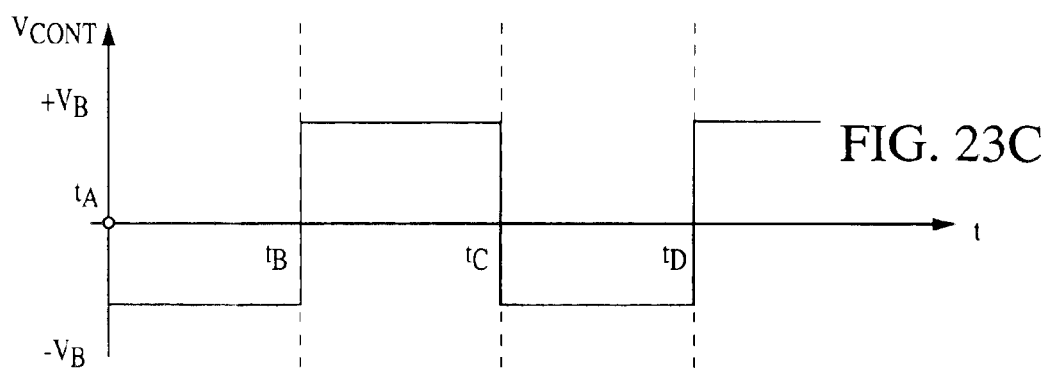
Figure 23D:
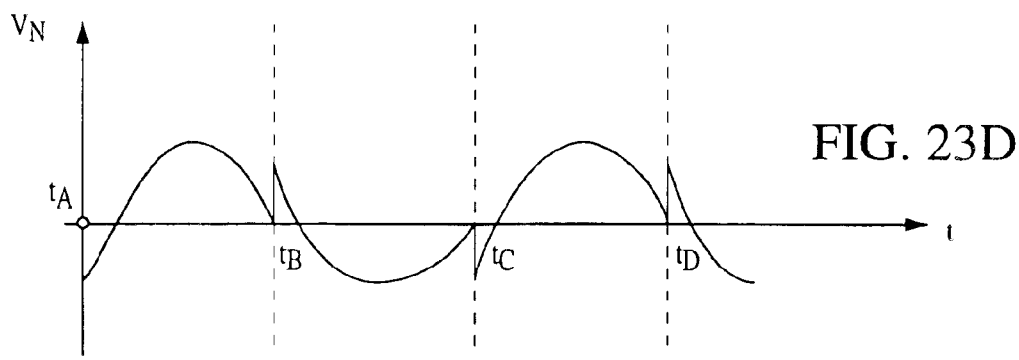

An embodiment of an automatic switch controller 179, for controlling the switches in a SAC, is shown in FIG. 22. Operation of the circuit will be explained with reference to the SAC schematic of FIG. 9 and the waveforms of FIG. 23. In FIG. 22, the signal $V_s$ may be a voltage proportional to the primary current, $I_L$, in transformer 70. As shown in FIG. 23A, and as discussed above with respect to FIGS. 10C and 10D, the signal $V_s$ may include a sinusoidal component and a magnetizing current component. In FIG. 23A, the sinusoidal component of $V_s$ goes to zero at times $t_A$, $t_B$, $t_C$, and $t_D$ which are the times at which the magnetizing current (as indicated by the dashed line) reaches its peak values. In FIG. 22, the signal, $V_N$ (FIG. 23D), at the negative input of comparator 170, is the sum of a portion of the signal $V_s$ and a portion of the signal $V_{cont}$ (FIG. 23C) at the output of the comparator. The relative contributions of $V_s$ and $V_{cont}$ may be determined by the relative values of resistors 172 and 174. The ratio of resistors 172 and 174 is selected so that the contributions of $V_{cont}$ and $V_s$ offset and cancel each other at times $t_A$, $t_B$, $t_C$, and $t_D$, thereby causing the signal $V_{cont}$ to transition between positive and negative values at those times. To improve convergence, resistor 174 may be replaced by an inductor (not shown) to provide a time-dependant ramp instead of a fixed offset. Signal $V_{cont}$ may be fed back to the positive input of comparator 170 via capacitor 178 and resistor 176. This positive feedback may ensure fast transitions in the signal $V_{cont}$ without signal bounce. The values of capacitor 178 and resistor 176 may be chosen so that the signal $V_P$ (FIG. 23C) returns to a value of essentially zero volts prior to the next switching transition.

With reference to FIGS. 9 and 23, when the signal $V_{cont}$ is positive, switch control circuitry 180 may cause switch 58 to be enabled, and when the signal $V_{cont}$ is negative, the switch control circuitry 180 may cause switch 60 to be enabled. Switch control circuitry 180 may also include delay circuitry (not shown) to set the energy-recycling intervals during which both of the switches 58 and 60 are OFF, as discussed above. After one switch is turned OFF, the complementary switch may be turned ON after the end of an energy-recycling interval (e.g., in FIG. 10, the ends of the energy-recycling intervals are at times $t_2$, $t_4$, and $t_6$). The duration of the energy-recycling intervals may be predetermined (e.g., by using RC time constants to generate delays) or the end of each interval may be triggered by sensing when the voltage $V_{sw}$ (FIG. 10E) is at or near zero volts for S2 or at or near $V_{in}$ for S1.

Figure 24:
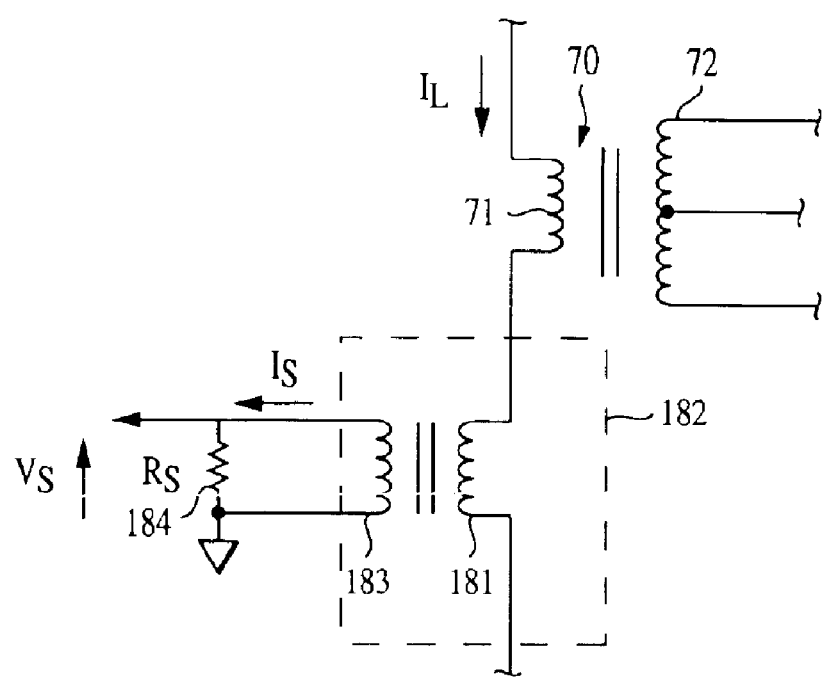
FIG. 24 shows a schematic of circuitry for generating a control signal $V_s$ for use with a switch controller in a voltage transformation module.

The signal $V_s$ may be generated by sensing the variations in flux in the core of the transformer 70, as taught in U.S. Pat. No. 5,659,460, entitled "Switch Control in Quantized Power Converters," assigned to the same assignee as this application, and incorporated in its entirety by reference. Another way to generate the signal $V_s$ is shown in FIG. 24. In the Figure, a primary winding 181 of a current transformer 182 is connected in series with the primary winding 71 of the SAC transformer 70. The voltage $V_s$ is generated by the flow of the transformed current $I_s$, from the secondary winding 183 of the current transformer, in resistor 184. Current transformers may also be used to sense current in the secondary winding 72 of the SAC transformer 70.

Current flow in secondary windings of SAC transformers may also be sensed by monitoring voltages across secondary synchronous rectifiers in series with secondary windings. At the completion of power transfer intervals, as currents in synchronous rectifiers approach zero, voltages across synchronous rectifiers falling below a voltage threshold (e.g. 10 mV) may be used to trigger the turn-OFF of the gates of MOSFET switches used for synchronous rectification and to trigger the turn-OFF of corresponding primary switches. Thus, in an alternative embodiment, an automatic switch controller turns OFF primary switches at times when currents in secondary windings return to zero and essentially coincident with the turn-OFF of corresponding secondary switches, and turns ON complementary primary switches after a delay, to provide for an energy-recycling interval.

This embodiment of an automatic switch controller requires fast communication (i.e., approximately 5 nS for a 1 MHz converter) across the secondary-to-primary isolation boundary, e.g. by the use of pulse transformers, but avoids the need for precise subtraction of magnetizing current which is inherent to primary-side controllers, such as that shown in FIG. 22.

Figure 12:
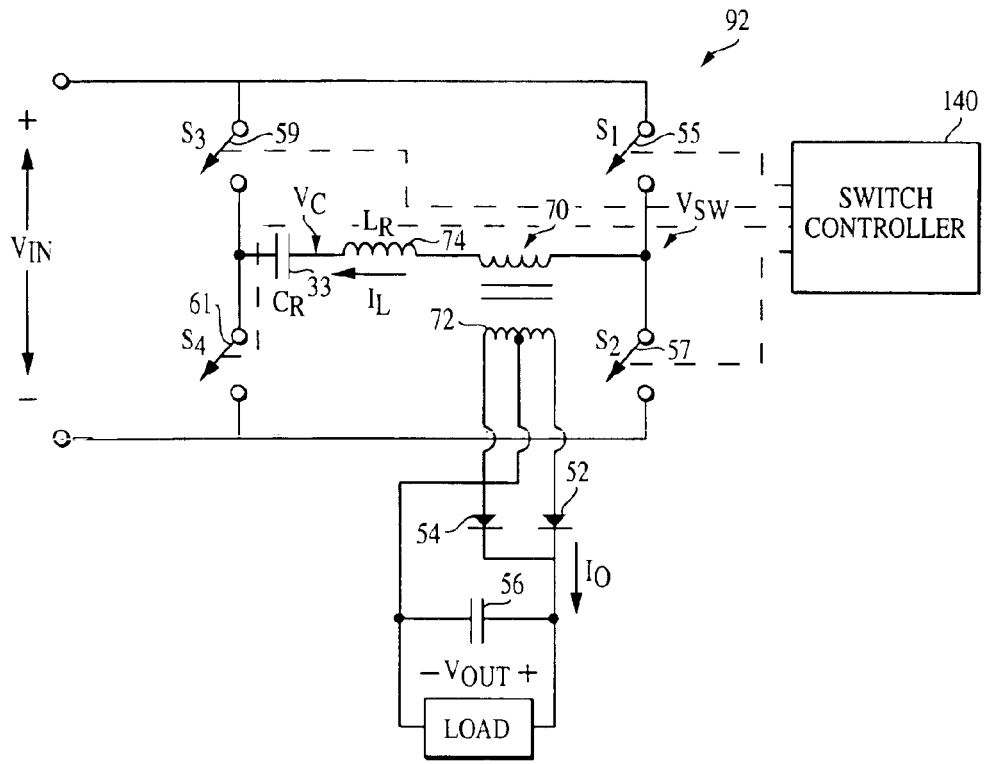
FIG. 12 shows a schematic of an alternate sine amplitude converter topology for use in a voltage transformation module.
Figure 13:
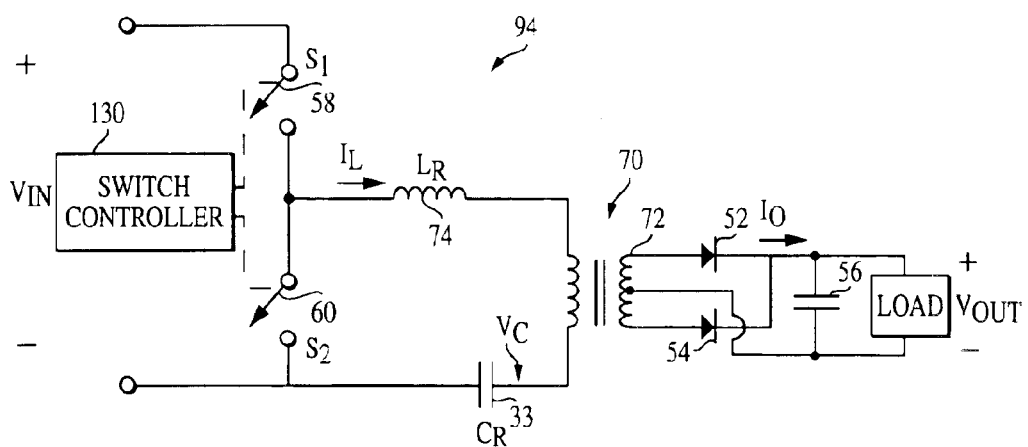
FIG. 13 shows a schematic of an alternate sine amplitude converter topology for use in a voltage transformation module.
Figure 14:
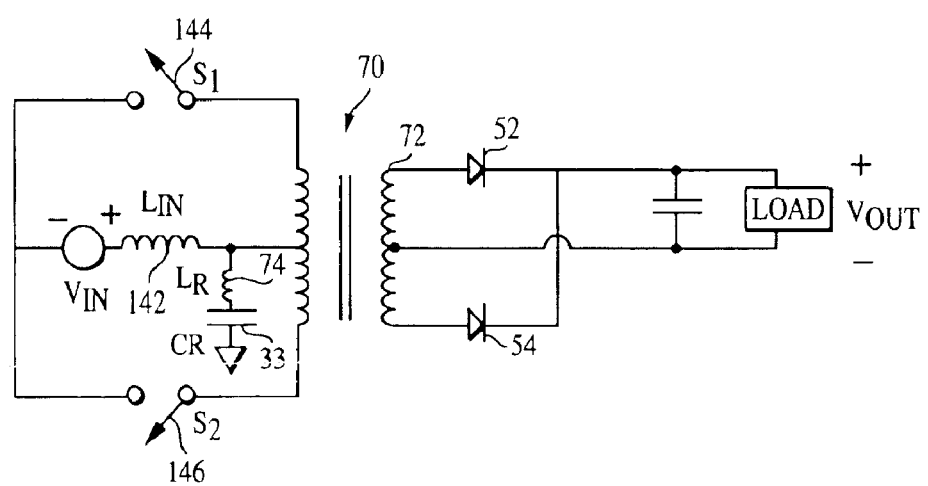
FIG. 14 shows a schematic of an alternate sine amplitude converter topology for use in a voltage transformation module.

Alternate embodiments of SACs are shown in FIGS. 12, 13, and 14. FIG. 12 shows a full-bridge SAC 92. Operation of the circuit is similar to that of the converter of FIG. 9, except that the switch controller 140 controls a total of four MOSFET switches 55, 57, 59, and 61. With reference to FIGS. 12 and 10, switches 55 and 61 are turned ON and OFF with the timing shown in FIG. 10A (for switch 58) and switches 57 and 59 are turned ON and OFF with the timing shown in FIG. 10B (for switch 60). During each half-cycle of oscillation, the resonant circuit (i.e., the series circuit comprising resonant inductance 74, which may consist totally or partially of the leakage inductance of transformer 70, and resonant capacitor, 33) is driven by an equivalent voltage source equal to $V_{in}$ and each of the switches in the circuit of FIG. 12 blocks a voltage $V_{in}$ when OFF.

FIG. 13 shows an alternate embodiment of the sine amplitude converter of FIG. 9 using a single resonant capacitor 33. FIG. 14 shows another embodiment of a sine amplitude converter having a resonant frequency set by resonant capacitor 33 and inductance 74. The resonant inductance 74 may totally or partially consist of the leakage inductance of transformer 70 and may be small relative to the inductance of input inductor 142. A distinguishing attribute of the topology of FIG. 14 is that the two primary switches have a common node.

Figure 15A:
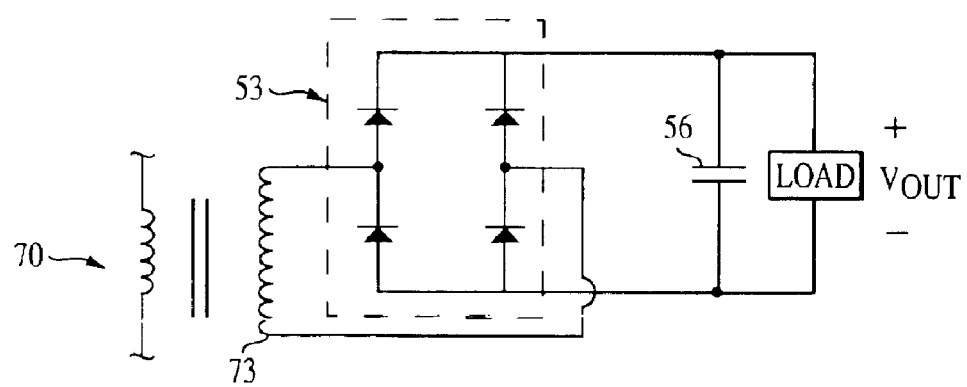
FIG. 15A shows a schematic of circuitry using a single secondary winding with full-wave bridge-rectification for use with a sine amplitude topology.

Referring to FIG. 15A, an untapped secondary winding 73 and full-wave rectifier 53 may be used as an alternative to the center-tapped secondary winding 72 and rectifier 52 and 54 configuration shown in FIGS. 9, 12, 13, and 14. A drawback of the configuration of FIG. 15A is that two rectifiers conduct during each half-cycle, increasing total rectifier conduction losses particularly at low output voltages.

Although synchronous rectifiers have been used to reduce rectifier conduction losses in the output circuitry of conventional switching power converters, their use typically requires limiting the converter operating frequency to contain switching losses. In non-zero current switching converters, high current slew rates in the synchronous rectifier FETs may give rise to significant switching losses from either delayed or premature turn-OFF of the FET conduction channel, thereby limiting high frequency operation. The ZCS architecture and the sinusoidal character of the current waveform on the secondary side of sine amplitude converters, however, translate into essentially zero current and limited current slew rates at the turn-ON and turn-OFF transitions of the secondary switching elements, which greatly relaxes timing constraints in the switching of synchronous rectifiers. This in turn enables switching at or near zero current and minimizing switching losses even at high operating frequencies. Synchronous rectifiers, when used in the SACs, come without the switching loss penalties associated with other converter topologies, and help reduce power losses in the output circuitry of any of the SAC embodiments at frequencies higher than 1 MHz and as much as an order of magnitude greater than practical with conventional converters, thus allowing further increases in power density and efficiency.

Figure 15B:
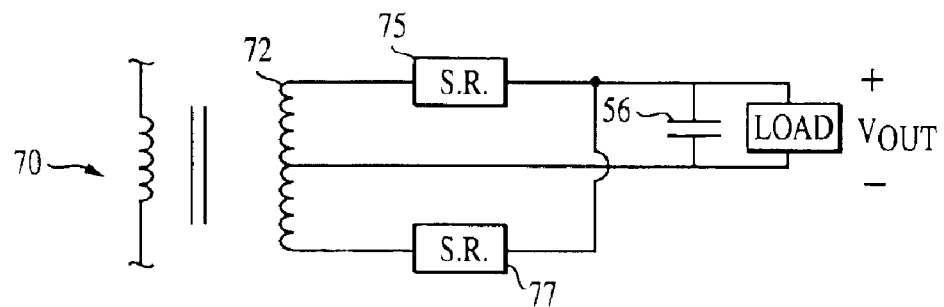
FIG. 15B and 15C show alternate embodiments of output rectification circuitry with synchronous rectifiers for use in a sine amplitude converter topology.

Referring, for example, to FIG. 15B, "smart-synchronous-rectifier" devices 75 and 77 (e.g., of the kind described in U.S. patent application Ser. No. 09/499,822, "Active Rectifier," assigned to the same assignee as this application and incorporated by reference in its entirety) may be used in place of the rectifiers 52 and 54 of FIGS. 9, 12, 13 and 14.

Figure 15C:
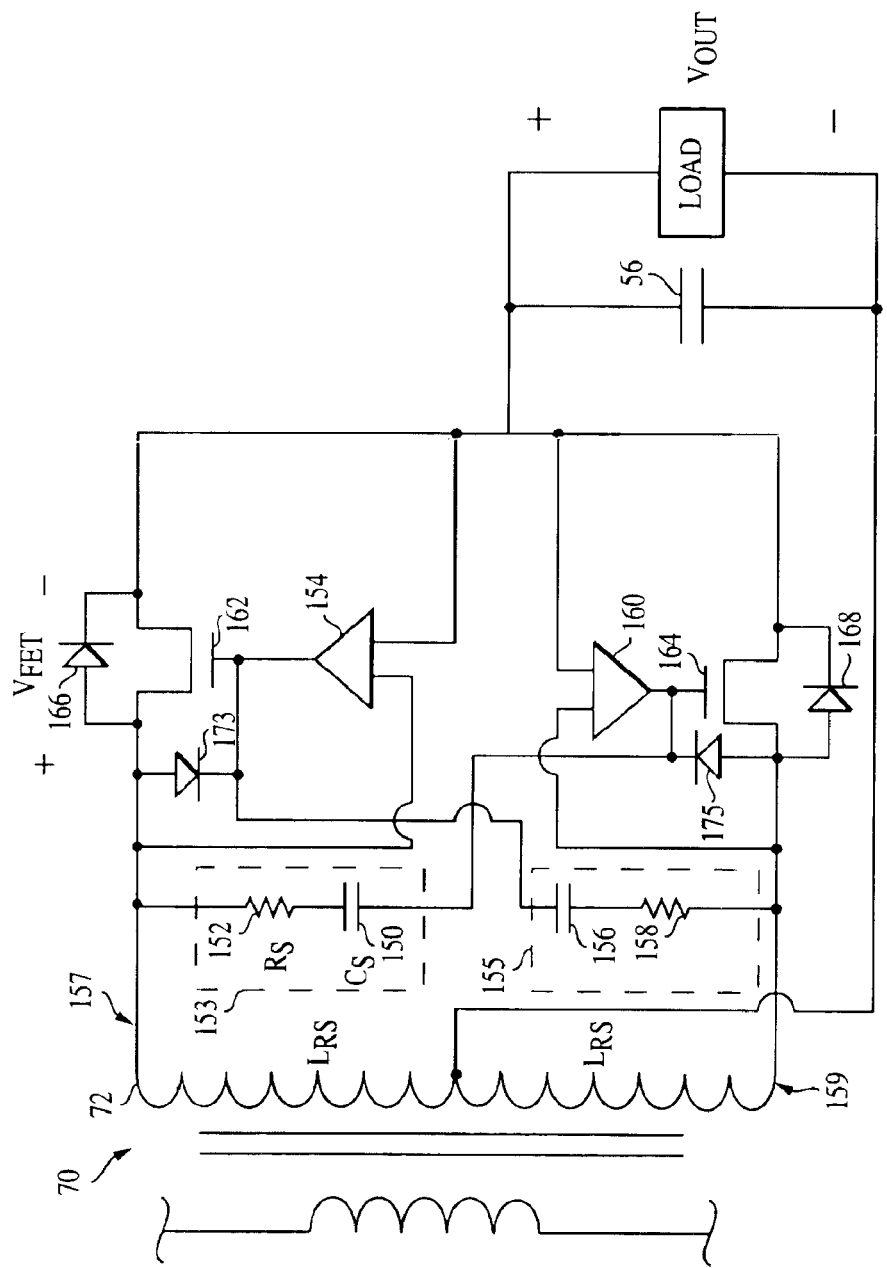

An additional embodiment with synchronous rectifiers is shown in FIG. 15C. After a secondary switch, e.g., a MOSFET synchronous rectifier, in the SAC is turned OFF, the voltage across the secondary windings reverses, causing a possible overshoot in the voltage across the MOSFET synchronous rectifier switch being turned OFF (e.g. switches 162, 164). The overshoot is a result of ringing between energy stored in the leakage inductance associated with the secondary winding 72 (labeled in the FIG. 15C as "$L_{RS}$" beside each half of the winding) and circuit parasitic capacitances (e.g., the parasitic capacitance of the synchronous rectifier switches, not shown in the figure). The ringing may be dampened using a dissipative snubber circuit. Referring to FIG. 15C, an improved approach for controlling the synchronous rectifier switches is shown. Each recycling circuit 153 and 155 in the pair comprises a capacitor 150 and 156, a resistor 152 and 158, and a rectifier 175 and 173. The recycling circuits 153 and 155 are connected between a respective end 157, 159 of the transformer secondary winding 72 and the gate control input of a respective MOSFET synchronous rectifier switch which is connected to the other end of the winding. Rectifiers 166 and 168 may be discrete devices or the body drain diodes of MOSFETs 162 and 164. A comparator 154, 160, connected to the gate control input of a respective MOSFET 162 and 160, turns the MOSFET OFF when the voltage across the MOSFET (e.g., voltage $V_{FET}$) is negative and releases the gate control input to an open-circuit condition when the voltage across the MOSFET is positive. In operation, when the polarity of the voltage at end 157 (159) of the secondary 72 goes from positive to negative (negative to positive), MOSFET switch 162 is turned OFF (MOSFET 164 is released). Energy which would otherwise cause ringing in the voltage across MOSFET 162 may instead be delivered to the gate capacitance (not shown) of MOSFET 164 via the recycling circuit 153, thereby turning ON MOSFET 164 and preventing ringing in the voltage across MOSFET 162. Thus, the secondary switches, comparators and recycling circuits of FIG. 15C are discrete implementations of "smart-rectifier-snubber" ("SRS") devices which reduce dissipation by recycling energy into the gates of the MOSFET switches 162, 164 in order to turn the switches ON while incorporating active circuitry to rapidly turn the switches OFF at essentially zero current. The comparator and MOSFET elements of SRS devices are particularly well suited to silicon integration to improve turn-OFF speed and overall performance at a reduced cost. SRS devices may also be coupled to auxiliary secondary windings to optimize the gate voltages applied to the MOSFET switches. Given that SACs operate from controlled input voltages in the FPA resulting in controlled voltages across the transformer windings, SRS devices provide efficient synchronous rectifiers for SACs.

In the sine amplitude converters of FIGS. 9, 12, 13 and 14, the peak-to-peak sinusoidal variations in $I_L$ and $V_C$ in steady state operation are dependent on and vary with the value of the load current $I_{out}$. An increase or decrease in the load will cause a corresponding increase or decrease in the peak value of $I_L$ and the peak-to-peak value of $V_C$. Neglecting rise and fall times associated with ZVS delays and assuming operation at resonant frequency, the peak primary resonant current $I_L = I_p$ is approximately given by:

$$I_p = I_{out} * (\pi * N_s/(2*N_p)),$$

and the peak-to-peak resonant voltage, $\Delta V$, is approximately given by:

$$\Delta V = 2 * V_p = I_{out} * (\pi * N_s/N_p) * \text{sqrt}(L_R/C_R),$$

where $I_p$ and $V_p$ are as illustrated in FIG. 10; where $N_p$ and $N_s$, represent the number of turns of the primary and each secondary winding, respectively; and where $L_R$ is the primary resonant inductance and $C_R$ is the resonant capacitance.

Under similar assumptions and further assuming that: a) the primary and secondary switching elements have ON state resistances $R_{sp}$ and $R_{ss}$, respectively, b) the transformer has a primary and secondary equivalent series resistance $R_{tp}$ and $R_{ts}$, respectively, and c) neglecting other loss terms, the output voltage, $V_{out}$, is approximately given by:

$$V_{out} = V_{in} * (N_s/N_p) - (\pi^2/8) * [(R_{ts}+R_{ss}) + (R_{tp}+R_{sp}) * (N_s/N_p)^2] * I_{out},$$

and the converter's open-loop output resistance is approximately given by:

$$R_{out} = (\pi^2/8) * [(R_{ts}+R_{ss}) + (R_{tp}+R_{sp}) * (N_s/N_p)^2].$$

In the absence of any compensating feedback, this output resistance will cause voltage droop at the point-of-load as a function of load. However, due to the nature of a Sine Amplitude Converter topology and the consequent absence of droop due to complex impedance terms, particularly leakage inductance, the droop is significantly reduced relative to other topologies or control architectures. Low open-loop output resistance is advantageous to improved regulation in multiple output VTMs or in a FPA system deploying multiple VTMs powered from the same bus voltage, $V_f$. Low open-loop output resistance is also advantageous under closed-loop operation if feedback is provided to the PRM, since it diminishes the slew rate required of the bus voltage, $V_f$, which may then be bypassed by substantial amounts of capacitance to provide point-of-load energy storage at the input of a VTM. Up to their bandwidth, VTMs will then provide an energy reservoir by reflecting to the point of load an effective hold up capacitance as the inverse of the square of the VTM gain K, or voltage transformation ratio, multiplied by the input capacitance. Thus, VTMs incorporating a SAC topology are capable of improved dynamic performance with, or without, the benefit of closed-loop operation.

The open loop output resistance of a SAC or, in general, a VTM may be modified by controlling the operation of the VTM using a load-dependent control variable. For example, the output current may be used to increase or decrease output resistance by adjusting the VTM switching frequency and/or the duty cycle of switches and/or the phase of the switches as a function of output current. A reduction in the output resistance of the VTM due to feedback from the VTM input or output current, or other control variable, may be used to improve VTM output voltage regulation as a function of load and VTM dynamic performance under stepped loads, independently of feedback provided to the PRM and without the limitations of point-of-load voltage-driven, closed-loop operation. Alternatively, the output current may be used to increase output resistance by controlling the ON-state resistance of primary or secondary switching elements as a function of input or output current.

It should be noted that the switch, winding, and other ohmic resistances that contribute to the open-loop output resistance, $R_{out}$, of a SAC have positive temperature-coefficients. Because of this overall positive temperature-coefficient and the underlying positive resistance, $R_{out}$, of a SAC, the outputs of two or more SACs may be connected in parallel, as a means of increasing the total power which may be delivered to a load, and the SACs will automatically share in the power delivered to the load. Current sharing is independent of individual resonant frequencies, as long as the operating frequency of each SAC is locked to its respective resonant frequency. The worst case error in current sharing among paralleled SACs of equivalent construction and power rating is simply limited to the worst case mismatch in the total output resistance, $R_{out}$, of each SAC and is mitigated by the positive temperature-coefficient of $R_{out}$. Assuming a worst case model variability in $R_{out}$ of 10%, inherent current sharing to an accuracy better than 10% may be achieved, without the need for additional complex circuitry and power sharing interfaces to force current sharing among SACs. Current and power sharing accuracy may be improved further by supplementing the open-loop output resistance by current-driven feedback as described above.

In the absence of closed-loop regulation of the output voltage, this current sharing mechanism comes, as others before it, at the expense of droop in the output voltage with increasing load. However, if the output voltage of an array of paralleled SACs is regulated by feedback controlling the input voltage to the SAC array (e.g., as shown for a more general array of VTMs in FIG. 31), good regulation and current sharing may be achieved without the need for dedicated power sharing circuitry and fault prone interfaces. These desirable paralleling attributes may be retained in fault tolerant applications with an OR'ing diode added in series with the output of each SAC, if the OR'ing diode function is incorporated by use of a FET switch with positive temperature-coefficient resistance. Fault tolerance at the input of a SAC may also be achieved by incorporating a FET and a control circuit that turns the FET OFF to disconnect the SAC from the input bus under abnormal conditions.

The presence of inductive impedances (e.g., parasitic inductances and transformer leakage inductance) in switching circuits of PWM converters has generally been viewed as undesirable because the high-frequency oscillatory ringing associated with such inductances (in combination with parasitic capacitances of the switches, windings and other circuit components) causes increased component stresses; generates radiated electromagnetic interference and conducted noise; and generally requires use of dissipative "snubber" circuits to provide damping. Thus, prior art PWM converters have traditionally been designed as "low-Q" circuits, in which leakage inductances of transformers and other parasitic inductances are minimized. Transformers for PWM converters have therefore traditionally been constructed with interleaved windings, which increase inter-winding coupling and minimize leakage inductance and which also reduce the equivalent series resistance of the transformer by minimizing proximity effects in the windings. On the other hand, resonant converters have traditionally been designed with the opposite viewpoint: the prior art has taught the use of "high-Q" circuits in such converters, since it was deemed desirable to maximize the recovery of energy stored in resonant tank elements. Thus, transformers in resonant converters have been typically designed with non-interleaved windings as a means of providing transformer leakage inductance as all or part of the resonant inductance, a first order circuit element dictated by the energy storage requirements of resonant converters.

Although the use of "high-Q" circuits in resonant converters seems intuitively satisfying, it does not necessarily result in the most efficient converter if the topology does not impose a requirement of intermediate energy storage in the resonant tank. Design of a "high-Q" transformer provides an increase in transformer leakage inductance at the expense of an increase in transformer equivalent series resistance. In other words, the techniques used to construct such "high Q" transformers result in higher values of equivalent resistance than would be present in a "low-Q" transformer design (e.g., one designed for a PWM converter). This is because the "high-Q" techniques that result in a lower coupling coefficient and higher leakage inductance (e.g., non-interleaved windings) also result in increased loss due to skin and proximity effects, causing a reduction in the effective utilization of the winding cross-section.

The "quality factor," Q, of a series resonant converter operating at resonance is defined herein as $Q=Z_L/R_{eq}$, where $Z_L=1/(2\pi^* f_R^* L_R)$ is the total inductive impedance of the resonant circuit at the resonant frequency, $f_R$; where the inductance $L_R$ includes all discrete, leakage and circuit parasitic inductances, reflected to the transformer primary and in series with the resonant circuit; and where $R_{eq}$ is the total equivalent series resistance of the circuit, reflected to the transformer primary and including, resistances of windings, ON-state resistances of switches, rectifiers and resonant capacitors, measured at 27° C. with a 10 mA AC test current.

Since a SAC relies on principles of resonant charge transfer, as opposed to resonant energy transfer, the power throughput of a SAC at a given switching frequency does not uniquely define an energy storage requirement for its resonant elements, $L_R$ and $C_R$. The inductance $L_R$ (or the corresponding impedance at the resonant frequency) therefore represents a "spare" degree of freedom, which may be used to optimize converter efficiency and bandwidth. The quality factor, Q, does not directly reflect cycle-by-cycle losses in a SAC. Rather the losses in the resonant tank of a SAC are directly proportional to the total equivalent series resistance $R_{eq}$.

Given the physics of losses in a transformer, minimization of $R_{eq}$ does not entail maximization of Q. Thus, preferred embodiments of a SAC are those in which the equivalent series resistance $R_{eq}$ is minimized. For such embodiments, the transformer is generally designed to minimize leakage inductance; no external resonant inductance is used; and the values of the resonant capacitors are chosen to set the characteristic resonant frequency of the converter. In contrast to typical prior art series resonant converters having Q values of the order of 30, a preferred embodiment of a SAC will have a Q of less than 13. Q factors below 10 are possible and support higher conversion efficiency.

Since Q is proportional to reactive impedance and intermediate, serial energy storage, a low-Q resonant circuit may also generally provide higher bandwidth and shorter transient response time, together with greater inherent stability. The transient response time is defined as the time interval from an instantaneous step change in output load current (which causes the steady-state output voltage to change in an amount, $\Delta V$, and to settle to a final steady-state value, $V_{ss}$,) to when the output voltage settles into a band which is ±0.1 $\Delta V$ wide and centered around $V_{ss}$. A lower Q results in a corresponding reduction in the peak energy stored in the resonant inductor for a given load current. Whereas, for a given frequency, the capacitance of the resonant circuit increases in inverse proportion to the resonant inductance, corresponding reductions in peak voltages across the resonant capacitor reduce the peak energy stored in the capacitor in inverse proportion to the capacitance for a given load current. Thus, under stepped load conditions, a SAC with lower Q, lower resonant inductance and higher resonant capacitance is subjected to a smaller change in cumulative resonant energy. Since the number of converter cycles required to effect a change in cumulative resonant energy grows with the magnitude of the change, lower Q results in a more "nimble" SAC, capable of responding to stepped loads in fewer converter cycles and, therefore, faster. The reduced time lag in the time domain translates in reduced phase lag in the frequency domain and improved stability for lower Q values. However, the value of Q is constrained from below by waveform distortion due to circuit damping, particularly at reduced output loads.

Depending on the load range required of a VTM, Q values as low as 3, or lower, are practical. With such low Q values, SACs respond to virtually instantaneous changes in output load within a few converter cycles and slew their output current to minimize or, for low enough Q, totally eliminate voltage overshoot at the point-of-load under stepped load conditions. Specifically, with the SAC topology of FIG. 9 operated at a resonant frequency of 2 MHz with a Q=3, a VTM with an output voltage of 3.3V is capable of responding to a load step from zero to 50A within 0.5 microseconds. This represents an improvement in transient response time and bandwidth greater than an order of magnitude relative to best-of-class contemporary DC—DC converters. It also represents better transient performance than VRMs, which are often operated as a paralleled phased array (frequency "interleaved") to enhance their bandwidth in order to meet the demanding dynamic needs of leading edge microprocessors.

Thus, VTMs incorporating a SAC topology with a low Q resonant circuit provide significantly higher bandwidth, power density, efficiency and high current scalability than contemporary point-of-load VRMs. The greater performance of VTMs results from the combination of the Factorized Power Architecture and the attributes of high frequency, low Q, Sine Amplitude Converters. The relative simplicity, reliability and cost also point to VTMs, as opposed to VRM arrays, as the preferable point-of-load converters for future, state-of-the-art microprocessors.

Transformer windings may be physically interleaved by use, e.g., of multi-layer PCB construction techniques. Having optimized the windings to minimize their equivalent series resistance at the desired SAC resonant frequency and having measured the typical transformer leakage inductance of a certain design, the resonant frequency may then be "tuned in" for a particular product line by selecting an appropriate value for the resonant capacitors. Manufacturing process variations affecting leakage inductance will only impact the resonant frequency as a square root function of the inductance. Thus, for example, a 10% variation in leakage inductance will only cause a 5% change in resonant frequency and a 5% change in peak-to-peak voltage in the resonant capacitor. More significantly, such a variation does not affect the voltage or current ratings of any of the semiconductor switches or diodes. In any case, to achieve a particular characteristic frequency, $f_R = 1/(2\pi * \text{sqrt}(C_R * L_R))$, the value of one of the two elements which determine $f_R$ (i.e., $C_R$ or $L_R$), can be measured for each VTM; the other value calculated from the formula for $f_R$; and the requisite complementary component selected and installed. For example, in one embodiment of a SAC, the leakage inductance of the transformer (which is the total resonant inductance, $L_R$, in the circuit) can be measured, the value of $C_R$ calculated, and a capacitor (or capacitors) with a value closest to the calculated value can be retrieved from a store of capacitors of different values. This method avoids the need to manufacture transformers, particularly multi-layer PCB transformers, having tightly controlled values of leakage inductance in order to manufacture SACs of a given resonant frequency. Alternatively, in another embodiment of a SAC, the leakage inductance of a PCB transformer may be complemented by an incremental resonant inductor, which may be selected from a store of inductors, to achieve the desired value of total resonant inductance within an acceptable tolerance range.

To provide sufficient magnetizing current to achieve ZVS of the primary switches of a SAC within a short energy-recycling interval, to achieve a high power-conversion duty'cycle, the magnetizing inductance of the SAC transformer needs to be set to a sufficiently low value. For example, for the SAC topology of FIG. 9, assuming a low magnetizing inductance and that the total parasitic capacitance reflected at the primary switching node, $V_{sw}$, can be approximated by a fixed capacitor of capacitance $C_{sw}$, the duration of an energy-recycling interval, $T_m$, to achieve complete non-dissipative charge and discharge of parasitic capacitances would be approximately:

$$T_m = (C_{sw} * V_i)/[V_{in} * \pi * \text{sqrt}(L_R * C_R)/(2*2*L_M)] = 4 * C_{sw} L_M / [\pi * \text{sqrt}(L_R * C_R)].$$

Requiring that the energy-recycling interval be relatively short, so as to achieve a high power conversion duty cycle, i.e. greater than 90%, then leads to the following approximate requirement for the transformer's primary magnetizing inductance:

$$L_M < (1/4) * (C_R/C_{sw}) * L_R, \text{ or}$$

$$L_M < 1/(16 * \pi^2 * C_{sw} * f_R^2),$$

where $f_R$ is the converter's resonant frequency. Assuming that the bulk of $C_{sw}$ is due to parasitics in the silicon of the switching elements (e.g. FETs), it can then be seen that, for a given semiconductor (FET) technology, the magnetizing inductance to provide ZVS may need to be reduced in inverse proportion to the square of the resonant frequency. At high frequencies, i.e. above 1 MHZ, and given contemporary FET technology, this leads to the use of transformers with relatively low magnetizing inductance and low transformer core effective permeability.

In a specific example, a VTM was modeled with the SAC half-bridge topology of FIG. 9 and with a transformation ratio, K, equal to 1/20 to provide 3.3 Volt at up 150 Watts from a factorized bus at a voltage, $V_f$, approximately equal to 70 V. The primary switches, 58 and 60, were 40 mΩ FETs. The secondary rectifiers, 52 and 54, were 1.2 mΩ FETs operated as synchronous rectifiers. The resonant capacitance, $C_R$, was 52,000 pF and the resonant inductance, $L_R$, was 200 nH, setting the resonant frequency to approximately 1.5 MHz. The transformer turns ratio was 10:1. The transformer core was ferrite with a 0.63 square cm cross section, a 3.15 cm magnetic path length and a 0.45 cm gap, resulting in a low magnetizing inductance, $L_M$, of approximately 2 μH and an effective permeability of only 7. The energy-recycling interval was approximately 20 nS and the power conversion duty cycle was approximately 94%. The power train efficiency reached a peak of approximately 96%.

Given the relatively low values of effective permeability achieved above, transformer core materials for SACs operating at high frequencies, e.g. above 1 MHZ, may be selected from low initial permeability, low-loss ferrites or other high frequency permeable media. Initial permeabilities in the range of 5 to 500 (as opposed to the initial permeabilities of typical MnZn "high frequency" ferrites in the range of 500 to 3000) may be adequate, providing flexibility in the optimization of core materials to minimize core loss and in the geometry and construction of the transformer.

Figure 32:
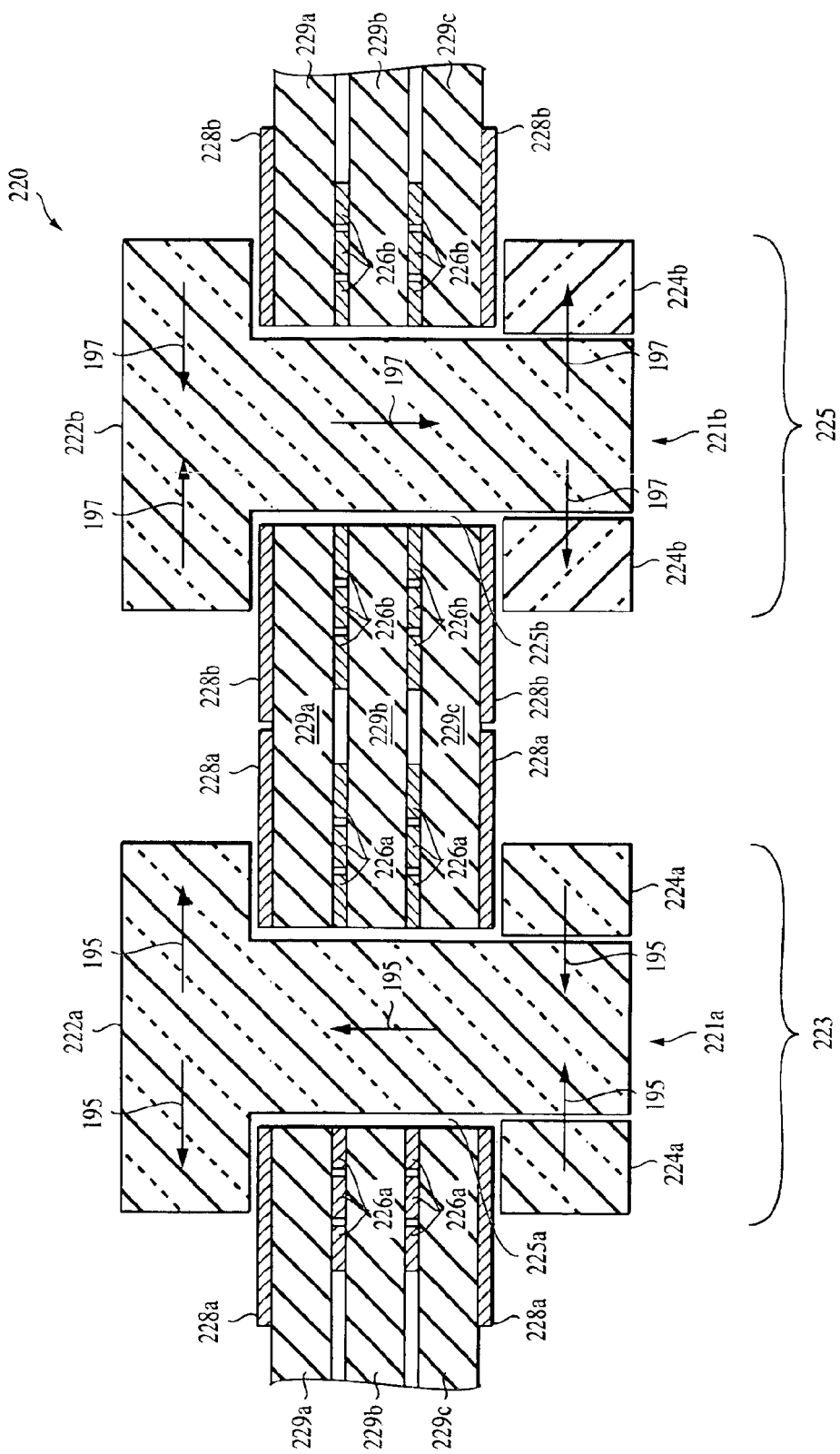
FIG. 32 shows a cross section of a transformer structure.
Figure 33:
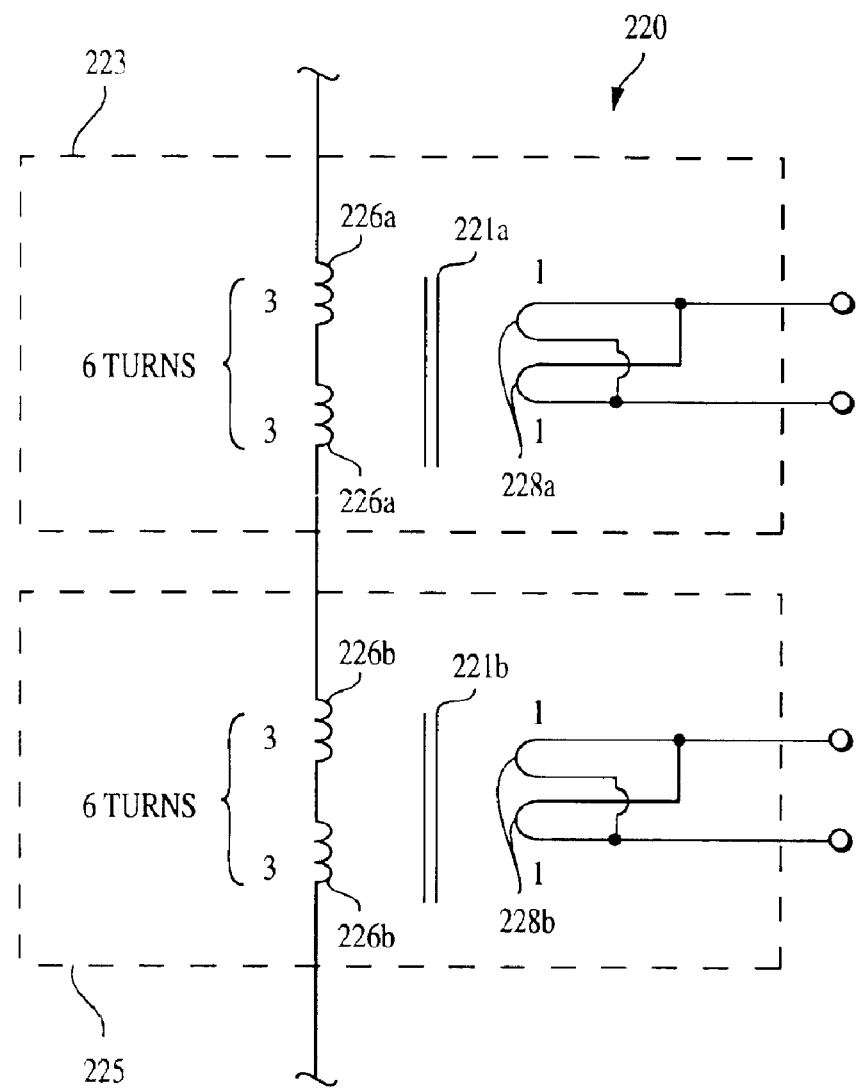
FIG. 33 shows a schematic block diagram of a transformer using the structure of FIG. 32.

A transformer structure of the kind shown in FIGS. 32 and 33, referred to herein as a "dog's bones" transformer may be used in a SAC. The dog's bones transformer may be used to achieve the high transformation ratios needed to provide the low output voltages and high currents required by present and future microprocessors cost-effectively. A multiplicity of cylindrical permeable core element sets (two such sets 221a, 221b are shown in FIG. 32, each set comprising a core piece 222a, 222b and an end piece; 224a, 224b each set representing a permeable dog's bone) are inserted into cylindrical holes 225a, 225b of a multi-layer PCB. In FIG. 32 the PCB comprises primary winding conductive etches 226a, 226b and secondary winding conductive etches 228a, 228b on non-conductive substrate layers 229a, 229b, 229c. As shown in the Figure, each exemplary primary winding consists of two sets of primary etches, each set consisting of three turns, one set being located between substrates 229a and 229b and the other set being located between substrates 229b and 229c. As shown in FIG. 33, the two primaries 226a, 226b may be connected in series. In FIGS. 32 and 33, the exemplary secondary windings 228a and 228b each comprise a pair of etches, one forming a single turn on the outer surface of substrate 229a and the other a single turn on the outer surface of substrate 229c. The two single turns in each pair may be connected in parallel, as shown in FIG. 33, to form a composite single turn of relatively high current capacity. The secondary windings may be used independently to power separate SAC outputs or they may be connected either in series or in parallel (thereby, in the example shown in the figures, forming, respectively, either a 2 turn winding or single turn winding of relatively high current capacity). Thus, for the winding example shown in FIG. 33, turns ratios of either 6:1 or 12:1 may be achieved. Smaller turns ratios may be achieved by connecting the primary windings in parallel.

The orientation of windings associated with neighboring dog's bones may be poled in opposite orientations as indicated by arrows 195 and 197 in FIG. 32 showing flux paths within the dog's bones, so that some of the magnetic flux of each dog's bone is returned within neighboring dog's bones. The relatively close proximity of the edges of the magnetic core pieces and end pieces allows magnetic flux from individual core elements (e.g., 222a, 222b) to be coupled to neighboring elements at a distance above and below the PCB, thereby reducing stray magnetic fields and losses due to proximity effects in the windings. Gaps between neighboring elements may be filled with a permeable medium to further minimize the interaction of magnetic fields with windings and reduce proximity losses. The use of gaps outside of the PCB, as distinct from gaps within holes in the PCB (which are characteristic of PCB transformers), is advantageous by providing a reduction in PCB transformer losses.

The dog's bones transformer core structure may also be implemented using a variety of alternative core element geometries (two of which are described below), or it may be implemented without the use of discrete core elements by over-molding the PCB with a permeable medium. The relatively low magnetizing inductance and effective permeability requirements of high frequency SAC transformers allows for the permeable medium to have a relatively low initial permeability, e.g. 10, which may be obtained by loading the composition of an over-mold resin with finely ground ferrite powder. This provides a means to reduce core loss per unit volume at high frequency and flux levels relative to conventional high initial permeability MnZn or NiZn ferrites.

Figure 34A:
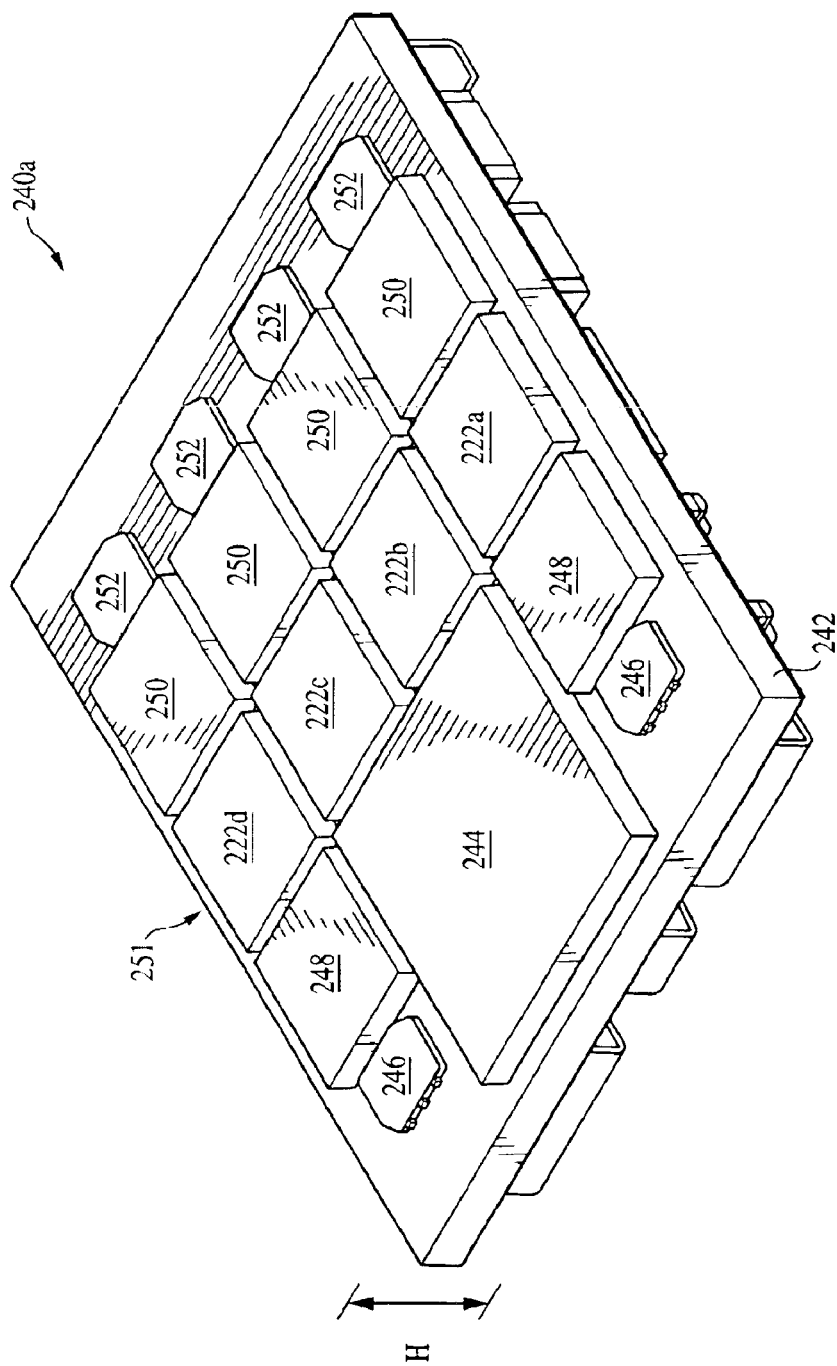
FIGS. 34A and 34B show top and bottom perspective views of a sine amplitude converter using the transformer structure of FIG. 32.
Figure 34B:
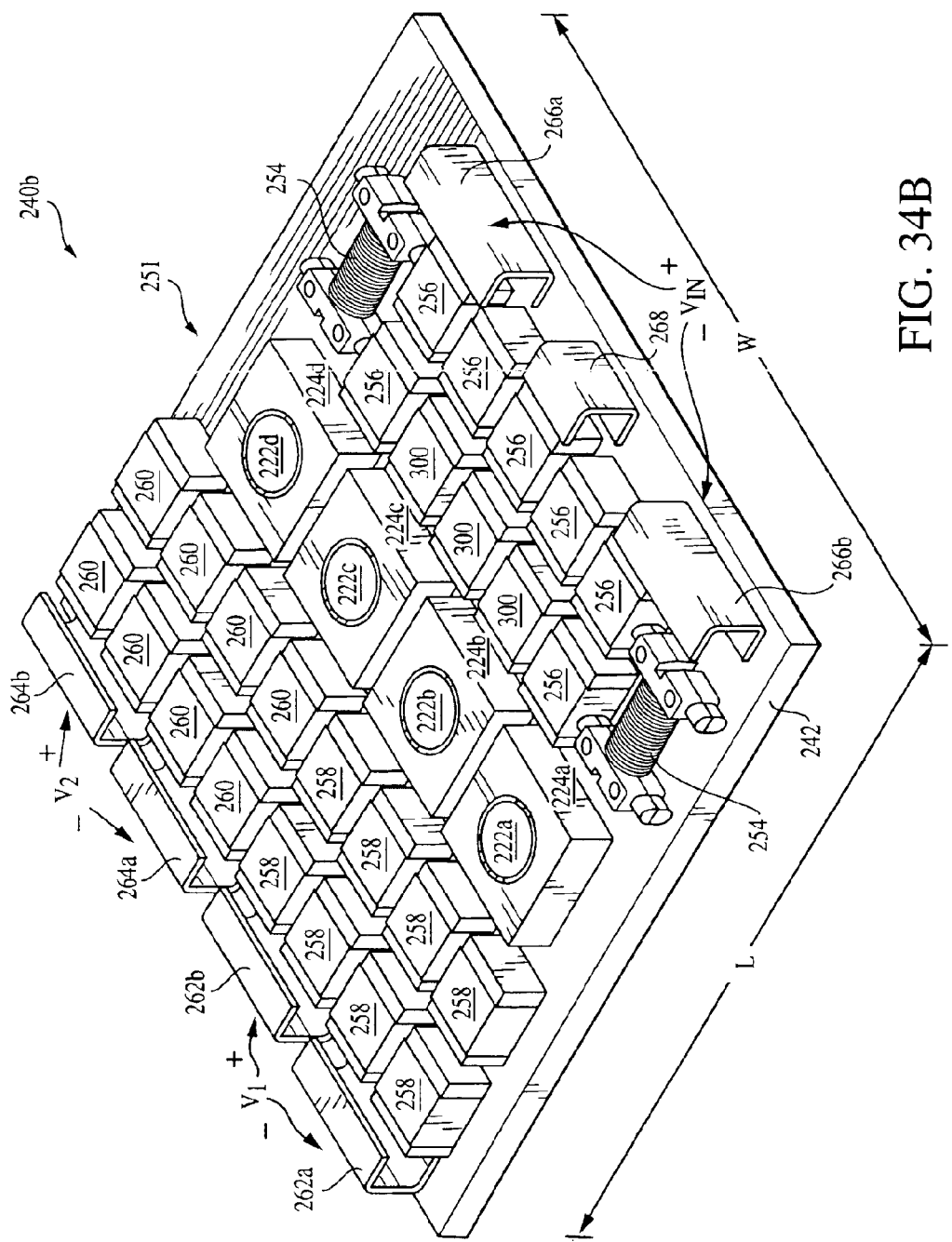

FIGS. 34A and 34B, show, respectively, top and bottom perspective views 240a, 240b of a SAC embodiment that includes an embodiment of a transformer of the kind shown in FIGS. 32 and 33. The transformer 251 has four core element sets, each set comprising one of four core pieces 222a–222d and one of four end pieces 224a–224d. Etches forming the windings (not shown) are part of multi-layer PCB 242. MOSFET switches 248, packaged in 5 mm×5 mm square MLP packages, may be used for the primary switches and may be connected to the primary windings of the transformer via etches (not shown) on the PCB 242. The control circuitry, which may include, e.g., an automatic controller of the kind described above with reference to FIGS. 22 and 23 or in the discussion of alternative embodiments, may be provided within an integrated circuit 244. The gates of each of the MOSFET switches 248 may be driven by primary gate driver circuits 246, which may receive turn-on and turn-off command information from the control circuit 244 via galvanically isolated transformers 254, and which may operate as described in Vinciarelli, U.S. Pat. No. 6,107,860, "High Efficiency Floating Gate Driver Circuit Using Leakage-Inductance Transformer," assigned to the same assignee as this application and incorporated by reference in its entirety. MOSFET switches 250, packaged in 5 mm×5 mm square MLP packages, may be used for the secondary-side synchronous rectifiers and may be controlled by synchronous gate drivers 252, which may be of the kind described in Vinciarelli, U.S. patent application Ser. No. 09/499,822, assigned to the same assignee as this application and incorporated by reference in its entirety. Resonant capacitors 300, in conjunction with the leakage inductance of the transformer structure, set the characteristic resonant frequency of the converter. Input capacitors 256 provide a reservoir of energy and input filtering. The outputs of the synchronous rectifiers 250 connect to output capacitors 258, 260. In the example shown in FIGS. 34A and 34B, the secondary windings associated with core sets 222a and 222b may be connected via two of the four synchronous rectifiers to capacitors 258, and the secondary windings associated with core sets 222c and 222d may be connected via the other two synchronous rectifiers to capacitors 260, to deliver two separate, isolated and filtered DC output voltages, $V_1$ and $V_2$, at terminal pairs 262a, 262b and 264a, 264b, respectively. The two voltage outputs, $V_1$ and $V_2$ may be the same and the terminals 262, 264 may be connected in parallel to provide a single output with increased total power output; or the voltages may be the same or different and may be used separately. The input voltage, $V_{in}$, may be delivered to the SAC 240 at input terminals 266a, 266b. A signal terminal 268 may be used to deliver a feedback signal to a PRM or power regulator front end, or it may be used for another purpose, e.g., as an enable/disable input to control the outputs of the SAC. The overall dimensions of the SAC 240, including the over-molding epoxy (discussed below), may be L=1 inch (25.4 mm), W=1 inch (25.4 mm) and H=0.2 inch (5 mm). A SAC of the kind shown in the FIGS. 34A and 34B may deliver 3.3 Volts at up to 100 Watts operating at a frequency of 1.5 MHz and with a conversion efficiency of 96% achieving a power density of 500 watts per cubic inch.

Because of the relatively low value of effective permeability required of a SAC transformer core, mechanical-stress induced cracks in the core will have relatively little effect on transformer performance. This makes the overall VTM assembly compatible with being over-molded as an integrated circuit. Removal of heat from the over-molded package is simplified by placing the switching elements, which generate most of the heat, on the top side of the assembly, as shown in FIG. 34A. Thus, the entire assembly 240 of FIGS. 34A and 34B may be over-molded with thermally conductive epoxy (e.g., Novolac resin, manufactured by Epoxy Systems, Inc., Jericho, Vt., USA)(not shown in the Figure).

In application within a FPA distributed power system, a SAC is typically operated at an essentially constant input voltage. The switches, rectifiers and other components, therefore, are subjected to well-defined stresses and may be selected to optimize both power density and efficiency. For example, with reference to FIG. 9, during steady-state operation, the primary switches 58, 60 block no more than the input voltage, $V_{in}$; and the rectifiers block no more than twice the output voltage, $2*V_{out}$. As mentioned above, the switches and the rectifiers operate on balanced duty cycles (i.e., the switching duty cycle of each element is comparable to that of its complementary element) and with a high power conversion duty cycle (i.e., the sum of the duty cycles of the complementary switches is a large fraction of the total converter operating period). The switches and rectifiers are therefore efficiently utilized. Two short energy-recycling intervals introduce a relatively small amount of dead time in a converter period, which prevents realization of 100% power conversion duty cycle. The short energy-recycling intervals however improve conversion efficiency by reducing switching losses at high frequencies; reduce radiated and conducted noise by limiting slew rates of voltages and currents; and reduce stresses due to dV/dt and dI/dt on primary and secondary switching elements. Owing to the sinusoidal resonant current waveforms, the RMS current for the primary and secondary switching elements of a SAC is slightly greater than that of a corresponding "square-wave" DC-to-DC transformer topology resulting in slightly higher ($I^2R$) conduction losses. The RMS current of primary switching elements is further increased by a purposeful scaling of the magnitude of the magnetizing current to enable ZVS. However, this small compromise in increased RMS currents and conduction losses allows switching losses to be virtually eliminated, thereby providing for greater power density, efficiency, and overall performance by enabling more efficient conversion at much higher switching frequencies.

Figure 25:
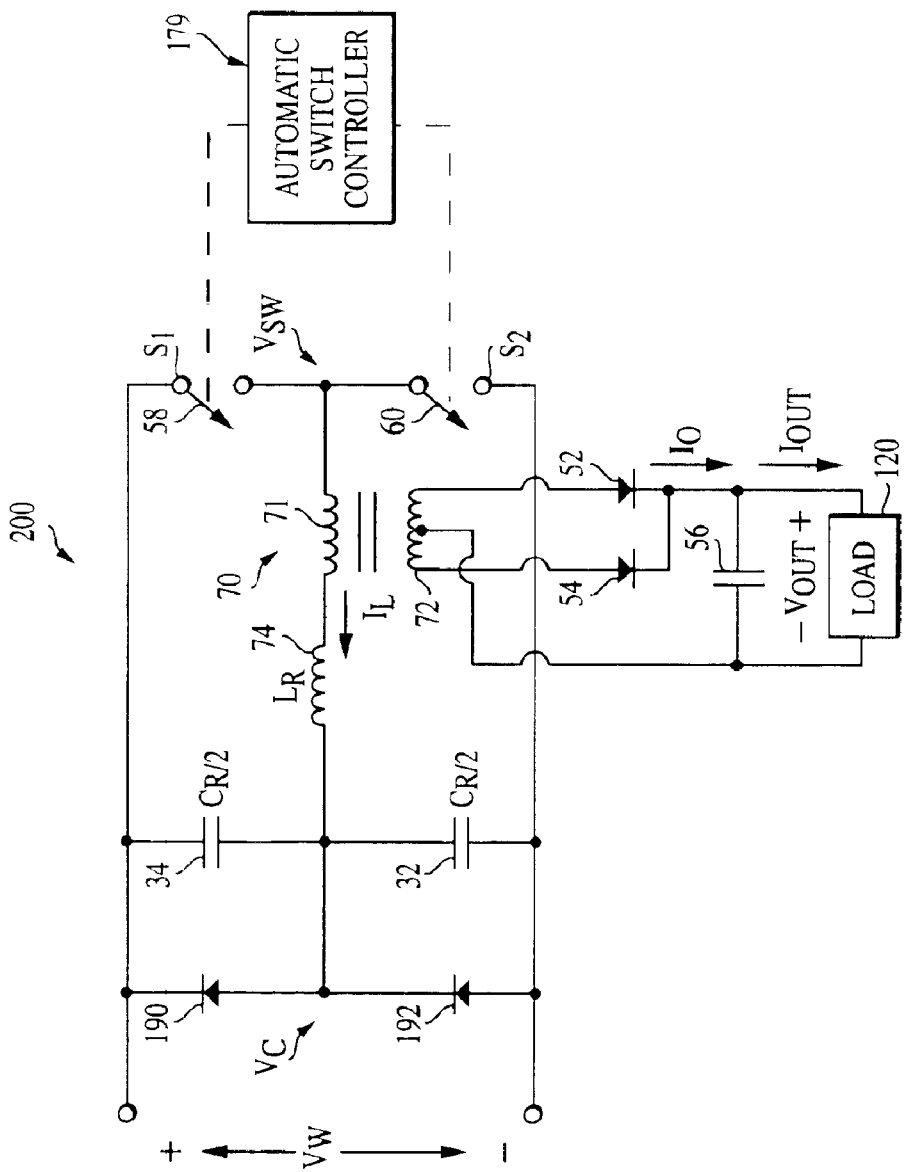
FIG. 25 shows a schematic of circuitry for current limiting in a sine amplitude converter topology.

In certain applications of a VTM, it is desirable to provide simple but fast responding protection against short circuits at the output of the VTM as well as protection against transient or continuous overloads. FIG. 25 shows a SAC 200, which is a modified version of the SAC 90 of FIG. 9. The SAC of FIG. 25 differs from that of FIG. 9 by the addition of diodes 190, 192 in parallel with each of the resonant capacitors 34, 32. The circuit in FIG. 25 may be controlled by an automatic switch controller 179 of the kind described above in connection with FIG. 22. Addition of the diodes in combination with the automatic switch controller and with appropriate circuit component values, as discussed below, provides the SAC of FIG. 25 with current limiting and short circuit protection features. The operation of the circuit of FIG. 25 will be explained in comparison to the operation of the circuit of FIG. 9.

As the load 120 on the circuit of FIG. 9 is increased, the resonant current $I_L$ will increase, as will the peak-to-peak value of the voltage $V_c$. In the event of an overload, $I_L$ and $V_c$ will be limited solely by parasitic resistances in the circuit. In the circuit of FIG. 25, however, this will not be the case. Assume, for example, that the circuit is operating in steady-state at a load current, $I_{out}$, at which the peak-to-peak variation in $V_c$ is slightly less than $V_{in}$. Under these circumstances the clamp diodes 190, 192 remain reverse biased and the circuit will operate essentially identically to the circuit of FIG. 9. If, however, the load is increased to a value that, in the absence of the diodes 190 and 192, would cause the peak-to-peak variation in $V_c$ to be greater than $V_{in}$, then diodes 190 and 192 will clamp $V_c$ preventing it from varying above $V_{in}$ or below ground.

Figure 26:
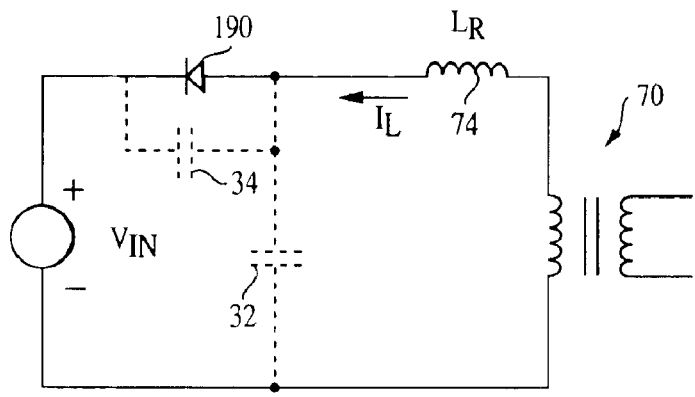
FIG. 26 shows a schematic of an equivalent circuit of a sine amplitude converter topology during clamping.
Figure 27A:
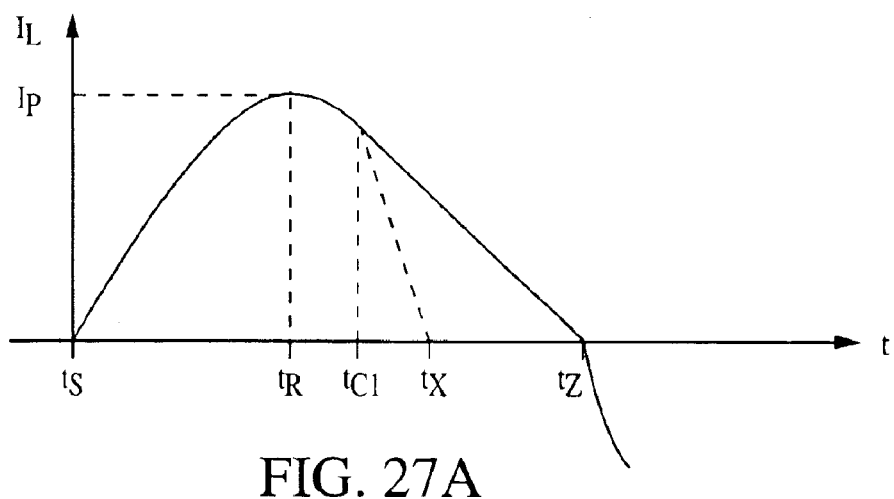
FIGS. 27A and 27B show waveforms for the sine amplitude converter topology of FIG. 25 during clamping.
Figure 27B:
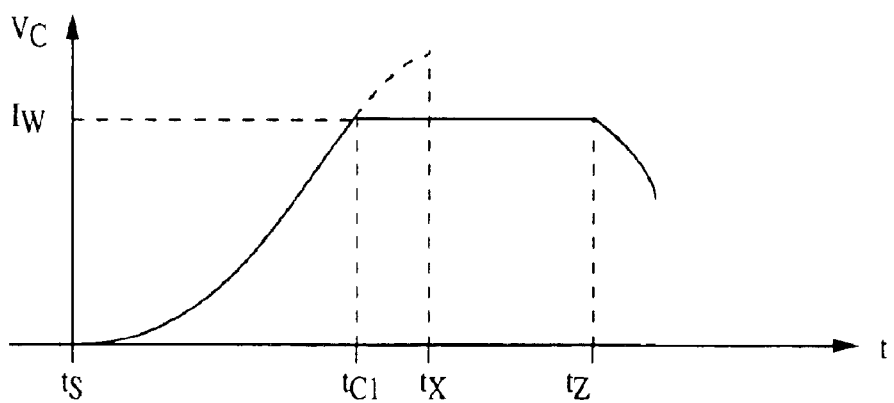

FIG. 26 shows an equivalent circuit of the converter of FIG. 25 assuming that diode 190 is clamping the voltage $V_c$ to the input source voltage $V_{in}$. The voltages across the capacitors 32, 34 are clamped, circuit resonance is prevented and the current $I_L$ flows into the input source, $V_{in}$, via diode 190. The effect of the clamp diode is shown in FIGS. 27A and 27B. The current $I_L$ rises and falls sinusoidally (FIG. 27A) and the voltage $V_c$ rises until it equals $V_{in}$ (FIG. 27B) between times $t_s$ and $t_{c1}$. At time $t_{c1}$, the clamp diode conducts, resonance ceases and the current $I_L$ begins to drop linearly because the resonant inductor 74 is clamped to a fixed voltage. Thus, between $t_{c1}$ and $t_2$, $V_c$ is clamped to $V_{in}$ and $I_L$ declines linearly toward zero. At time $t_2$, the automatic switch controller senses that $I_L$ has reached zero and another cycle begins. Because, in this clamped mode of operation, the current waveform is non-sinusoidal during a portion of each converter operating cycle, the operating frequency of the converter is lower than the characteristic resonant frequency.

In summary, the converter of FIG. 25 will operate as the SAC of FIG. 9 until the load reaches a current value at which the clamp diodes begin to conduct. Further increases in load will result in a decrease in operating frequency, under control of the automatic switch controller 179. Under short circuit conditions, the peak current in the primary will be limited approximately to $I_p=(V_{in}/\pi)*(N_p/N_s)*sqrt(C_R/L_R)$. The output current may thus be limited by appropriately choosing the ratio of $C_R$ to $L_R$.

One drawback of the current limiting scheme shown in FIG. 25 is that it requires that $C_R$ and $L_R$ to be set to specific values. This will not, in general, consistently result in the lowest-Q resonant circuit, which, as explained above, has many benefits, including improved converter operating efficiency and transient response time.

Current limiting to protect against transient overloads and abnormal conditions may, alternatively, be provided without the use of clamp diodes by sensing the current flowing in primary switching elements and limiting, with primary control circuitry, the power conversion duty cycle to limit these currents. Current sensing may be incorporated with reduced dissipation, i.e., without inserting a resistance in series with the power train, by extracting the derivative of the resonant capacitor voltage, i.e., by sensing the rate of change of the resonant capacitor voltage, which is directly proportional to the primary current, with a parallel network consisting of the series combination of a sensing capacitor and resistor. This technique for current limiting SACs is analogous to that which is taught in Vinciarelli, U.S. Pat. No. 5,555,165, "Current Detection in Power Conversion," assigned to the same assignee as this application and incorporated by reference. The instantaneous current flow within a SAC, measured by sensing the rate of change of the resonant capacitor voltage, may also be used to control the output voltage, or current, of a SAC in normal operation. The output of the parallel network consisting of a series combination of a sensing capacitor and resistor may be an input to circuitry to control the power-conversion duty cycle of the SAC, either open-loop or as part of a closed voltage or current loop.

Figure 28:
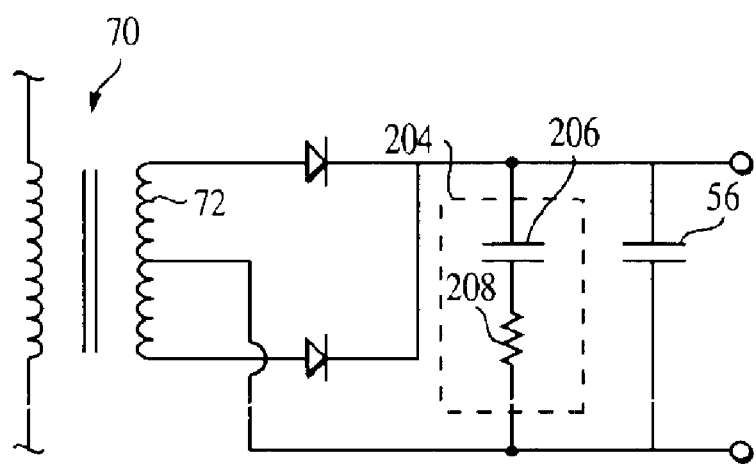
FIG. 28 shows a schematic of damping circuitry for use in a sine amplitude converter topology.

If in a SAC, such as the topology of FIG. 25, the resonant inductance, $L_R$, exhibits a high quality factor, Q, as defined above, and the output storage capacitors 56 are also high-Q devices, oscillatory ringing and overshoot may develop in the output voltage owing to resonance between the storage capacitors and the resonant inductance. Addition of a damping circuit such as damping circuit 204 (shown in FIG. 28), comprising a damping resistor 208 and damping capacitor 206, may be used to reduce or eliminate the ringing.

Figure 35:
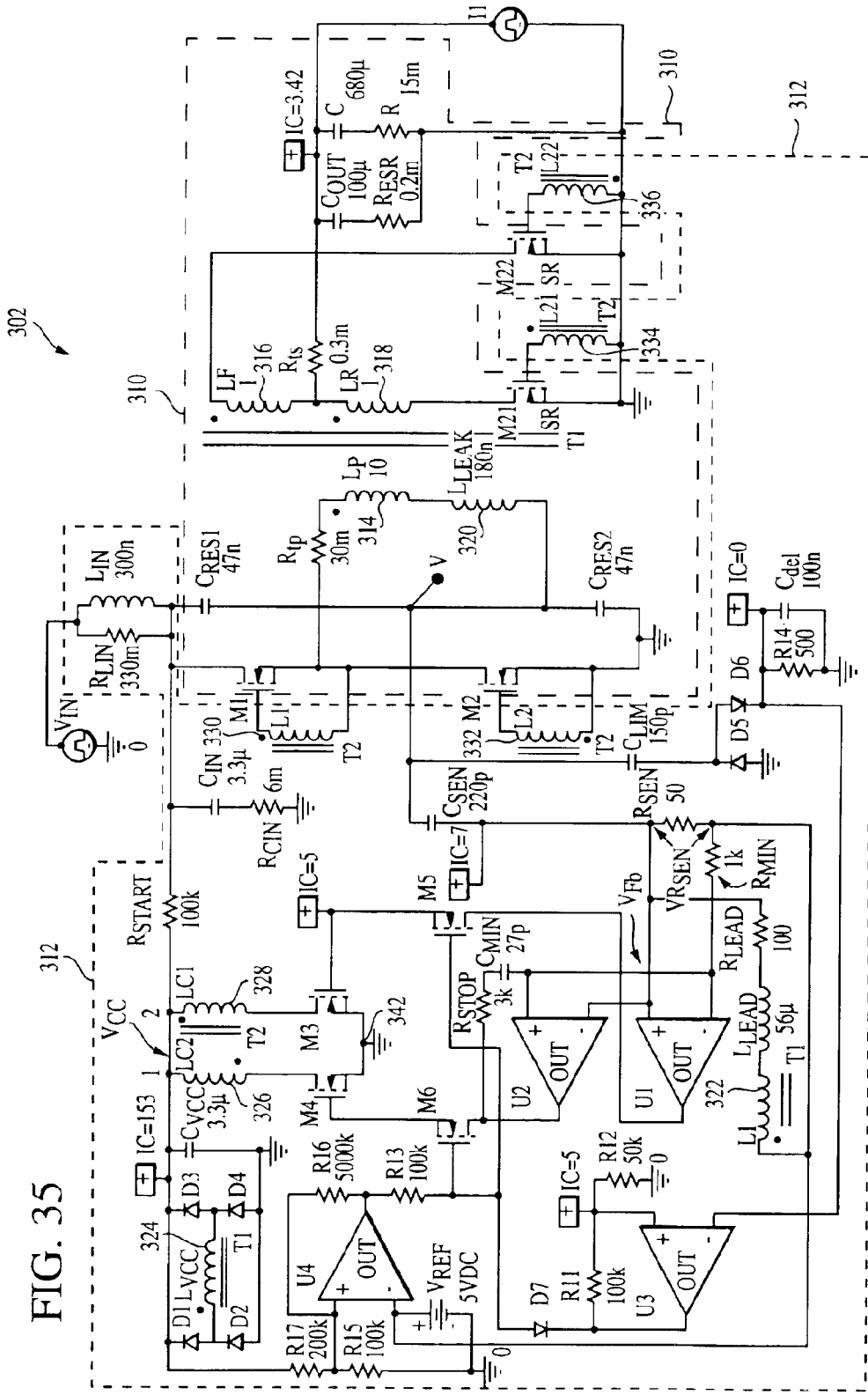
FIG. 35 shows a schematic of a SAC converter 302 including a low-loss, common-source gate-drive circuit.

A schematic of a preferred embodiment of a complete SAC converter 302, in which virtually all of the switching losses are eliminated, is shown in FIG. 35. In the Figure, the SAC comprises a half-bridge, series resonant, converter 310 and input filtering, bias and converter control circuitry 312. The half-bridge, series resonant, converter 310 comprises: primary switches M1 and M2; resonant capacitors $C_{res1}$ and $C_{res2}$; transformer T1, comprising primary winding 314 (having an equivalent winding resistance $R_{tp}$) and secondary windings 316, 318 (having a total equivalent winding resistance $R_{ts}$)(feedback winding 322 and bias voltage winding 324, included in control circuitry 312, are also part of transformer T1); resonant inductance $L_{leak}$ 320 (which may comprise, in whole or in part, the primary-reflected leakage inductance of transformer T1); secondary synchronous rectifier switches M21 and M22; output filter capacitor $C_{out}$ (having an equivalent series resistance represented by resistor $R_{esr}$); and a damping circuit comprising capacitor $C_{damp}$ and resistor $R_{damp}$ (which may comprise, in whole or in part, the equivalent series resistance of capacitor $C_{damp}$). Input filtering, bias and converter control circuitry 312 comprises: an input filter, comprising inductor $L_{in}$, equivalent damping resistance $R_{lin}$, and input capacitor $C_{in}$ (having an equivalent series resistance represented by resistor $R_{cin}$); bias voltage circuitry comprising rectifier diodes D1–D4 and bias filter capacitor $C_{vcc}$; startup resistor $R_{start}$; under-voltage lockout circuitry, comprising comparator U4, resistors R13, R15, R16 and R17 and voltage reference $V_{ref}$; current limiting circuitry, comprising current limiting capacitor $C_{lim}$, diodes D5, D6 and D7, resistors R11, R12 and R14, capacitor $C_{del}$ and comparator U3; automatic gate control circuitry comprising current sense capacitor $C_{sen}$, current sense resistor $R_{sen}$, lead inductor $L_{lead}$, lead resistor $R_{lead}$ (which may comprise, in whole or in part, the equivalent series resistance of lead inductor $L_{lead}$), complementary switch control comparators U1 and U2, MOSFET switches M5 and M6, MOSFET control switches M3 and M4, and transformer T2 comprising primary gate control windings 326, 328 and secondary gate drive windings 330, 332, 334, 336; and a feedback network, comprising resistors $R_{stop}$ and $R_{mm}$ and capacitor $C_{min}$.

When power is initially applied from input source $V_{in}$, capacitor $C_{vcc}$ will charge via startup resistor $R_{start}$. When the voltage across $C_{vcc}$ exceeds a pre-determined under-voltage lockout threshold, set by resistors R15 and R17 and reference voltage $V_{ref}$=5V, the under-voltage lockout comparator U4 will turn switches M5 and M6 ON, enabling automatic circuit operation. Once automatic circuit operation begins, circuit operating bias voltage, $V_{cc}$ (approximately equal to 15 volts), is generated by winding 324 on transformer T1 via the full wave rectifier comprising rectifiers D1 through D4. Throughout the discussion which follows, M5 and M6 are assumed to be ON.

Figure 36A:
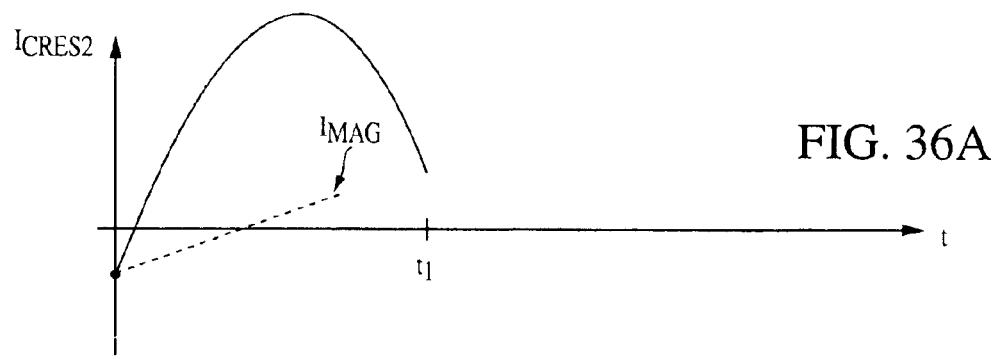
FIGS. 36A–36C show waveforms for the converter of FIG. 35.
Figure 36B:
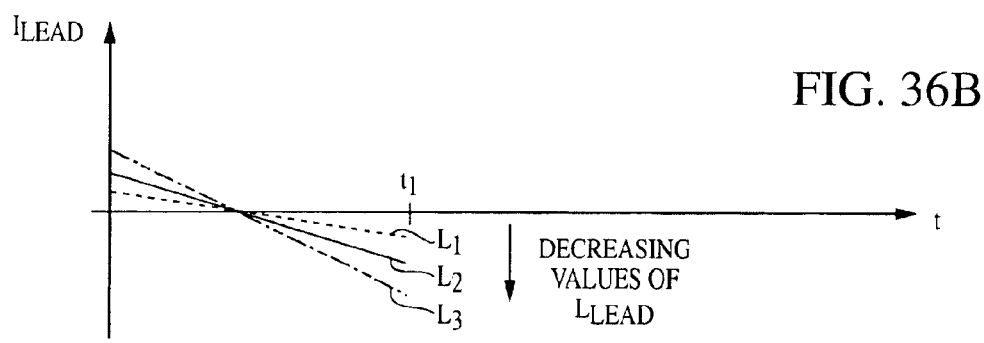
Figure 36C:
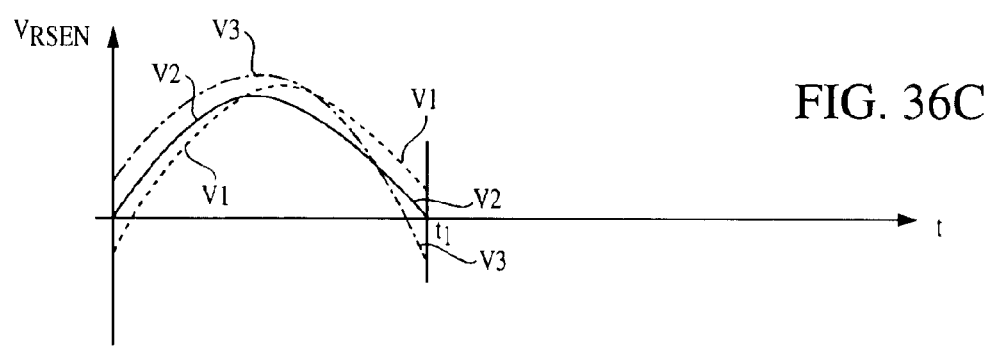

In operation, the approximately square wave of voltage across the primary winding of transformer T1 (as discussed above with respect to FIGS. 9 and 10) is reflected into winding 322 in control circuitry 312. Lead inductor $L_{lead}$ converts the square wave voltage at winding 322 into an approximately linear ramp of current, which flows in resistor $R_{sen}$, connected to the inputs to comparators U1 and U2. The current in capacitor $C_{sen}$ also flows in $R_{sen}$. As explained in Vinciarelli, U.S. Pat. No. 5,555,165, "Current Detection in Power Conversion," if the capacitive impedance of current sense capacitor $C_{sen}$ (in this case, the capacitive impedance at the characteristic frequency of the converter 302) is large relative to the value of current sense resistor $R_{sen}$, as it is in the circuit of FIG. 35, the current in $C_{sen}$ will be a scaled version of the current in resonant capacitor $C_{res2}$. FIG. 36A shows the current in $C_{sen}$ as a scaled version of the current in switch M1, including both a resonant and magnetizing current portion. The resonant portion of the current returns to zero at time $t_1$. FIG. 36B shows the current in $L_{lead}$ for three different values of $L_{lead}$. FIG. 36C shows the voltage across $R_{sen}$, which is proportional to the difference in the currents in FIGS. 36A and 36B. As shown in FIG. 36C, a value of $L_{lead}$=L2 results in the voltage across $R_{sen}$, $V_2$, returning to zero at time $t_1$, when the resonant portion of the current in switch M1 returns to zero; a relatively larger value of $L_{lead}$=$L_1$ results in the voltage across $R_{sen}$, $V_1$, remaining at a positive value at time $t_1$; a relatively smaller value of $L_{lead}$=$L_3$ results in the voltage across $R_{sen}$, $V_3$, being negative at time $t_1$. As explained below, the preferred setting for $L_{lead}$ is a value which is smaller than $L_2$.

Comparators U1 and U2 have the same signals applied to their inputs, but with reversed polarities. Thus, neglecting rise and fall times, when the output of one comparator is high (at positive voltage), the output of the other is low (at ground). One input to comparators U1 and U2 is the voltage across $R_{sen}$ ($V_{rsen}$) offset by a positive DC voltage, $V_{ref}$=5 Volts. The other input to comparators U1 and U2 is a signal, $V_{fb}$, fed back from the output of comparator U2 via a feedback network comprising resistors $R_{stop}$ and $R_{min}$ and capacitor $C_{min}$, and also offset by the positive DC voltage, $V_{ref}$=5Volts. The offset in both signals enables use of a unipolar comparator to compare the two otherwise bipolar signals. As noted above, switches M5 and M6 are enabled during normal converter operation. Both M5 and M6 have a non-negligible channel resistance when ON and the switches are poled so that the anodes of the body diodes of M5 and M6 (not shown in the Figure) connect, respectively, to the gates of control switches M3 and M4. FIG. 38 shows an equivalent circuit of switches M5 and M6, comprising a controllable ideal switch 354, a channel resistance represented by resistor $R_c$ 350 and body diode represented by diode $D_b$ 352. As shown in FIGS. 39A and 39 B, switches M5 and M6 can also be embodied as a circuit, comprising low resistance MOSFET 356 or bipolar switch 357 in series with a discrete resistor $R_d$ 358, in parallel with a diode 359.

With reference to FIGS. 35 and 37, during the period t=$t_o$ to $t_1$ switch M1 is ON, switch M2 is OFF, the output of comparator U1 is high, the output of comparator U2 is low, switch M3 is ON and switch M4 is OFF. At time $t_1$ the signal $V_{rsen}$ (FIG. 37A) declines below the signal $V_{fb}$ (FIG. 37B), causing the output of comparator U1 to go low (FIG. 37C) and the output of comparator U2 to go high (FIG. 37D). The low-going output of U1 rapidly discharges the gate of M3 (FIG. 37E) through the body diode of switch M5, causing the gate voltage to pass through its threshold voltage at time $t_2$, turning M3 OFF. The high-going output of U2 cannot turn switch M4 ON rapidly, however, because the channel resistance of switch M6 slows the charging of the gate of M4. Thus, the gate of M4 does not pass through its threshold voltage, and turn ON, until relatively much later, at time $t_6$ (FIG. 37F). With M3 and M4 both OFF during the period between $t_2$ and $t_6$, the magnetizing inductance of transformer T2 resonates with the capacitive gates of primary switches M1 and M2 and synchronous rectifier switches M21 and M22, redistributing the energy among the gates and causing charging and discharging of the output parasitic capacitances of switches M3 and M4. The rise and fall of the voltages on the gates of switches M1 and M2 are shown in FIGS. 37G and 37H, respectively. Because the threshold voltage ($V_t$) of each switch is positive, and because the ON or OFF state of each switch is determined by when its gate voltage passes through its threshold voltage, switch M1 turns OFF (at time $t_3$, FIG. 37G) prior to the time at which switch M2 turns ON (at $t_4$, FIG. 37H). The period between times $t_3$ and $t_4$, when both switches M1 and M2 are OFF, is the energy-recycling interval, during which the magnetizing current of transformer T1 charges and discharges the parasitic drain capacitances of M1, M2, as previously discussed. ZVS of switches M1 and M2 may be achieved during this interval by proper sizing of the magnetizing inductance of transformer T1. Commutation of the gate voltages and conductivity states of the synchronous rectifiers, M21 and M22, are similar to that of the gate voltages and conductivity states of switches M1 and M2, respectively, and are not shown in the Figure. Because switches M3 and M4 are both OFF between times $t_2$ and $t_6$, ZVS of both M3 and M4 can also be achieved by proper sizing of the magnetizing inductance of transformer T2. At time $t_5$, the drain of switch M4, having crossed zero is clamped by the body-drain diode of M4, thus clamping the voltage across winding 326 to essentially the bias voltage $V_{cc}$, thereby also clamping the winding voltages applied to the gates of switches M1, M2, M21 and M22. At time $t_6$ the gate of switch M4 passes through its threshold voltage and switch M4 turns ON at essentially zero voltage. At time $t_4$ switch M2 turns ON, leading to another power-transfer interval which ends one half-period later, at time $t_1+T/2$, where T is the converter operating period.

The timing relationships shown in FIG. 37 for the SAC converter circuit of FIG. 35 depend on appropriate settings for the magnetizing inductances of transformers T1 and T2, the channel resistance of switches M5 and M6 (or the equivalent circuit resistance, as discussed above) and the value of $L_{lead}$. The magnetizing inductance of transformer T1 is selected to ensure that ZVS of switches M1 and M2 can be accomplished in a short time relative to the overall operating period of the converter, thereby effectively eliminating switching losses in M1 and M2 without unduly reducing the overall duty cycle of the converter. The magnetizing inductance of transformer T2 is selected to ensure that the commutation of the gate voltages of switches M1, M2, M21 and M22 (i.e., between times $t_3$ and $t_4$ in FIGS. 37G and 37H) occurs over a time period which is greater than or equal to the time required to achieve ZVS of the switches. If the magnetizing inductance of transformer T2 is made too small, the gate voltages will change too quickly and ZVS of M1, M2, M21 and M22 will not be completed. If the magnetizing inductance of transformer T2 is made too large, the gate voltages will change slowly and the losses in the switches will increase. The channel resistance of switches M5 and M6 (or the equivalent circuit resistance, as discussed above) is selected so that the time period $t_2$ through $t_6$ is longer than the time period between $t_3$ and $t_4$, thereby ensuring ZVS of switches M3 and M4 and preventing early termination of the ZVS interval of switches M1, M2, M21 and M22. Finally, the value of inductor $L_{lead}$ is selected so that the times at which the resonant portion of the current in switches M1 and M2 returns to zero at the end of each power transfer interval corresponds closely to the point in time at which the switches turn OFF. Thus, in FIG. 37, the time at which it is desirable to have the resonant portion of the current in switch M1 return to zero corresponds to time $t_3$, which is the time at which switch M1 turns OFF. Comparing the waveform for $V_{rsen}$ in FIG. 37A to the waveforms in FIG. 36C, and with reference to the discussion of FIG. 36, it can be seen that the value of $L_{lead}$ may be selected so that it is relatively lower than the value which would results in the voltage $V_{rsen}$ returning to zero at the same time that the resonant portion of the current in switch M1 returns to zero. This accounts for the various delays in the circuit between the time that comparators U1 and U2 change state and the times that their associated primary switches cease conducting.

In FIG. 35, the impedance of capacitor $C_{lim}$ is relatively small (at the characteristic frequency of the converter) compared to the impedance of the averaging circuit comprising diode D6, capacitor $C_{del}$ and resistor R14. Thus, the current in $C_{lim}$ is a scaled version of the primary resonant current and the average voltage across $C_{del}$ and R14 is an averaged value of that current. Averaging is done over positive half-cycles; diode D5 carries the current in $C_{lim}$ on negative half cycles. When the average value of resonant current exceeds a pre-determined threshold set by the values of resistors R11 and R12 and the value of $V_{cc}$ (which is the approximate high-level voltage output of comparator U3), the output of comparator U3 goes low, disabling converter operation by disabling switches M5 and M6. The current limiter of FIG. 35 operates in a periodic mode: after the converter shuts down it will start up again and, if, after restarting, an over-current condition is still present, it will once again shut down. This process will repeat itself until the over-current condition is removed. Alternatively, a latch can be added to the circuit to keep the circuit shut down until input power is removed and reapplied.

Figure 43:
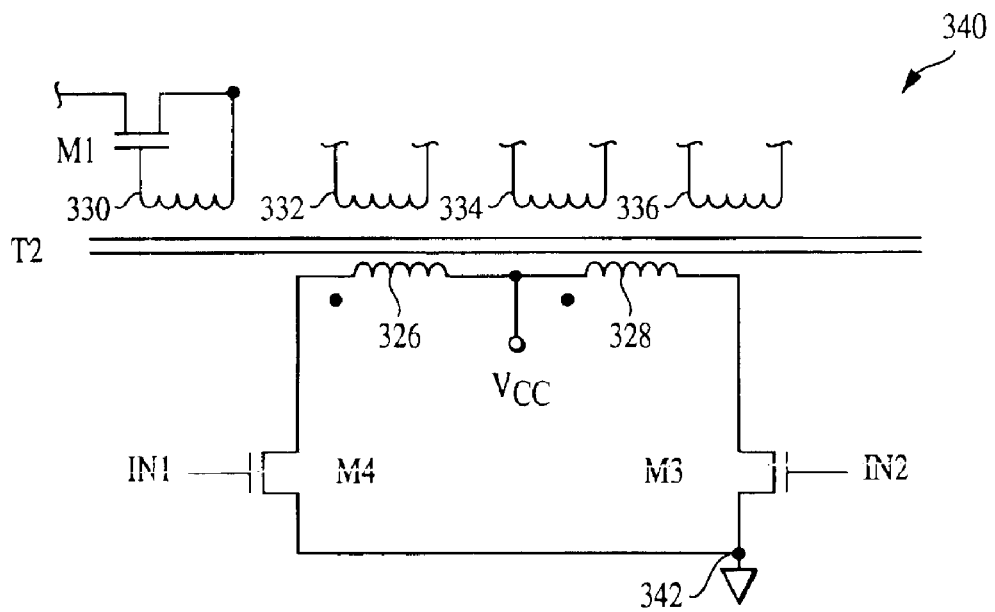
FIG. 43 shows a partial schematic of the low-loss, common-source gate-drive circuitry of the converter of FIG. 35.

When operated as described above, the gate driver circuitry FIG. 35, partially redrawn as low-loss, common source gate control topology 340 in FIG. 43, provides for ZVS of control switches M3 and M4 and of primary and synchronous rectifier switches M1, M2, M21 and M22 while also eliminating essentially all losses associated with the charging and discharging of gate capacitances of the primary and synchronous switches M1, M2, M21 and M22. By this means, the switching losses in the converter are essentially eliminated and the overall losses are reduced to the conduction losses in the channels of the switches. This virtual elimination of switching losses enables high operating frequencies to be achieved at high conversion efficiency. In the low-loss, common source gate control topology of FIG. 43, the control input terminals (i.e., the gate and source terminals) of the control switches M3, M4 share a common reference (i.e., ground 342). Unlike prior art low-loss gate drivers using full or half-bridge topologies for control switches and suffering from the cost and performance limitations associated with driving "floating" switches, whose sources do not have a common DC reference, the control switches of FIG. 35 and of the low-loss, common source gate control topology of FIG. 43 can be controlled at high speed using simple, directly-coupled drive circuitry.

The low-loss, common source gate control topology of FIG. 43 is suitable for use in converters, such as SACs, in which switches are being controlled to operate at 50% duty cycle. Embodiments of low-loss, common source gate drive circuits adapted to operate over a range of duty cycles, including 50%, are shown in FIGS. 44 and 45.

Figure 44:
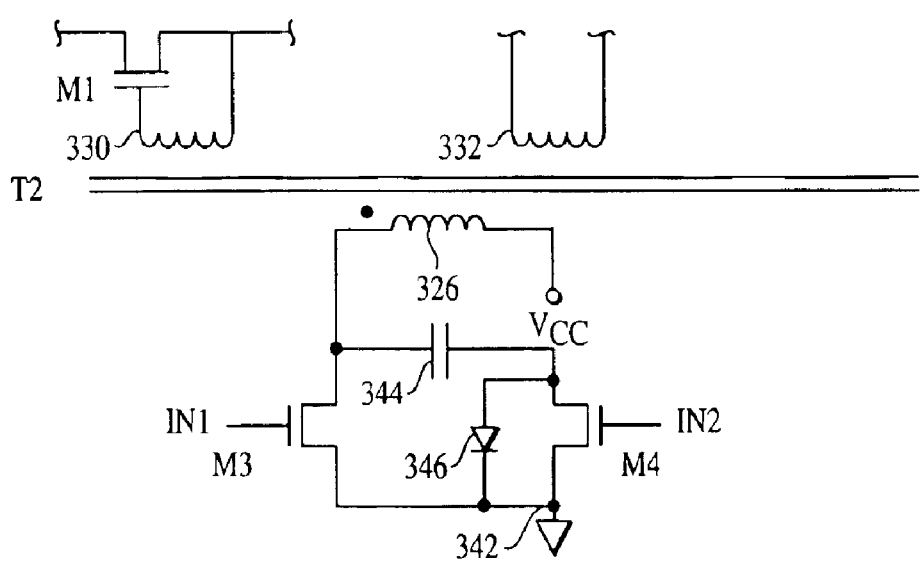
FIG. 44 shows a schematic of an alternative low-loss, common-source gate-drive circuit.

In FIG. 44, switches M3 and M4 are complementary types (e.g., switch M3 is an n-channel MOSFET and switch M4 is a p-channel MOSFET) and the diode 346 may be the body diode of switch M4 or it may be a discrete diode. Switch M4 and capacitor 344 form a "reset" circuit of the kind described in Vinciarelli, "Optimal Resetting of the Transformer's Core in Single-Ended Forward Converters," U.S. Pat. No. Re. 36,098, and in Vinciarelli et al, "Control of Stored Energy in Power Converter Transformers," U.S. Pat. No. 5,805,434, both assigned to the same assignee as this application and incorporated in their entirety by reference. If we assume that switch M3 is controlled by signal IN1 to be ON for a particular time interval at a particular duty cycle, then switch M4 is controlled by signal IN2 to be OFF during a continuous time interval which comprises the interval that switch M3 is ON plus a ZVS interval prior to switch M3 being turned ON and a ZVS interval following the time interval during which M3 was ON. As explained in the '098 and '434 patents, this provides for resetting of transformer T2 as the duty cycle varies over a range. The circuit of FIG. 44 is suitable for use in converter circuits in which a single primary switch may be operated at a duty cycle other than 50% or in converter circuits in which a pair of switches are operated in a mode in which the duty cycle of one switch may be other than 50% and the states of the pair of switches are complementary (i.e., one is ON and the other OFF) throughout each converter operating cycle, except during the ZVS intervals. The source of switch M4 may alternatively be connected to a positive voltage, such as a "$V_{cc}$ voltage," at an essentially DC level to ground for gate drive convenience. A limitation of the low-loss, common source gate control topology of FIG. 44 is that gate voltages vary as a function of the duty cycles of the power switches and that switches that are ON for a greater fraction of the converter period are driven to a lower gate voltage.

Figure 45:
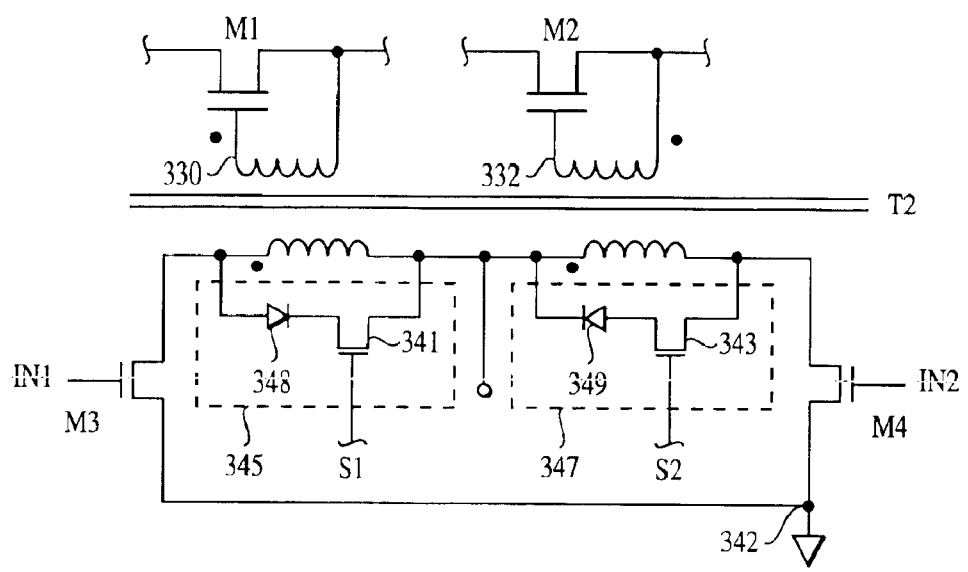
FIG. 45 shows a schematic of another alternative low-loss, common-source gate-drive circuit.

In FIG. 45 the low-loss, common source gate drive circuit 340 of FIG. 43 is modified by addition of a pair of inductive clamp circuits 345, 347, each comprising a switch 348, 349 and a diode 341, 343. Such a circuit is suitable for use in certain converters in which each switch is ON for a fraction of the converter operating period and in which the aggregate duty cycle of complementary switches is less than 100%. The switches 348, 349 are operated as taught in Prager et al, "Loss and Noise Reduction in Power Converters," U.S. patent application Ser. No. 09/834,750, assigned to the same assignee as this application and incorporated in its entirety by reference. In operation, signal IN1 controls switch M3 to be ON for a time interval (during which switch M2 is ON and switches M1, M4, 341 and 343 are OFF), after which switch M3 is turned OFF and switch 341 in clamp circuit 345 is turned ON by signal S1. This interrupts recycling of the magnetizing current of transformer T2 and clamps all the winding voltages near zero, holding all controlled switches (e.g., switches M1, M2) OFF. When the time comes to turn switch M1 ON, switch 341 is first turned OFF, allowing for recycling of the magnetizing energy and commutation of the gate voltages on switches M1 and M2, after which switch M4 is controlled ON by signal IN2. Switch M4 remains ON for a time interval, after which switch M4 is turned OFF and switch 343 in clamp circuit 347 is turned ON by signal S2. The pair of inductive clamp circuits 345, 347 may be replaced by a single bidirectional inductive clamp switch, e.g., connected between the drain of M3 and the drain of M4, subject to the availability of suitable bi-directional switching devices.

The inductive clamp circuit consisting of switches 345, 347 (or, alternatively, a single bi-directional switch) in FIG. 45 may be incorporated within the active clamp topology of FIG. 44 across winding 326 in order to provide a low-loss, common source gate drive topology for complementary switches having a different duty cycle and an aggregate duty cycle less than 100%.

Figure 47A:
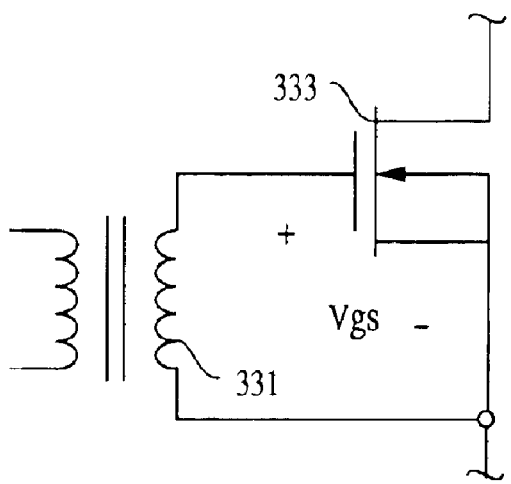
FIGS. 47A and 47B show, respectively, a schematic and waveform for an isolated gate driver circuit having a bipolar gate control waveform.
Figure 47B:
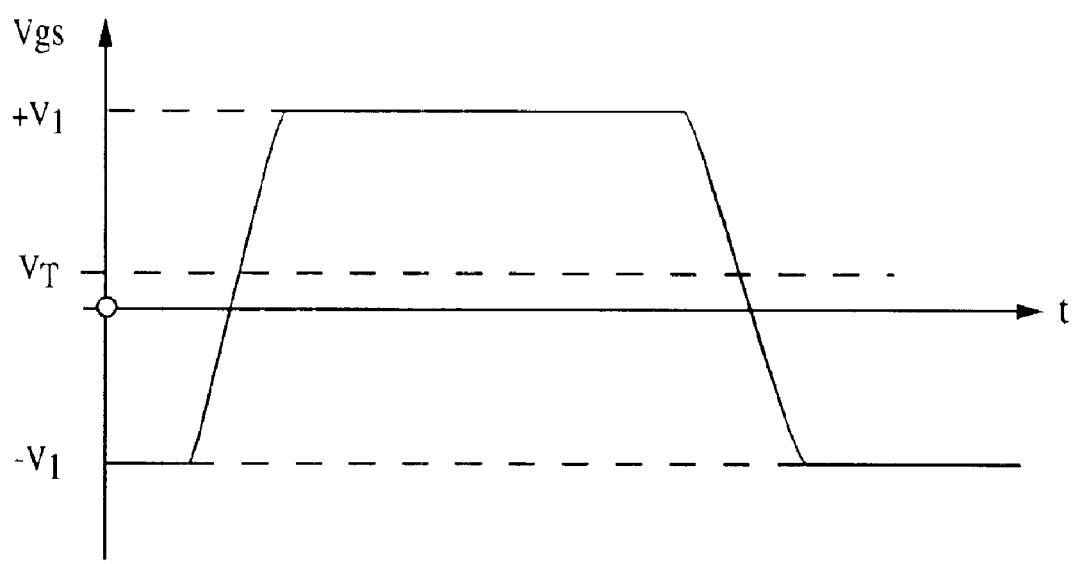

FIG. 47A shows a gate drive circuit, of the same type as the gate drive circuit comprising winding 330 in FIGS. 35, 43, 44 and 45, in which a transformer winding 331 is used to deliver a gate control voltage, $V_{gs}$, to a MOSFET switch 333. As shown in FIG. 47B, the $V_{gs}$ waveform for such a circuit swings between positive and negative values. Bipolar drive in such a circuit is both unnecessary and undesirable: it is unnecessary because negative voltage is not needed to turn the MOSFET OFF (it is OFF when the gate voltage drops below the gate threshold voltage, $V_T$); it is undesirable because the current flow associated with the negative transitions results in superfluous losses in the circuit.

Figure 48A:
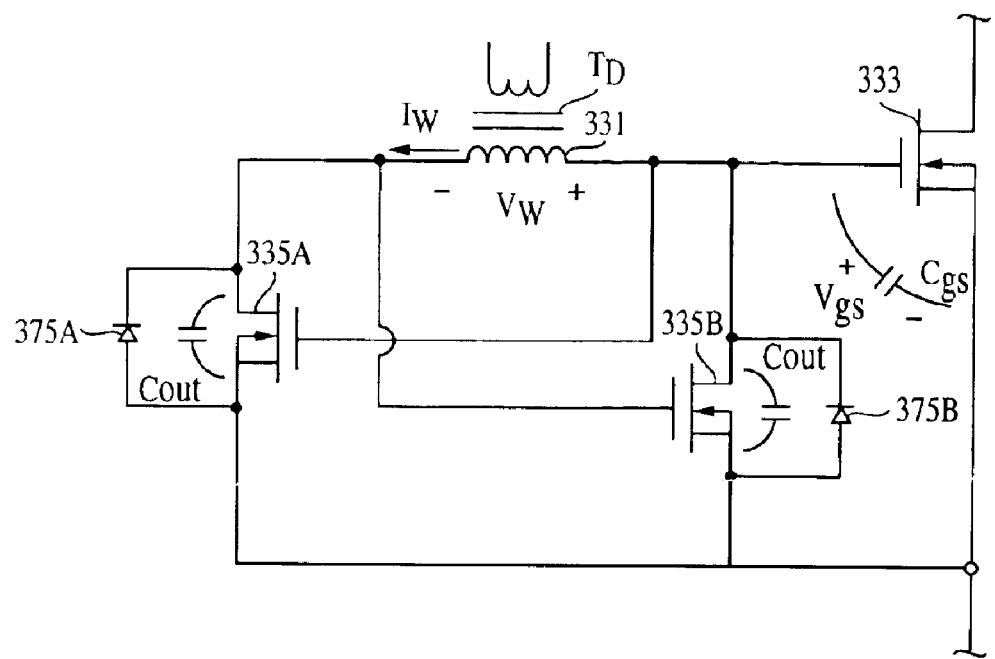
FIGS. 48A, 48B and 48C show, respectively, a schematic and waveforms for an isolated gate driver circuit according to the invention having a unipolar gate control waveform.
Figure 48B:
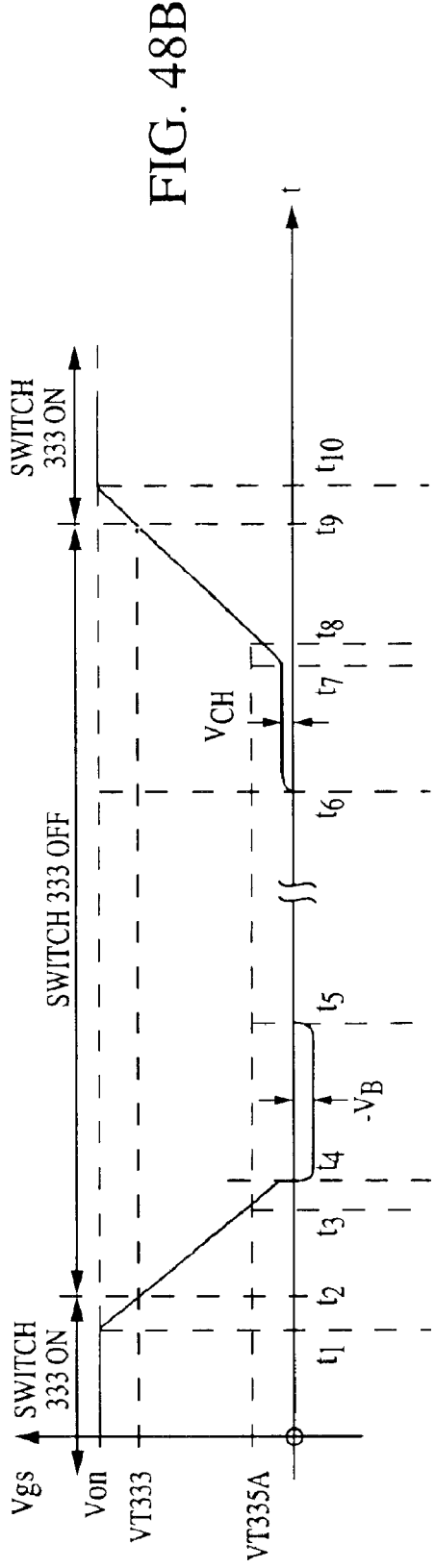
Figure 48C:
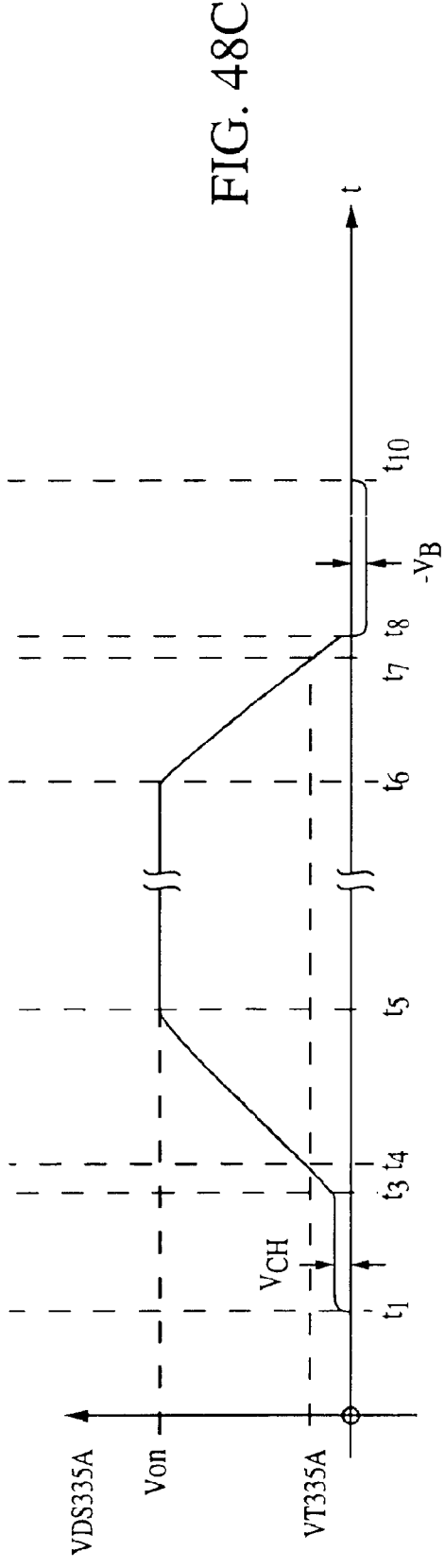
Figure 49:
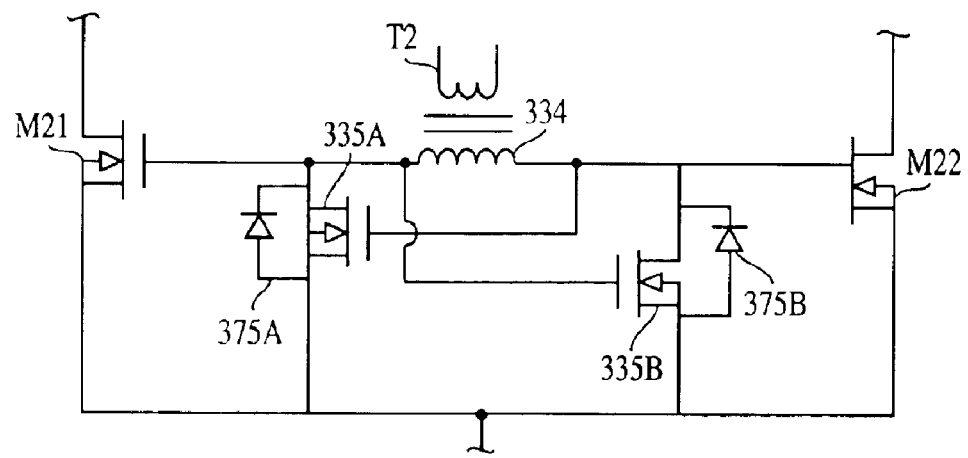
FIG. 49 shows another embodiment of the gate driver circuit of FIG. 48A for use with complementary MOSFET switches.

An improved gate drive circuit is shown in FIG. 48A. In the Figure, two small MOSFET switches 335a, 335b are connected to each end of the winding 331. The winding is a secondary of a gate drive transformer $T_D$ which is driven with a gate driver circuit of the kind described above with reference to FIGS. 35, 43, 44 and 45. FIGS. 48B and 48C show operating waveforms for a preferred embodiment of the circuit of FIG. 48A in which the gate threshold voltage of the primary switch 333, $V_{T333}$, is greater than the gate threshold voltages of the small switches 335a, 335b, $V_{T335A}$ and $V_{T335B}$. Prior to time $t_1$, the primary switch 333 is ON and the voltage $V_w$ is positive and equal to $V_{ON}$. Because $V_{ON}$ is greater than the gate threshold voltages of MOSFET switches 333, 335A, both switches are ON. With switch 335A ON, the gate voltage on switch 335B is essentially zero and switch 335B is OFF. Under the steady state conditions prior to time $t_1$, the current in the winding may be assumed to be essentially zero and the voltage across switch 335A ($V_{DS335A}$, FIG. 48C) is also essentially zero. At time $t_1$ the drive to the gate drive transformer $T_D$ is removed (e.g., switch M4 in the gate drive circuit of FIG. 43 is turned OFF, as described above) and the magnetizing current in the transformer commutates into the secondary winding 331, flowing as current $I_w$ in the direction of the arrow in FIG. 48A. This flow of current discharges the gate capacitance $C_{gs}$ of primary switch 333 and the output capacitance $C_{out}$ of small switch 335B, resulting in a decline in the gate voltage, $V_{gs}$ (FIG. 48B) of switches 333 and 335A. The flow of current $I_w$ also results in a voltage drop, $V_{CH}$, across switch 335A, as shown in FIG. 48C. Since the voltage $V_{CH}$ appears at the gate of switch 335B, it is important that channel resistance of switch 335A be selected to be low enough so that $V_{CH}$ does not exceed the gate threshold voltage of switch 335B, as this would result in switches 335A and 335B being ON at the same time and disrupt the operation of the circuit. At time $t_2$ the voltage $V_{gs}$ declines below the gate threshold voltage of primary switch 333 ($V_{T333}$, FIG. 48B), causing switch 333 to turn OFF. At time $t_3$, $V_{gs}$ declines below the gate threshold voltage of small switch 335A ($V_{T335A}$, FIG. 48B), causing switch 335A to turn OFF. The voltage across switch 335A ($V_{DS335A}$, FIG. 48C) begins to rise as the current $I_w$ charges the output capacitance $C_{out}$ of the switch. At time $t_4$, the voltage across switch 335A increases above the gate threshold voltage of switch 335B ($V_{T335B}$, FIG. 48C), turning switch 335B ON. The current $I_w$ now flows in the channel resistance of switch 335B, resulting in a small negative voltage ($-V_B$, FIG. 48B), across the switch. The voltage across switch 335A ($V_{DS335A}$, FIG. 48C) continues to rise until time $t_5$, at which time the voltage across switch 335A reaches its maximum value, $V_{ON}$. Some time after $t_5$, complementary drive to the gate drive transformer $T_D$ is restored (e.g., switch M3 in the gate drive circuit of FIG. 43 is turned ON, as described above). At time $t_6$ the complementary portion of the cycle begins by once again removing drive from the transformer $T_D$ (e.g., switch M3 in the gate drive circuit of FIG. 43 is turned OFF, as described above). The waveforms for $V_{gs}$ (FIG. 48B) between times $t_6$ and $t_{10}$ are similar in form to the waveforms for $V_{DS335A}$ (FIG. 48C) between times $t_1$ and $t_5$ and the waveforms for $V_{DS335A}$ (FIG. 48C) between times $t_6$ and $t_{10}$ are similar in form to the waveforms for $V_{gs}$ (FIG. 48B) between times $t_1$ and $t_5$. Thus, as illustrated in FIGS. 48B, the circuit of FIG. 48A results in an essentially unipolar drive to the gate terminal of primary switch 333, eliminating the superfluous losses of the circuit of FIG. 47A.

Where the gates of two MOSFET switches are driven in a complementary manner (i.e., the gate signal to one is high when the gate signal to the other is low) and the gate drive signals to the MOSFETs share a common return, as, for example, is the case for the secondary synchronous rectifier switches M21 and M22 of FIG. 35, the gate drive improvement of FIG. 47A may be implemented with further simplification, as shown in FIG. 49. In the Figure, the two windings 334, 336 of FIG. 35 are replaced with a single winding 334, thereby simplifying the construction of transformer T2. Switches 335a and 335b operate as described above for the circuit of FIG. 47A, resulting in an essentially unipolar gate drive for switches M21 and M22.

In the gate driver circuits of FIGS. 48A and 49 the threshold voltages of switches 335A, 335B should be selected to be relatively low to minimize dissipation associated with discharge of the gate capacitance of the primary switch (e.g., switch 333, FIG. 48A; switches M21 and M22, FIG. 49). The threshold voltage of the primary switch must also be greater than or equal to the threshold voltages of switches 335A, 335B, to ensure, e.g. in FIG. 49, that both primary switches cannot be ON at the same time. One way to ensure that these conditions are met is to integrate the primary switches with the gate clamp switches, as illustrated in FIG. 53.

Figure 53:
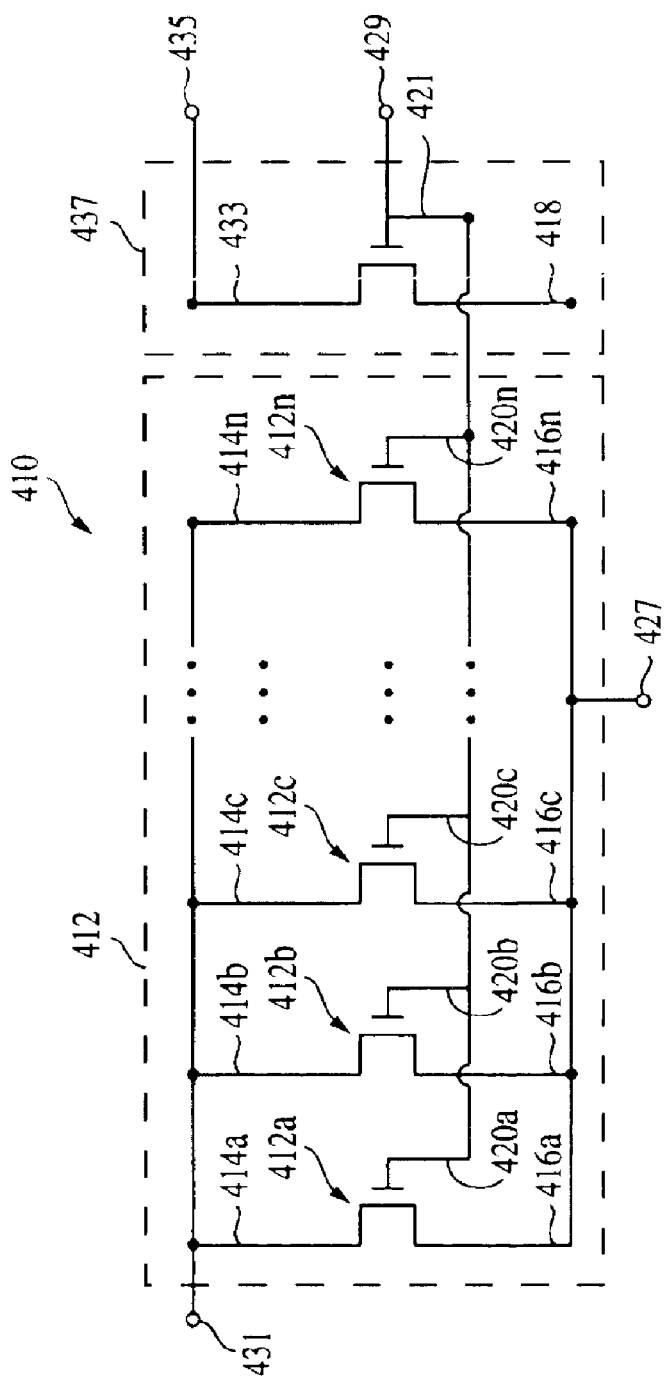
FIG. 53 shows an integrated power MOSFET.

In FIG. 53 a semiconductor integrated power MOSFET 410 is schematically shown to comprise a power section 412, comprising a plurality of paralleled cells 412a–412n, and a sense section 437 comprising a cell which is identical to cells in the power section 412. All of the cells are designed so that their threshold voltage is relatively low. The source connections, 416a–416n and 418, and gate connections, 420a–420n and 421, of all cells in both the power and sense sections are connected together and terminated at source and gate connection terminals 427, 429. The drain connections 414a–414n of all of the cells in the power section are connected together and terminated at drain connection terminal 431, whereas the drain connection 433 of the sense cell 437 is connected to a separate sense terminal 435. Since all of the cells are integrated onto the same semiconductor die, all will have essentially the same threshold voltage.

Figure 54:
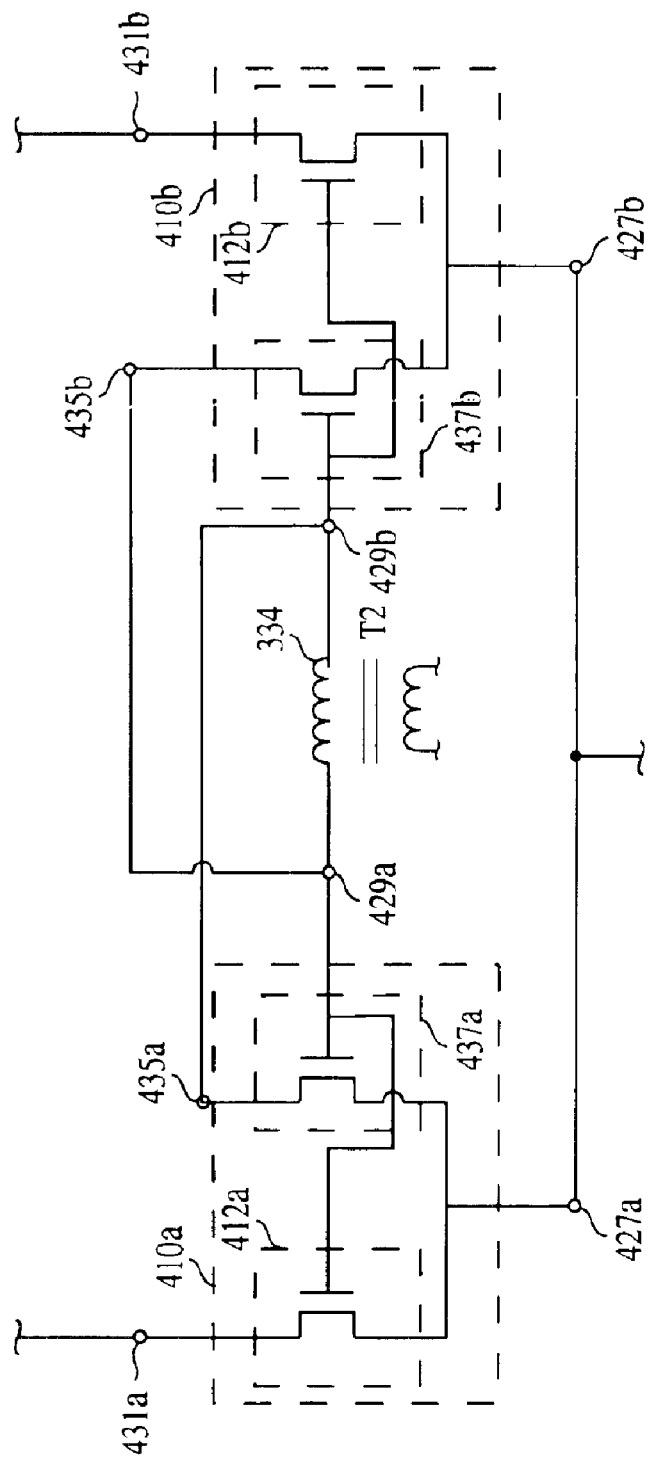
FIG. 54 shows a gate driver of the kind shown in FIG. 49 using integrated power MOSFET devices of the kind shown in FIG. 53.

FIG. 54 shows a circuit of the kind shown in FIG. 49 that incorporates two integrated power MOSFETs 410a, 410b of the kind shown in FIG. 53. The power section 412a (412b) and sense section 437a (437b) of integrated MOSFET 410a (410b) replace switches M21 (M22) and 335B (335A) of FIG. 49 respectively as shown in FIG. 54. The drain terminals 435a, 435b of the sense sections of each device 410a, 410b are respectively connected, as clamps, to the gate terminals 429b, 429a of the other device. By connecting integrated power MOSFETs in this way, the threshold voltages of the clamp switches 437a, 437b and primary switches (formed by power cells 412a, 412b), which are presumed to be relatively low by design, are closely matched. As a result, if the gate voltage of a power cell reaches its threshold voltage value and turns the power cell ON, the clamp switch associated with that power cell will also turn ON, clamping the gate of the other power cell and ensuring that the other power cell is held OFF. More generally, the sense section of an integrated MOSFET may be used to clamp, hold OFF or turn OFF, other switches in other portions of the circuit when the power section of the integrated MOSFET is turned ON. This advantage of the integrated MOSFET is particularly useful in a variety of applications, including synchronous rectifier applications.

Figure 50:
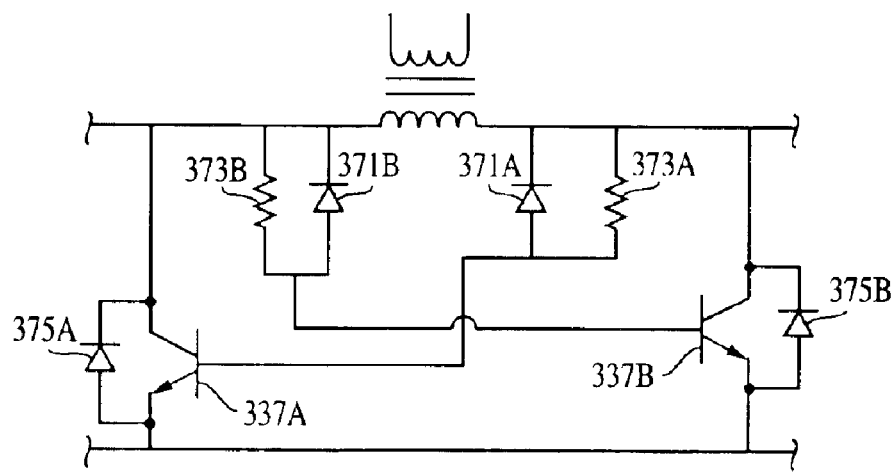
FIG. 50 shows another embodiment of the gate driver circuit of FIG. 49.

Another embodiment of the gate drive circuits of FIGS. 48A and 49, using bipolar transistor switches 337A, 337B, is shown in FIG. 50. In the Figure, resistors 373A, 373B provide a path for turning bipolar switches 337A, 337B ON. Diodes 371A, 371B are connected across resistors 373A, 373B. As a bipolar switch is turned OFF, the voltage drop across its respective diode will subtract from the base-emitter voltage of the bipolar switch as charge is swept out of the base region of the bipolar switch. If the voltage drop of the diode is essentially equal to the base-emitter voltage of the bipolar switch, the voltages will cancel and the effective "threshold voltage" of the bipolar switch (i.e., the voltage equivalent to the voltages $V_{T335A}$ and $V_{T335B}$ in FIGS. 48B and 48C) will be close to zero volts.

Diodes 375A and 375B (FIGS. 48A, 49, 50), which may, in the case of MOSFET switches (e.g., switches 335A and 335B, FIGS. 48 and 49) be the intrinsic body diode of the switch, provide a current path which enables startup of the circuit and which, in general, provides a path for current to flow in the poled direction of the diode when a switch is OFF.

Figure 40A:
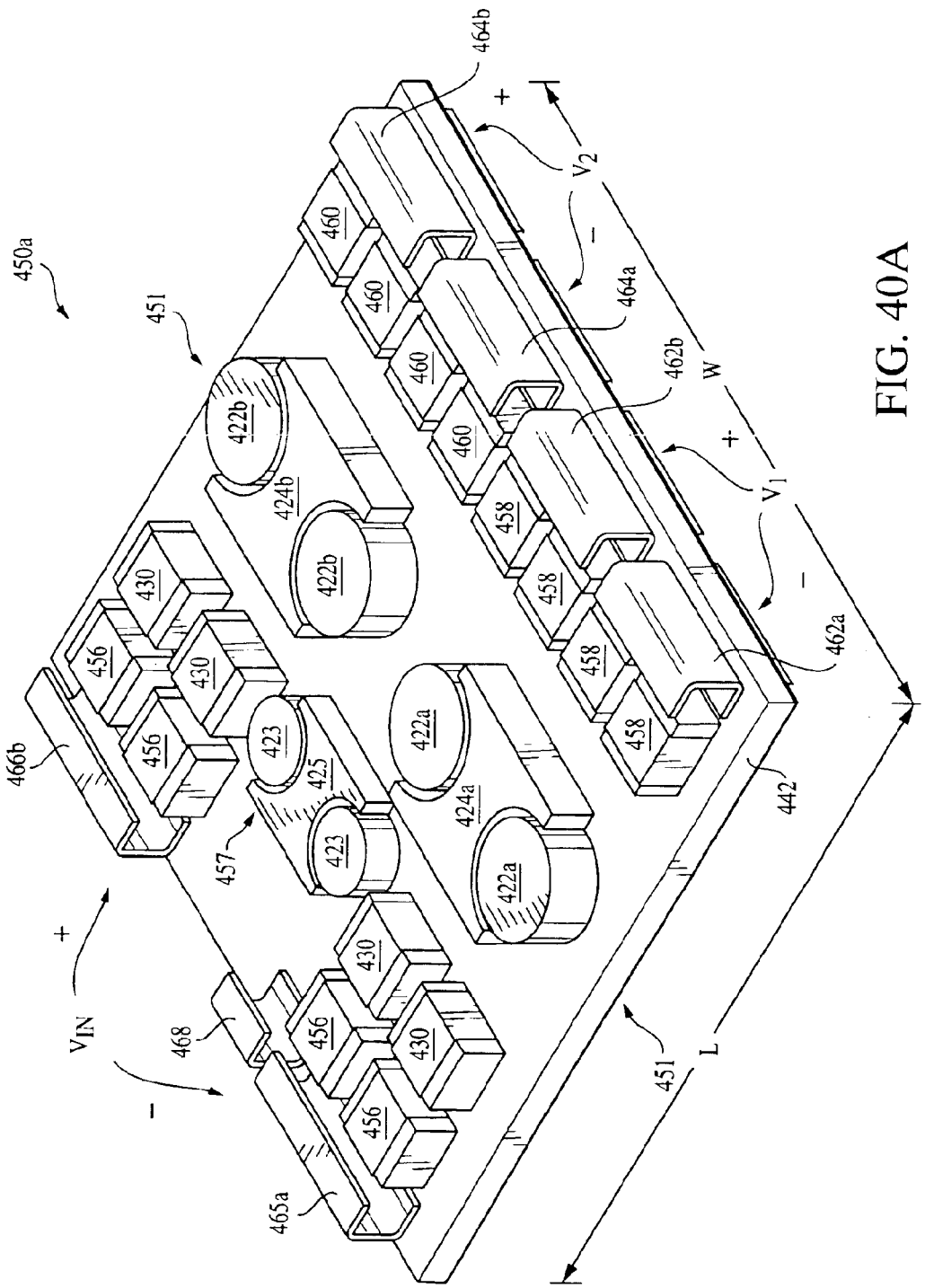
FIGS. 40A and 40B show perspective views of an embodiment of the converter of FIG. 35.
Figure 40B:
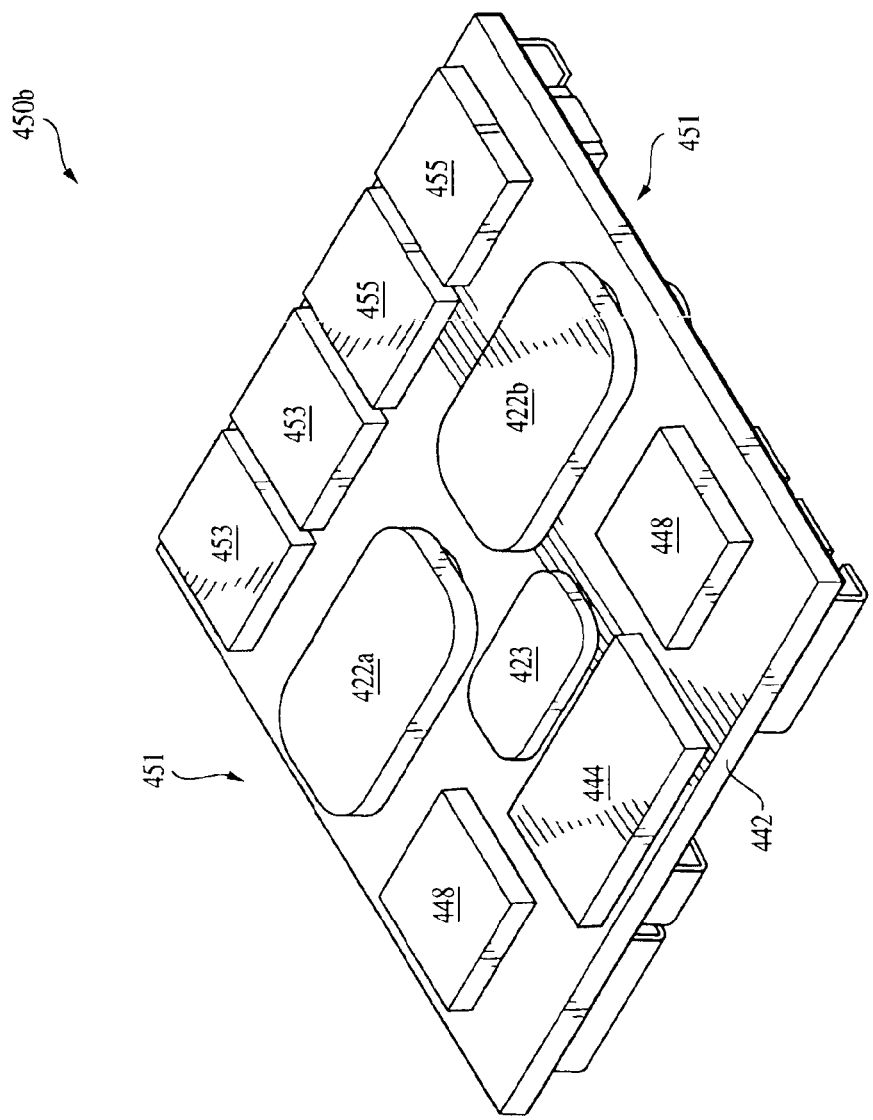

FIGS. 40A and 40B, show, respectively, top and bottom perspective views 450a, 450b of an embodiment of the SAC of FIG. 35, which includes another embodiment of a transformer of the kind shown in FIGS. 32 and 33. The transformer 451 has two core element sets, each set comprising one of two core pieces 422a, 422b and one of two end pieces 424a, 424b. The end pieces may be of a magnetic material or permeable medium different from that of the core pieces. The initial permeability of the end pieces may be relatively low and adapted to set the effective permeability the transformer to the low values required to optimize high frequency ZVS operation of the SAC. Thus, the initial permeability of the end pieces and of the core pieces may be selected from within a range of values, typically less than 10, which may be obtained from temperature stable, low permeability ferrites, or molded ferrite powder or other low-loss high frequency magnetic media. The gaps between the end pieces 424a, 424b and their respective core pieces 422a, 422b may, therefore, be minimized to a mechanical clearance, as opposed to playing a first order role in setting the effective permeability of the core. Magnetic flux may be contained within the core and fringing may be minimized to reduce proximity losses in the windings.

Etches forming the windings (not shown) are part of multi-layer PCB 442. MOSFET switches 448, packaged in 5 mm×5 mm square MLP packages, may be used for the primary switches and may be connected to the primary windings of the transformer via etches (not shown) on the PCB 442. The control circuitry described above with respect to FIGS. 35 through 39, with the exception of capacitors and transformer windings, is provided within an integrated circuit 444. A drive transformer 457, corresponding to transformer T2 and comprising windings 326, 328, 330, 332, 334, 336 of FIG. 35, having a physical structure similar to that of transformer 451 and comprising core piece 423 and end piece 425 is used to drive the gates of main switches 448 and synchronous rectifier switches 453. Resonant capacitors 430, in conjunction with the leakage inductance of transformer 451, set the characteristic resonant frequency of the converter. Input capacitors 456 provide a reservoir of energy and input filtering. The outputs of the synchronous rectifiers 453 connect to output capacitors 458, 460. Windings for the transformers 451, 457 are not shown in FIG. 40 but are of the kind described with respect to the transformer structure of FIGS. 32 and 33. As explained with respect to the example shown in FIGS. 34A and 34B, the secondary windings associated with core sets 422a and 424a may be connected via synchronous rectifiers 453 to capacitors 458, and the secondary windings associated with core sets 422b and 424b may be connected via synchronous rectifiers 455 to capacitors 460, to deliver two separate, isolated and filtered DC output voltages, $V_1$ and $V_2$, at terminal pairs 462a, 462b and 464a, 464b, respectively. The two voltage outputs, $V_1$ and $V_2$ may be the same and the terminals 462, 464 may be connected in parallel to provide a single output with increased total power output; or the voltages may be the same or different and may be used separately. The input voltage, $V_{in}$, may be delivered to the SAC 450 at input terminals 466a, 466b. A signal terminal 468 may be used to deliver a feedback signal to a PRM or power regulator front end, or it may be used for another purpose, e.g., as an enable/disable input to control the outputs of the SAC. The overall dimensions of the SAC 450, including the overmolding epoxy (discussed above), may be L=1 inch (25.4 mm), W=1 inch (25.4 mm) and H=0.2 inch (5 mm).

Figure 41:
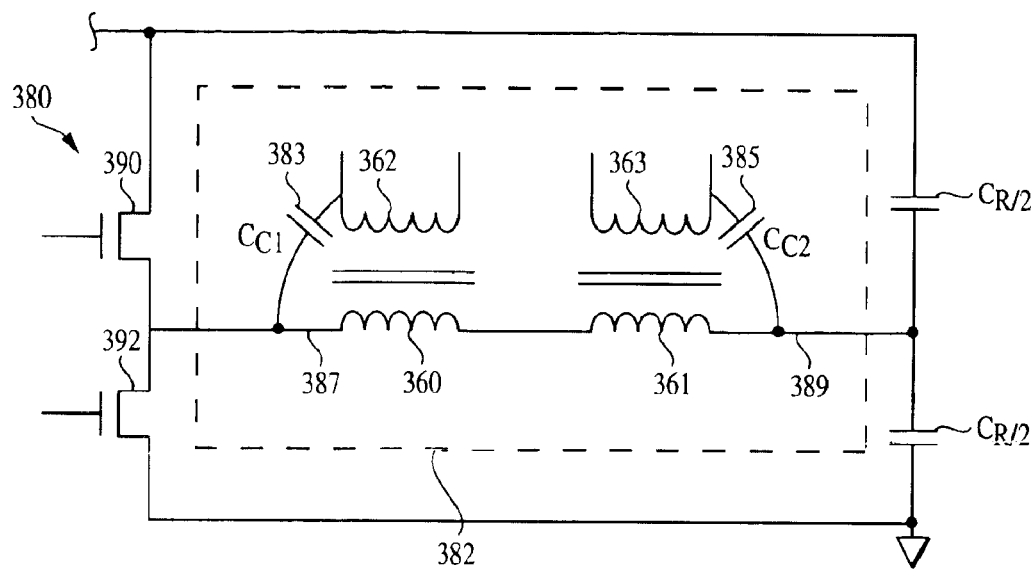
FIG. 41 shows a schematic of portion of a converter of the kind illustrated in FIGS. 9 and 35 with inter-winding parasitic capacitances.
Figure 42:
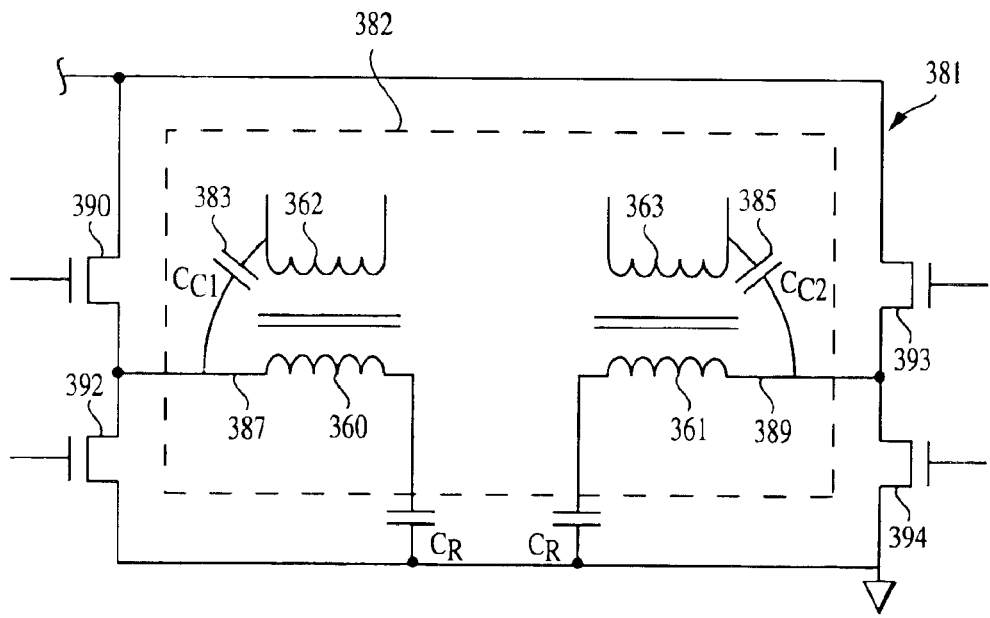
FIG. 42 shows a schematic of an alternative embodiment of a portion of the converter for reducing the effects of the inter-winding parasitic capacitances.

The low-Q transformer structures used in preferred SAC embodiments are characterized by tightly coupled windings, which may be interleaved and exhibit relatively high primary-to-secondary parasitic capacitances. FIG. 41 shows a portion of a SAC 380 of the kind illustrated in FIGS. 9 and 35, which includes two switches 390, 392 and a transformer 382 having multiple primary windings 360, 361 and secondary windings 362 and 363 and which may be of the kind described with respect to FIGS. 32 and 33. Primary-to-secondary parasitic capacitances 383, 385 are shown to form a coupling path between the primary and secondary windings. Because the signals at the ends 387, 389 of the transformer primary windings are different, the signals coupled through capacitances 383, 385 will also be different and this will result in a net coupling of unwanted switching signals into the output circuitry of the converter 380, resulting in the generation of undesirable common-mode noise across the converter. A way to minimize this problem is illustrated in FIG. 42. In the Figure, a converter 381 includes the same transformer structure 382 shown in FIG. 41, but incorporates two additional switches 393, 394. The switches are driven in a complementary fashion i.e., switches 390 and 394 are driven ON and OFF in synchronism, as are switches 392, 393. The result is that the signals at transformer ends 387, 389 will be inverted versions of each other and the signals coupled through primary-to-secondary parasitic capacitances will be of opposite polarity and thus essentially cancel each other. This common-mode noise cancellation mechanism relies on the soft-switching (i.e., ZVS) nature of the SAC converter of FIG. 42, the symmetry between the two halves of its power train circuit and its physical realization, as shown in FIGS. 40a and 40b, to be effective at high frequency. However the two VTM outputs need not be paralleled and may operate at different voltages and loads as long as the outputs are tied symmetrically to a common ground. The technique illustrated in FIG. 42 is easily adapted to the SAC embodiments of FIGS. 34 and 40 because the dog's bones transformer structures are naturally separable into the two halves shown in FIG. 42. In both FIGS. 41 and 42, the transformer may comprise two separate transformers as illustrated.

Figure 46A:
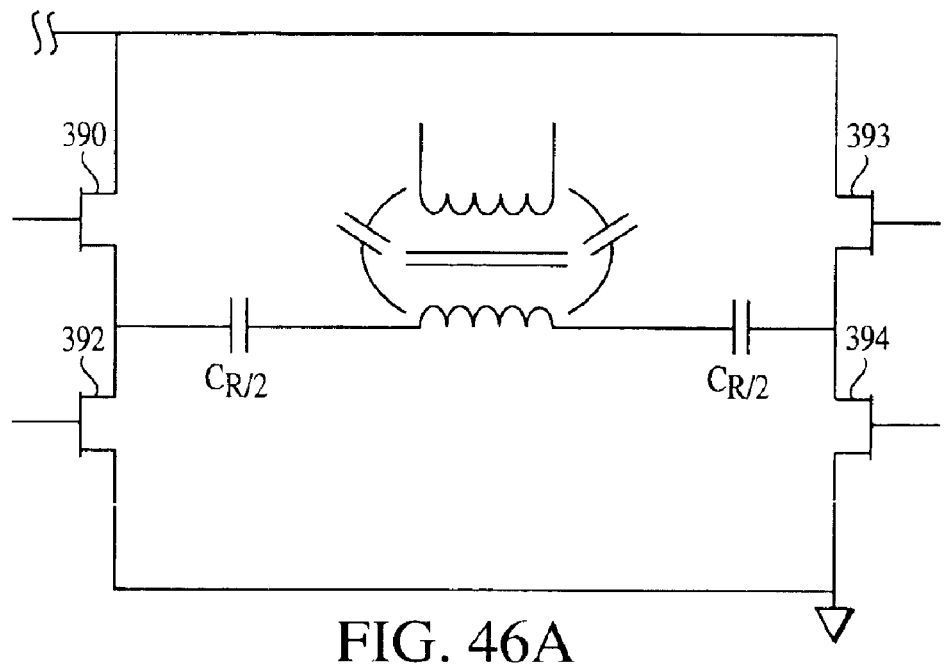
FIGS. 46A, 46B, 46C show schematics of alternative full-bridge embodiments of a portion of the converter for reducing the effects of inter-winding parasitic capacitances.
Figure 46B:
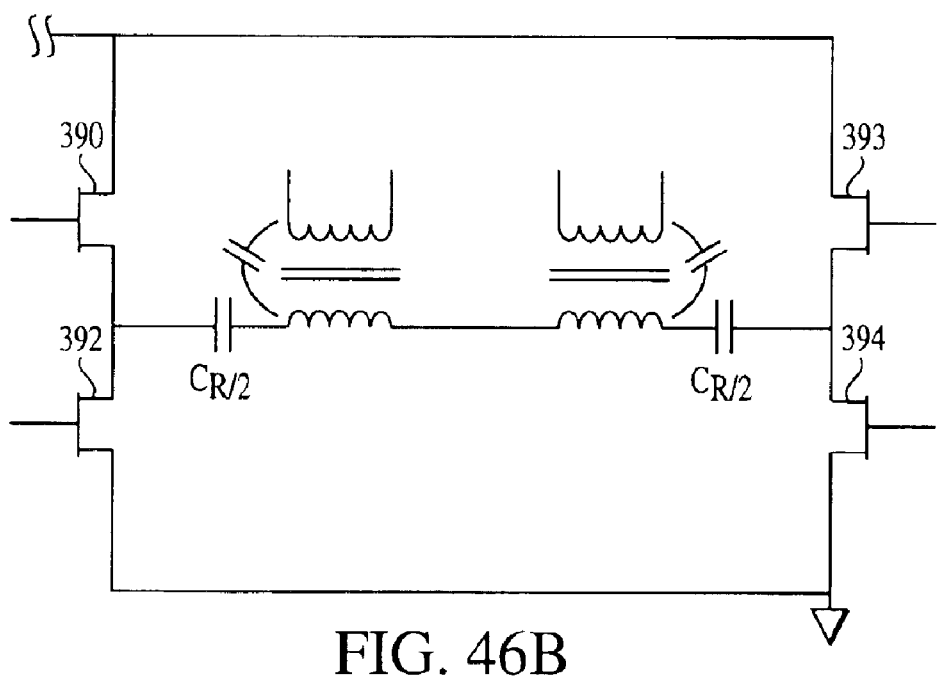
Figure 46C:
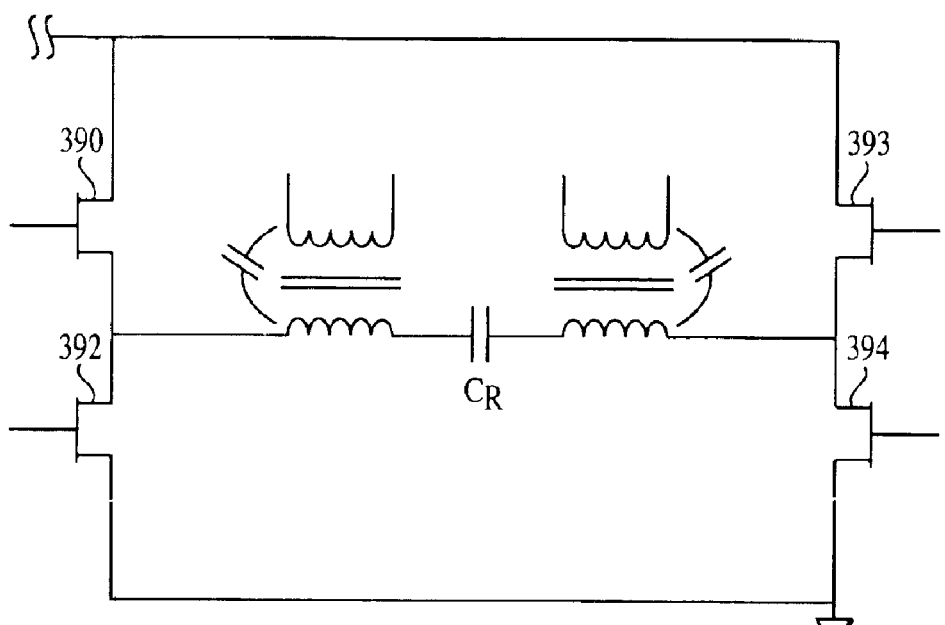

The common-mode noise cancellation mechanism for the SAC half-bridge topology described above is inherent to the SAC push-pull topology of FIG. 14 because of its inherent symmetry. The mechanism may also be applied to the SAC full-bridge topology of FIG. 12 by requiring a more complete symmetry of the full-bridge power train. This may be accomplished by the use of two resonant capacitors connected to the two ends of the primary winding or windings of the transformer as shown in FIGS. 46A and 46B or, alternatively, by a single resonant capacitor connected to the opposite ends of two primary windings as shown in FIG. 46C. The incorporation of common-mode noise cancellation in SAC topologies for VTMs complements the inherently low levels of differential-mode noise stemming from the harmonic purity of Sine Amplitude Converters. The combination of low differential-mode and low common-mode noise performance of VTMs incorporating symmetric SAC topologies is particularly valuable in noise-sensitive power system applications, in addition to its general usefulness in reducing the filtering requirements necessary to achieve agency compliance with respect to conducted and radiated noise emissions.

If conventional transformer structures are used in the VTMs described above, there may be cases, for a particular factorized bus voltage, $V_f$, in which it may not be possible to design a VTM capable of delivering certain values of output voltage. For example, the output voltage of an ideal VTM which comprises a conventional magnetic transformer having a turns ratio $N_s/N_p$, is $V_{out}=T*V_f*N_s/N_p$, where T is a fixed constant relating to the VTM circuit topology (e.g., T=1 for a full bridge topology and T=½ for a half-bridge topology). The gain K of the VTM therefore includes the constant T. In such a VTM, $N_s/N_p$ cannot be set to arbitrary values because it is the ratio of two integer numbers (i.e., the ratio of the integer number of turns on a secondary winding to the integer number of turns on a primary winding). One way to solve this problem is to use multiple factorized buses, as described above with respect to FIGS. 7 and 8. If, for example, the primary of the transformer has 10 turns, then secondary turns of 1, 2, 3 and 4 will result in turns ratios, $N_s/N_p$, of, respectively, 0.1, 0.2, 0.3 and 0.4. If a factorized distribution bus provides a voltage, $V_f$, such that $T*V_f$ is 50V, then output voltages of 5V, 10V, 15V and 20V can also be achieved using different turns ratios, but other output voltages, such as 3.3V or 12V, cannot. If, however, another factorized distribution bus is provided which delivers another factorized bus voltage, such that $T*V_f$ is 40V, then the same set of turns ratios can deliver 4V, 8V, 12V and 16V, respectively. Likewise, another factorized bus at a voltage which provides $T*V_f=33V$ can produce VTM outputs of 3.3V, 6.6V, 9.9 V and 13.2 volts. In summary, by designing VTMs which are optimized to operate from different values of factorized bus voltages, $V_f$, and providing different transformation ratios, virtually any value of output voltage can be generated.

Another way to provide a range of VTM output voltages without using multiple factorized buses is to use transformer structures in which turns ratios are not limited to ratios of integers. Transformers of this type are described, e.g., U.S. Pat. No. 4,665,357, "Flat Matrix Transformer," incorporated by reference in its entirety. Generally, Faraday's law supports arbitrary transformer "turns ratios" based on the ratio of magnetic flux coupled to the primary and secondary windings of the transformer.

Multiple factorized distribution buses may also be used within the Factorized Power Architecture to provide very high levels of fault tolerance by eliminating single point failures associated with a single distribution bus. In particular, VTMs may be powered from multiple buses to support a critical load (e.g., brakes in a car) or they may be automatically switched by selectively opening and closing switches (e.g., low ON-resistance MOSFETs) in series with each VTM onto redundant factorized power buses, thus allowing power system flexibility at moderate costs by virtue of the inherent simplicity and low cost of VTMs.

Figure 21:
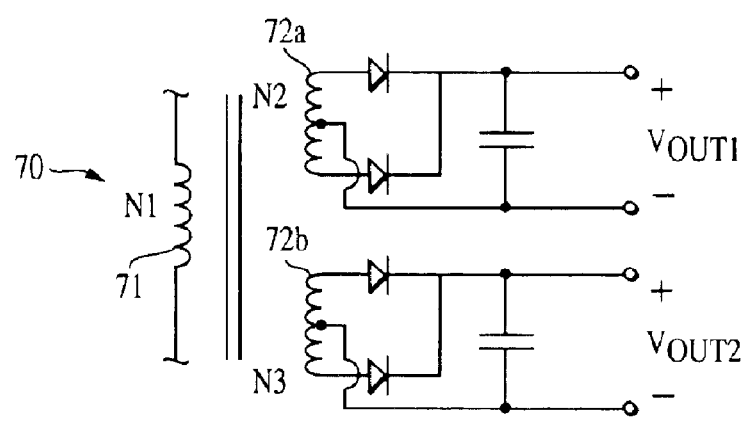
FIG. 21 shows a partial schematic of alternate circuitry for a sine amplitude converter topology for use in a dual output voltage transformation module.

A multiplicity of output voltages may be obtained from a multiplicity of VTMs or from multiple-output VTMs. For example, if, as shown in FIG. 21, the transformer 70 of the SAC of FIG. 9 is provided with two secondary windings 72a, 72b, the corresponding VTM will provide two output voltages, $V_{out1}$ and $V_{out2}$, which will be related by the turns-ratios of their respective windings. Thus, if each center-tapped secondary winding 72a, 72b has N2 and N3 turns, respectively, then the output voltage $V_{out2}$ will be essentially equal to $V_{out1}*N3/N2$. In multiple output VTMs care must be exercised to minimize and balance leakage inductance relating to secondaries of the transformer. Incremental, primary resonant inductance may be used to improve matching of resonant frequencies associated with multiple output SACs. The regulation and cross-regulation characteristics of multiple output VTMs incorporating SAC power trains will be superior to that of traditional power supplies with open-loop, "derived" auxiliary outputs because of the cancellation of reactive impedances which gives rise to an output resistance matrix, $R_{out}$, governing the load dependency associated with a multiplicity of outputs.

Figure 16:
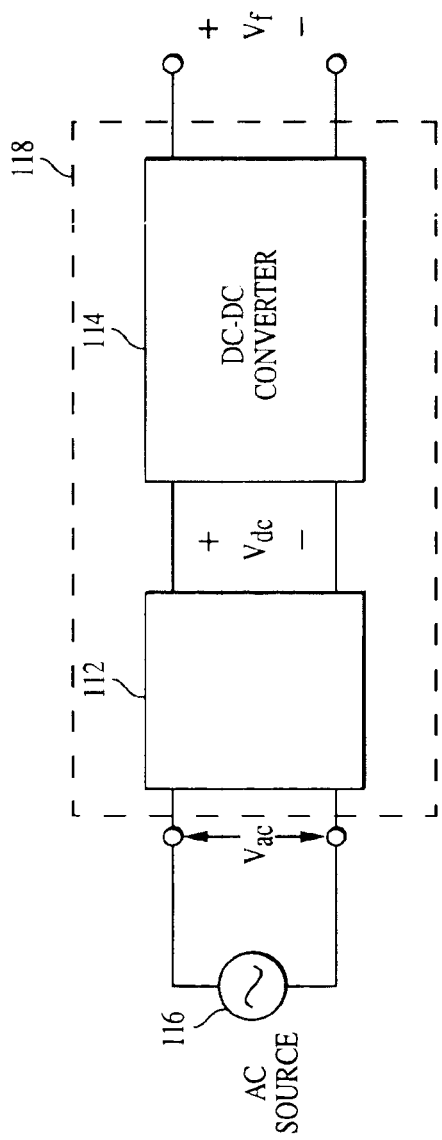
FIG. 16 shows a block diagram of a power regulator for use with an AC input source.

Power regulators (see, e.g., FIGS. 3, 6, 7, and 8) for use in FPA systems can be isolated and/or non-isolated and can use any of a variety of topologies, depending upon the input source (or sources) and other application requirements. As shown in FIG. 16, if the source is an AC utility source (e.g., 110 or 220 VAC, 50/60 Hz), the power regulator 118 can comprise a combination of a utility source rectifier and conditioner 112 and an isolated, regulating DC—DC converter 114. In general, the power regulator 118 will generate a controlled, DC output voltage, $V_f$, which is relatively low (e.g., 48V, 24V) compared to the peak value of the AC source and which is galvanically isolated from the AC source for safety reasons. The AC source 116 voltage is delivered to the input of the rectifier and conditioner 112, which produces a unipolar output voltage, $V_{dc}$. The voltage $V_{dc}$ is delivered to the input of the isolated DC—DC converter 114, which generates the controlled voltage, $V_f$, for delivery to inputs of VTMs. Where harmonic attenuation or power factor correction is not required, the rectifier and conditioner 112 can comprise a full-wave or half-wave rectifier and storage capacitors for smoothing the rectified AC source voltage. Where harmonic attenuation or power factor correction is desired, the rectifier and conditioner 112 can comprise a non-isolated boost switching converter controlled by a power factor correcting controller or it can comprise a passive harmonic attenuator of the kind described in U.S. patent application Ser. No. 09/944,737, "Passive Control of Harmonic Current Drawn from an AC Input by Rectification Circuitry," assigned to the same assignee as this application and incorporated by reference in its entirety. Alternative approaches to interfacing with AC utility lines include use of a single stage, isolated, power-factor-correcting front end. See e.g., U.S. Pat. No. 6,069,801, "Power Factor Correction in Switching Power Conversion," assigned to the same assignee as this application and incorporated by reference in its entirety.

Figure 17:
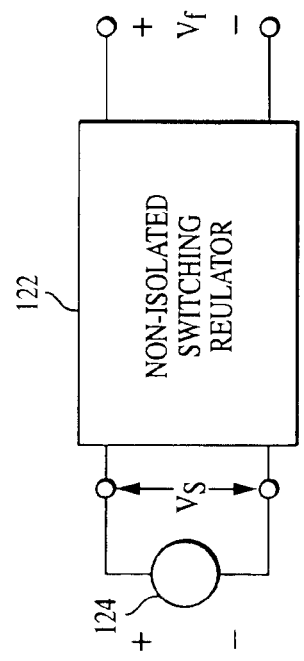
FIG. 17 shows a block diagram of a power regulator for use with a DC input source.

If the input source is a relatively high voltage DC source, the power regulator can comprise the same topological features, including isolation for safety reasons, as those described above for an AC utility source, except that there will be no requirement for rectification, power factor correction and/or harmonic attenuation. As shown in FIG. 17, if the DC input source 124 is at a relatively low voltage (e.g., nominally 48 VDC or below), a non-isolated switching regulator 122 can be used to generate the controlled voltage $V_f$ for delivery to the inputs of VTMs. The non-isolated switching regulator can be a buck, boost, or buck-boost converter depending on the range of variation of the voltage, $V_s$, delivered by the DC input source and the desired value of $V_f$.

With reference to FIG. 3A, the voltage, $V_{in}$, at the input to a VTM 44 in an FPA system 36 will generally be slightly different from the voltage, $V_f$, delivered to the factorized distribution bus 40 by the power regulator 38, owing, for example, to voltage drops in the distribution bus. Variations in the voltage, $V_{in}$, delivered to the input of a VTM will produce a proportional variation at the output, $V_{out}$. Where losses in the distribution system are small, their effect on the output voltages of VTMs will also be small. However, in certain cases it may be desirable to actively regulate the output voltage of a VTM.

Figure 18:
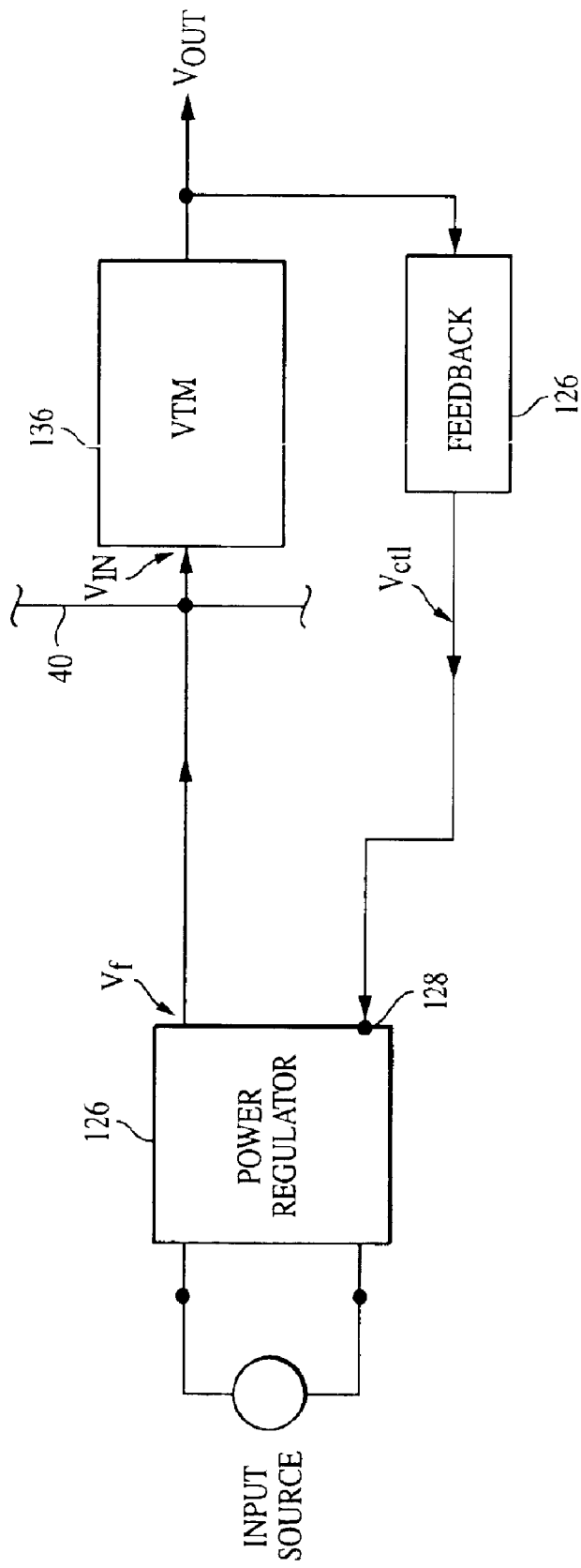
FIG. 18 is a block diagram of remote feedback by way of the Power Regulator within the factorized power architecture.

One way to actively regulate the output voltage of a VTM is illustrated in FIG. 18. In the Figure, the output voltage, $V_{out}$, of a VTM 136 is regulated by use of a feedback controller 126 which compares the VTM output voltage, $V_{out}$, to a reference signal $V_{ref}$ (not shown), indicative of the desired value of $V_{out}$, and uses an error between $V_{out}$ and $V_{ref}$ to generate a control signal, $V_{ctl}$, delivered to a control input 128 of the power regulator 126, as a means of reducing or eliminating the error. In the feedback architecture of FIG. 18, $V_{ctl}$ is used by the power regulator 126 to control the magnitude of $V_f$ to maintain the output voltage of the VTM at the desired value. The feedback controller may be realized as a stand-alone device, as shown in FIG. 18, or it may be incorporated either within the Power Regulator or within the VTM.

Figure 19:
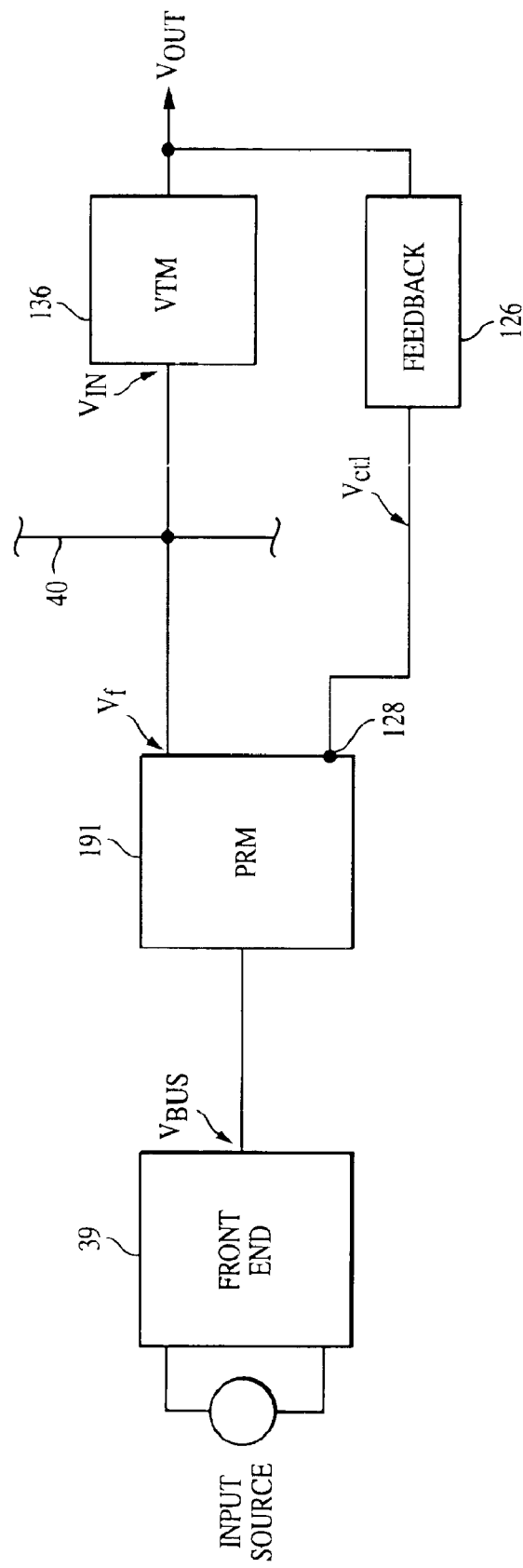
FIG. 19 is a block diagram of remote feedback by way of a PRM within the factorized power architecture.

Another method to actively regulate the output voltage of a VTM is illustrated in FIG. 19. In the Figure, the output voltage of a VTM 136 is regulated by use of a feedback controller 126 which compares the VTM output voltage, $V_{out}$, to a reference signal (not shown) indicative of the desired value of $V_{out}$, and uses an error between $V_{out}$ and $V_{ref}$ to generate a control signal, $V_{ctl}$, delivered to a control input 128 of the PRM 191, as a means of reducing or eliminating the error. The feedback loop and signal paths may be contained within the subassembly where the PRM 191 and VTM 136 are located (remotely from the front end 39).

Figure 20:
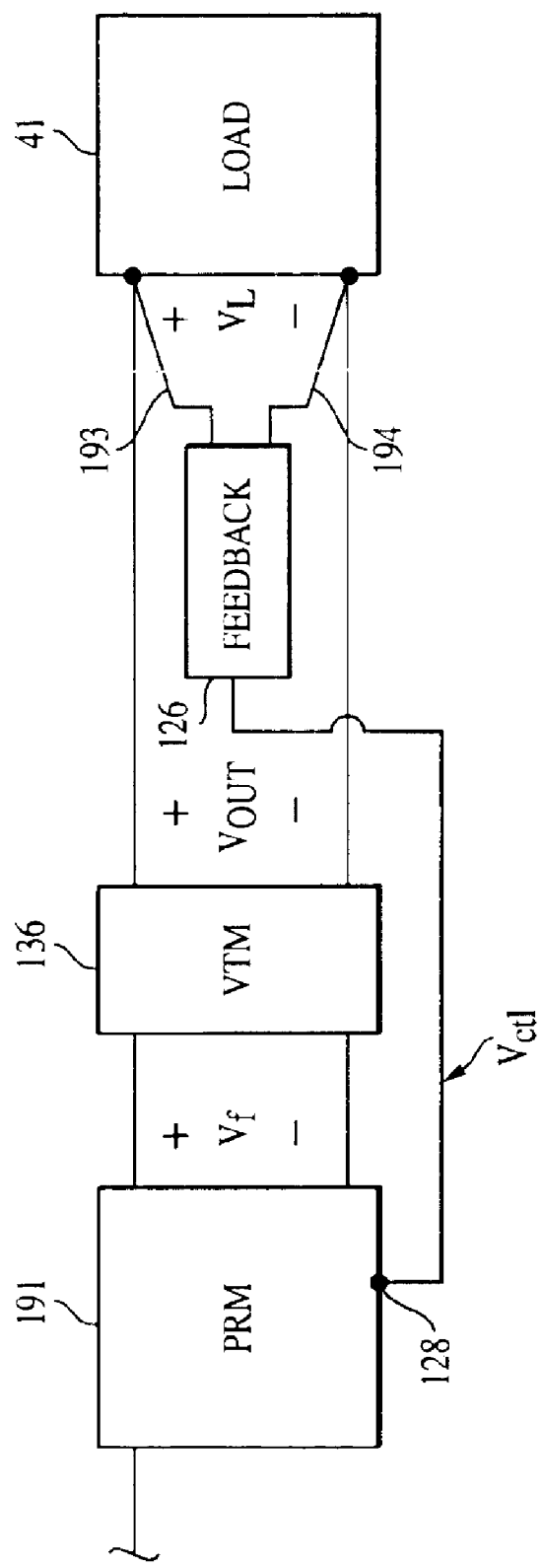
FIG. 20 is a block diagram of remote feedback by way of a power regulator or PRM from a point-of-load feedback controller.

In certain applications, the VTM may be located remotely from the point-of-load and the voltage at the point-of-load, $V_L$, may be lower than the voltage, $V_{out}$, at the output of the VTM. One method to actively regulate the voltage at the point-of-load is shown in FIG. 20. In the Figure, sensing leads 193, 194 deliver the voltage $V_L$ at the point-of-load to a feedback controller 126. The feedback controller (which may be locally powered by the voltage $V_L$) monitors the value of $V_L$, compares it with an internal reference signal $V_{ref}$, and generates a control signal, $V_{ctl}$, delivered to the control input of a remote power regulator (e.g. 38 in FIG. 3A) or a remote PRM (e.g. 43 in FIG. 3B).

Figure 31:
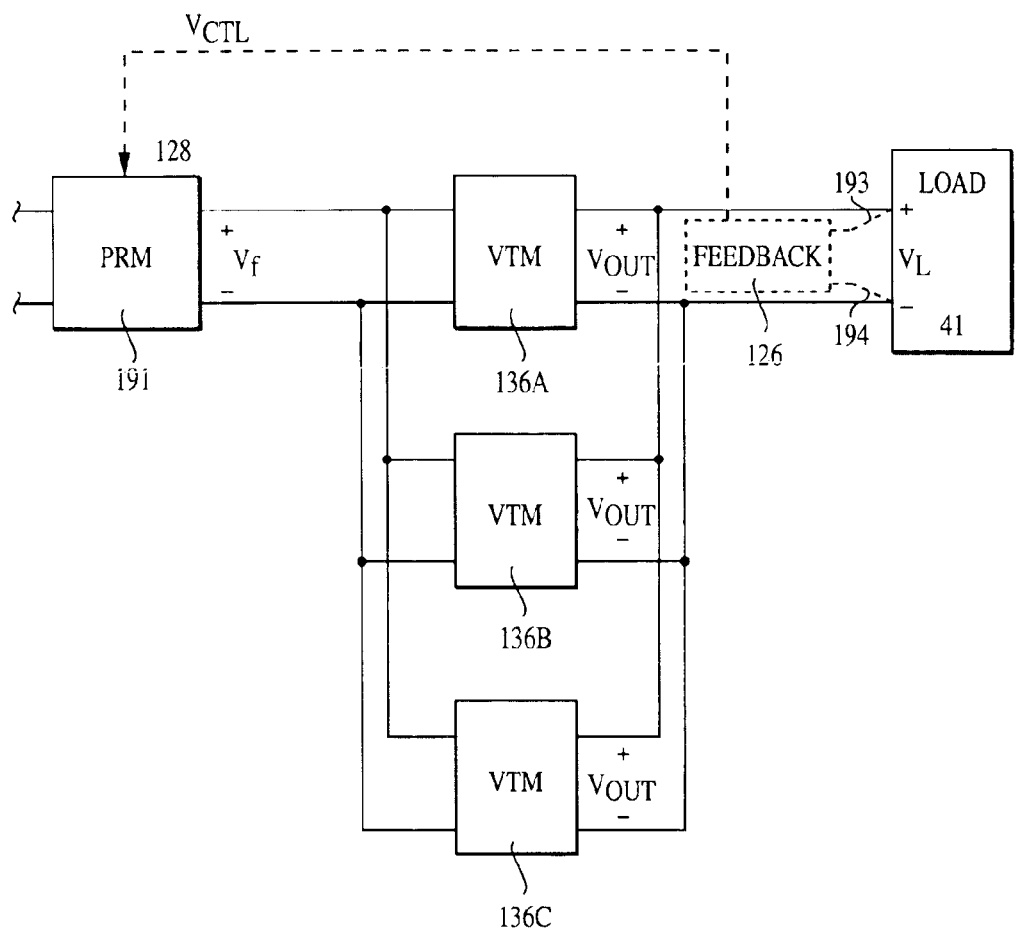
FIG. 31 is a block diagram of a power-sharing array of VTMs with optional remote feedback to a power regulator or PRM from a point-of-load feedback controller.

In certain applications, the power requirements of a load may exceed the power capability of a single VTM and an array of VTMs may need to be paralleled to support the load. Furthermore, in applications that call for fault tolerant back up of point-of-load converters, arrays of paralleled converters may be used to share the load among the converters. An example of a power sharing array of VTMs 136A, 136B, 136C having their inputs and outputs connected in parallel to feed a load 41 is shown in FIG. 31. As discussed above, current sharing among paralleled VTMs is a function of the relative output resistance, $R_{out}$, of each VTM. As also described above, current sharing accuracy may be greater with SACs than with non-resonant VTMs. Accuracy of point-of-load voltage may be increased using a feedback architecture. A PRM 191 is shown in FIG. 31 supplying a controlled voltage $V_f$ to the VTMs. The voltage at the point-of-load may be actively regulated using the architecture shown in FIGS. 18, 19, or 20. In FIG. 31, sensing leads 193, 194 deliver the voltage $V_L$ at the point-of-load to a feedback controller 126 (similar to FIG. 20). The feedback controller (which may be locally powered by the voltage $V_L$) monitors the value of $V_L$, compares it with an internal reference signal $V_{ref}$, and generates a control signal, $V_{ctl}$, delivered to the control input of the PRM 191 (or a remote power regulator, e.g. 38 in FIG. 3A, or a remote PRM, e.g. 43 in FIG. 3B). The presence of such a feedback loop complements the simple, scalable power-sharing attributes of an array of paralleled VTMs with high bandwidth, high DC gain point-of-load regulation and without the active circuitry and wiring complexities and attendant single point system failure mechanisms, stability issues, limited performance and high cost, or any of many other potential downfalls and limitations, of arrays of DC—DC converters.

Figure 55A:
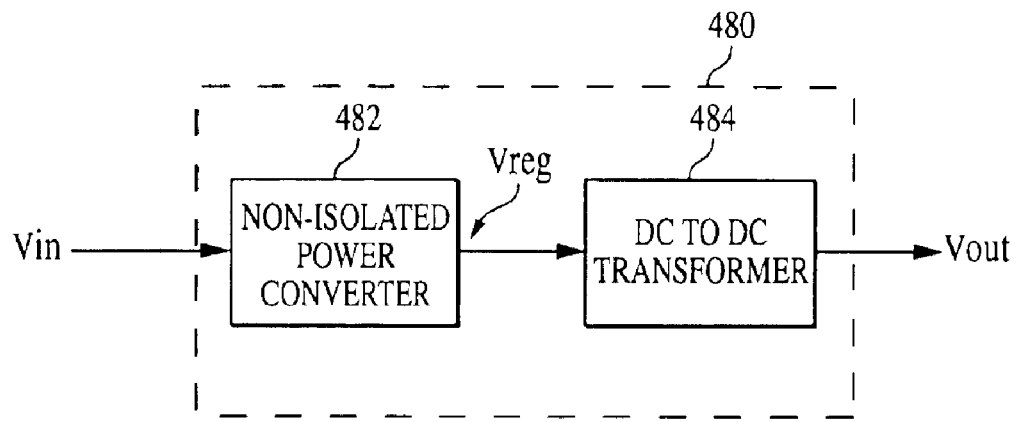
FIGS. 55A and 55B show a DC—DC converter.
Figure 55B:
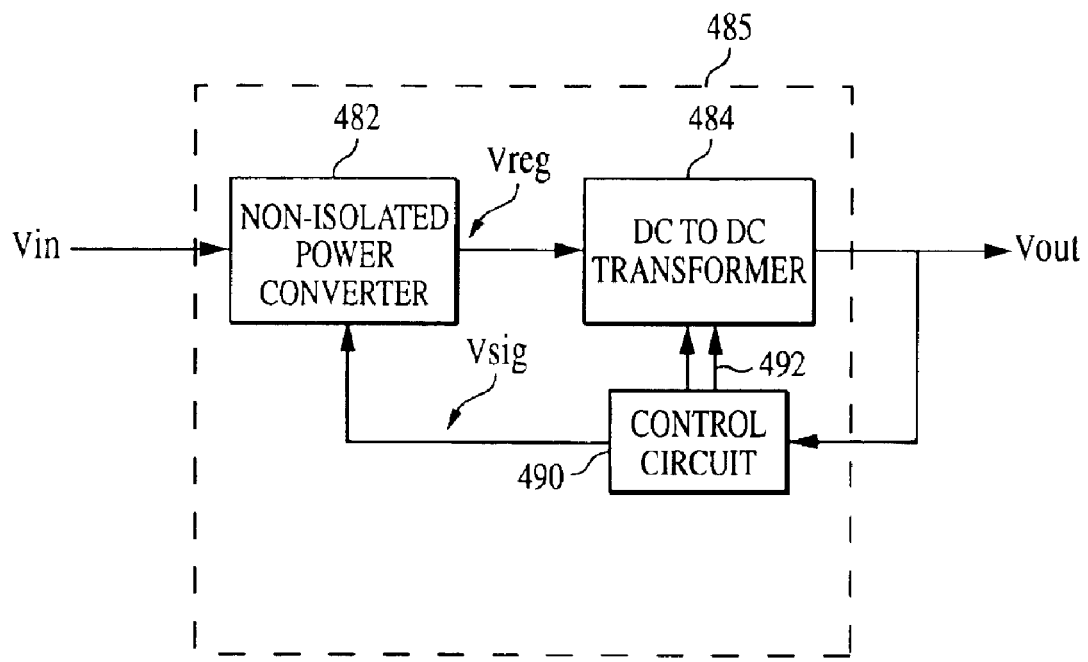

To enable point of load regulation, DC—DC converters, may be flexibly deployed to complement VTMs within the Factorized Power Architecture or conventionally within a Distributed Power Architecture. In FIG. 55A, a DC—DC converter 480 comprises a non-isolated power converter 482 which accepts a DC input voltage $V_{in}$ and delivers a regulated voltage, $V_{reg}$, to the input of a DC-to-DC transformer 484. The DC-to-DC transformer delivers an output voltage $V_{out}$ to a load (not shown). In FIG. 55B, the DC—DC converter 485 comprises the non-isolated power converter 482 and DC-to-DC transformer 484 arrangement of FIG. 55A along with a feedback control circuit 490 which controls the output voltage, $V_{out}$, by delivering a feedback signal, $V_{sig}$, to the non-isolated power converter. The control circuit may also deliver control signals 492 to the DC-to-DC transformer, as described below in connection with FIGS. 29A–29C.

The non-isolated power converter in FIGS. 55A and 55B may be a buck converter, a boost converter, or a buck-boost converter. A preferred buck-boost DC—DC conversion topology suitable for use as the non-isolated power converter 482, described in Vinciarelli, "Buck-Boost DC—DC Switching Power Conversion," U.S. patent application Ser. No. 10/214,859, filed Aug. 8, 2002, assigned to the same assignee as this application and incorporated here by reference, allows for heretofore unprecedented efficiency and power density levels.

Figure 29A:
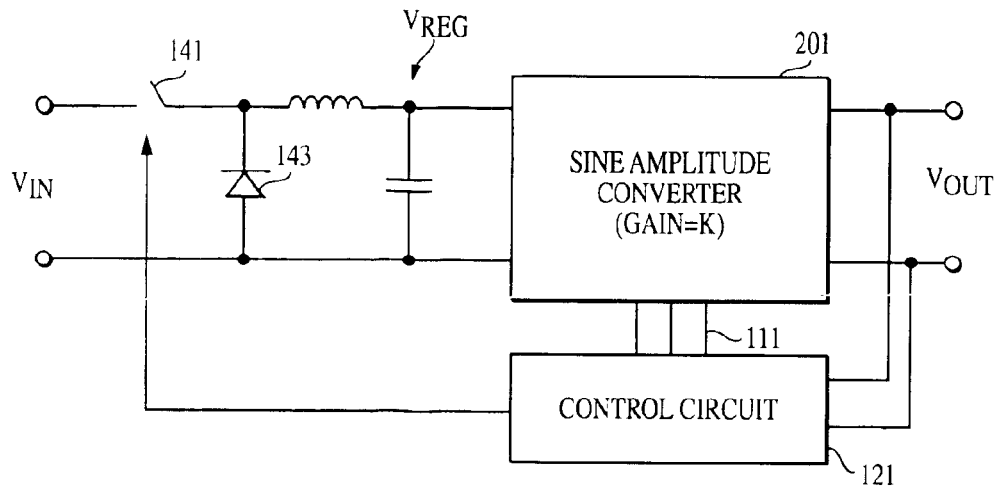
FIG. 29A shows a block diagram of a buck regulated sine amplitude DC—DC converter.
Figure 29B:
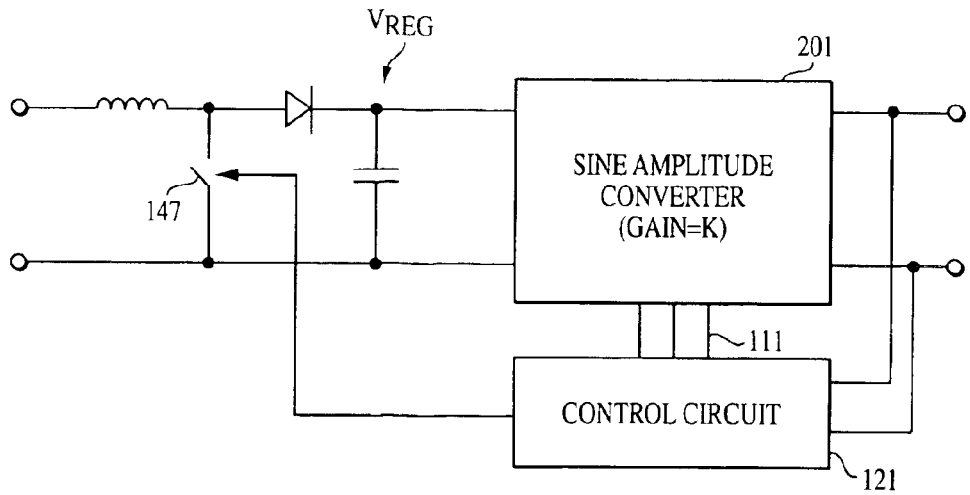
FIG. 29B shows a block diagram of a boost regulated sine amplitude DC—DC converter.
Figure 29C:
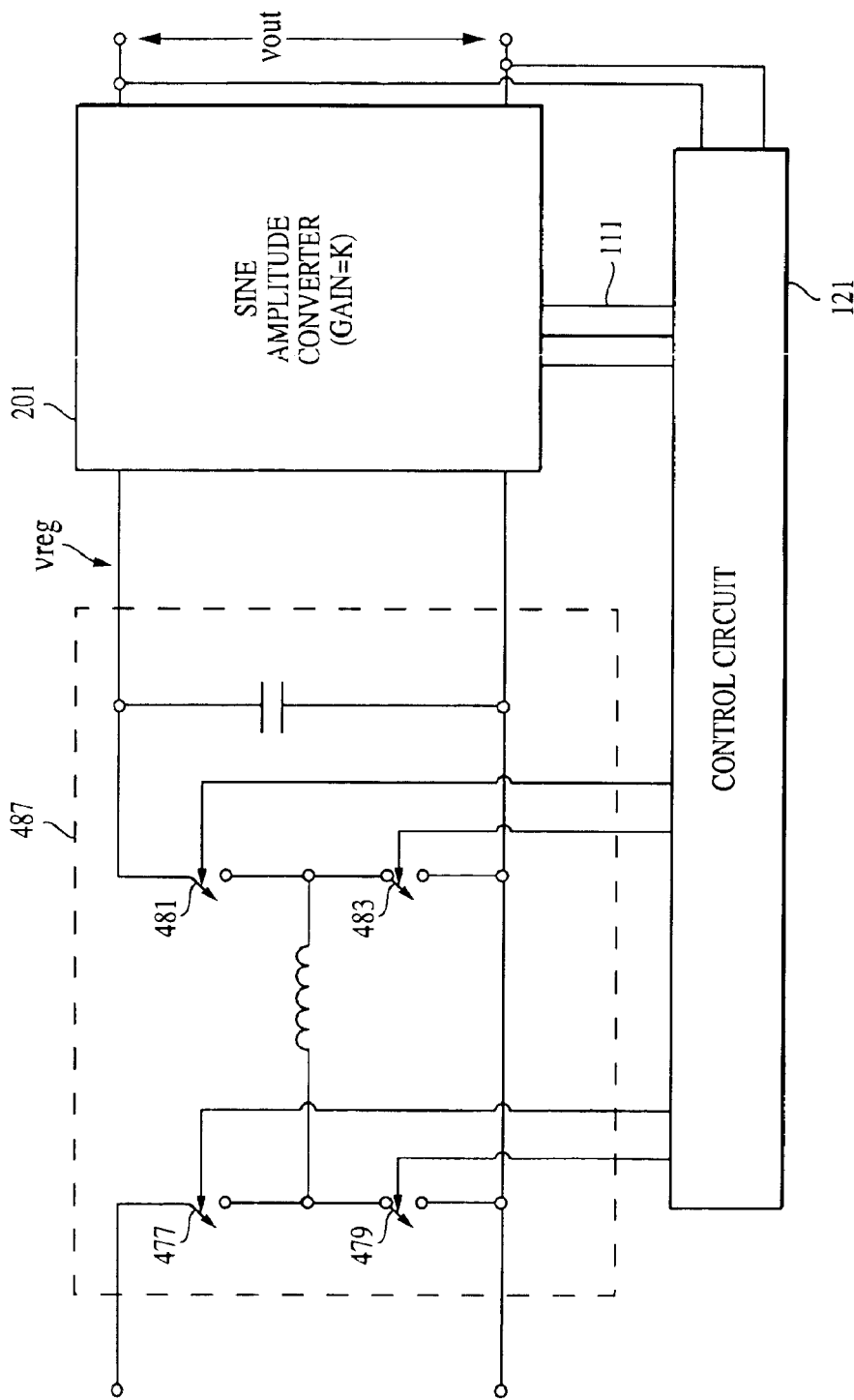
FIG. 29C shows a block diagram of a buck-boost regulated sine amplitude DC—DC converter.
Figure 30:
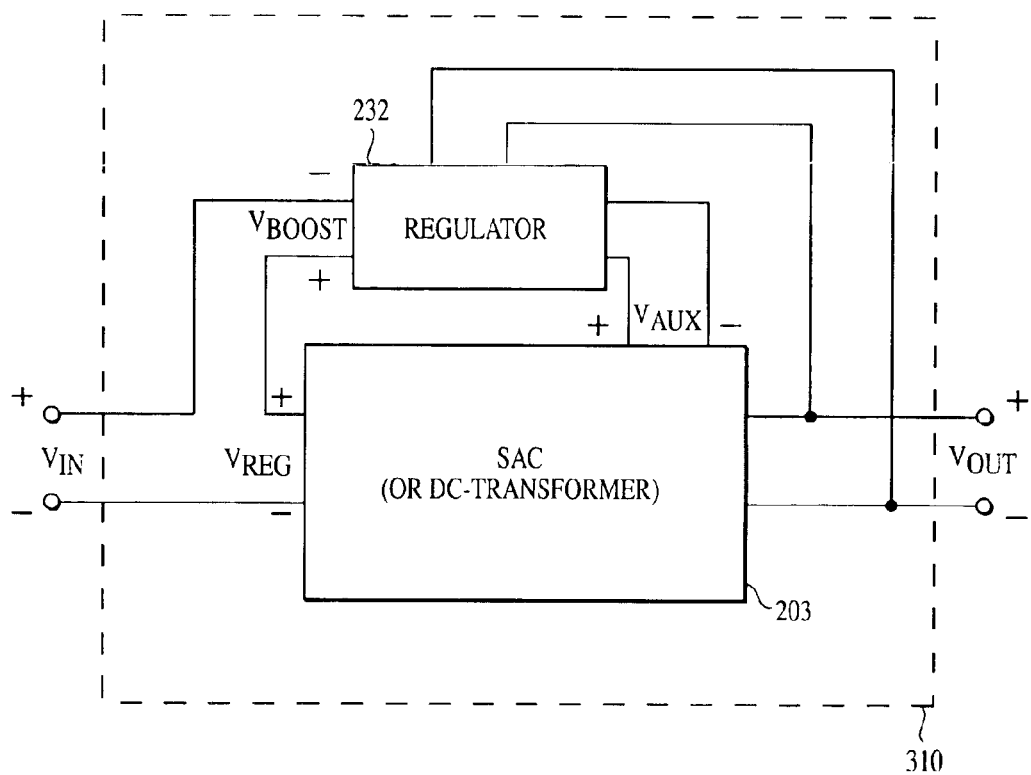
FIG. 30 shows a block diagram of a bootstrap regulated sine amplitude DC—DC converter.

A Sine Amplitude Converter may be used to provide the DC-to-DC Transformer function in the DC—DC converters of FIGS. 55A and 55B. As further illustrated in FIGS. 29A–29C, a SAC may be combined with a non-isolated power converter such as a buck pre-regulator, as shown in FIG. 29A, a boost pre-regulator, as shown in FIG. 29B, or a buck-boost pre-regulator, as shown in FIG. 29C. Alternatively, a bootstrap voltage regulator, as shown in FIG. 30, may be used to provide incremental power processing for conditioning the input voltage to the SAC in order to regulate the SAC output voltage.

Turning to FIG. 29A, a sine amplitude converter 201 incorporates an automatic switch controller (not shown). The voltage transformation ratio, or voltage gain, of the SAC, $V_{out}/V_{reg}$, is K. The output voltage of the SAC 201 is monitored by control circuit 121, which contains a voltage reference (not shown) and an error amplifier (not shown). The control circuit 121, which may be also interfaced to the SAC by one or more control lines 111, directs the opening and closing of the buck power switch 141. The switching frequency of switch 141 may, or may not, be locked to the resonant frequency of the SAC. The duty cycle of switch 141 (and rectifier 143) is varied to regulate the voltage, $V_{reg}$, fed to the input of the SAC and, indirectly, the voltage, $V_{out}$, delivered by the SAC to the external load. The example of buck topology shown is only indicative of this general class of switching regulators. The buck pre-regulator may, for example, incorporate circuitry (not shown) to achieve efficient, high frequency ZVS operation of the buck switch 141, such as the active clamp topology and timing architecture disclosed in U.S. patent application Ser. No. 09/834,750, entitled "Loss and Noise Reduction in Power Converters," filed Apr. 13, 2001, assigned to the same assignee as the present application, and incorporated herein by reference. Assuming that the input voltage, $V_{in}$, is greater than $V_{min}$, and that the buck pre-regulator is capable of duty cycles up to 100%, the DC—DC converter of FIG. 29a is able to regulate the output voltage, $V_{out}$, from zero up to a value approximately equal to $K*V_{min}$.

Turning to FIG. 29B, a sine amplitude converter 201 provides a voltage transformation ratio approximately equal to K. The output of the SAC is monitored by control circuit 121. The control circuit 121, which may be also interfaced to the SAC 201 by control lines 111, coordinates the opening and closing of the boost power switch 147. The switching frequency of switch 147 may, or may not, be locked to the resonant frequency of the SAC. The duty cycle of switch 147 is varied to regulate the voltage, $V_{reg}$, fed to the input of the SAC and, indirectly, the voltage, $V_{out}$, delivered by the SAC to the external load. The example of boost pre-regulator topology shown is only indicative of this general class of switching regulators. The pre-regulator may incorporate circuitry (not shown) to achieve efficient, high frequency ZVS operation of the boost switch, such as the active clamp topology and timing architecture disclosed in "Loss and Noise Reduction in Power Converters," ibid. Assuming that the input voltage, $V_{in}$, is less than $V_{max}$ and that the boost pre-regulator is capable of duty cycles down to 0%, the DC—DC converter of FIG. 29B is able to regulate the output voltage, $V_{out}$, down to a value approximately equal to $K*V_{max}$.

Turning to FIG. 29C, a sine amplitude converter 201 provides a voltage transformation ratio approximately equal to K. The output of the SAC is monitored by control circuit 121. The control circuit 121, which may be also interfaced to the SAC 201 by control lines 111, coordinates the opening and closing of one or more switches (e.g., switches 477, 479, 481, 483) in the buck-boost converter 487. The switching frequency of switches 477–483 may, or may not, be locked to the resonant frequency of the SAC. The duty cycle of switches 477–483 is varied to regulate the voltage, $V_{reg}$, fed to the input of the SAC and, indirectly, the voltage, $V_{out}$, delivered by the SAC to the external load. The example of the buck-boost pre-regulator topology shown is only indicative of this general class of switching regulators. The pre-regulator may incorporate circuitry (not shown) to achieve efficient, high frequency ZVS operation of the buck-boost switches, such as the topologies and timing architecture described in Vinciarelli, "Buck-Boost DC—DC Switching Power Conversion", ibid.

Cascading a SAC with buck or boost class pre-regulators, as in FIGS. 29A and 29B, limits the efficiency and power density of the DC—DC converter by the combination of heat and volume of its constituent power stages, each of which is sequentially engaged in processing all of the power converted from source to load. Serial power processing within a DC—DC converter incorporating a SAC, or other DC-to-DC transformer stages, can be avoided, as shown in FIG. 30, by a parallel, "bootstrap" power processing architecture. The bootstrap architecture is characterized by generating within the SAC (or DC-to-DC transformer stage) 203 a floating, auxiliary output, $V_{aux}$, which is converted by an auxiliary regulator 232 to a boost voltage source, $V_{boost}$, stacked in series between the input, $V_{in}$, to the DC—DC converter 310 and the input to the SAC. The boost voltage source is set to the level required to control the voltage, $V_{reg}$, fed to the input of the SAC and, indirectly, the voltage, $V_{out}$ delivered by the SAC to the external load at the output of the DC—DC converter 310. The voltage transformation ratio of the auxiliary output of the SAC, $K_{aux} = V_{aux}/V_{in}$, may be chosen in concert with the minimum gain, $K_{amin}$, and maximum gain, $K_{amax}$, of the auxiliary regulator 232 to minimize overall power processing and maximize overall DC—DC converter efficiency. Based on these respective gain values and an input voltage range, $V_{min}$ to $V_{max}$, the voltage, $V_{out}$, at the output of the DC—DC converter, may be regulated within the following range:

$$[K^* V_{max}/(1-K_{aux}*K_{amin})] < V_{out} < [K^*V_{min}/(1-K_{aux}*K_{amax})].$$

If the input voltage, $V_{in}$, is supplied by the controlled factorized bus of a Factorized Power Architecture, then $V_{max} = V_{min} = V_{in} = V_f$ and the extent of bootstrap power processing may be limited to the minimum necessary to effect a combination of DC—DC converter requirements, which may include closed-loop compensation of the output voltage and output voltage trimming. Assuming, for example, an output voltage trim range of 10% and a line/load compensation requirement of 3%, the incremental power processing to perform the required complement of DC—DC converter functions could be kept to 25% or less, depending on operating conditions. Assuming that this relatively small, incremental power processing is realized efficiently and with high density, the overall efficiency and density of a bootstrap regulated DC—DC converter for use in a FPA system could approach the figures of merit of VTMs.

Preferred embodiments of the bootstrap regulated DC—DC converter topology of FIG. 30 combine the SAC topology of FIG. 9 with an auxiliary synchronous buck switching regulator or with a synchronous boost switching regulator or with a synchronous buck-boost switching regulator. Another preferred embodiment provides the regulation function by means of a synchronous magnetic amplifier.

Figure 51:
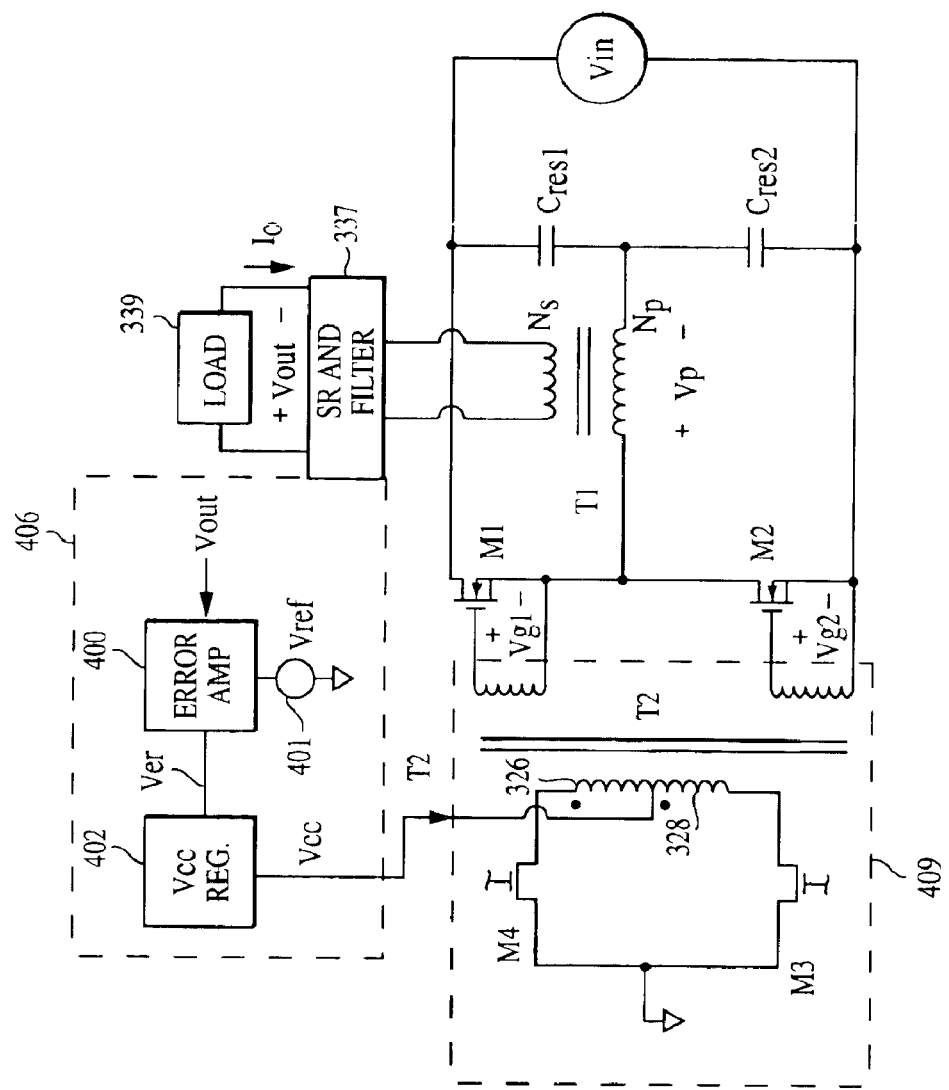
FIG. 51 shows a partial schematic of a SAC comprising output voltage regulation circuitry according to the invention.

FIG. 51 shows a simplified schematic of the SAC of FIG. 35 modified to comprise feedback regulation circuitry 406 which modulates the resistance of primary switch MOSFETs M1 and M2 as a means of compensating for typically small variations in $V_{out}$ that might otherwise be caused, e.g., by voltage drops due to load current flowing in the output impedance of the SAC or by variations resulting from small changes in $V_{in}$.

Without the feedback regulation circuitry 406, the DC output voltage of the SAC is approximately equal to: $V_{out} = (N_s/N_p)^*V_p - R_o^*I_o$, where, with reference to FIG. 51, $V_p$ is the absolute value of voltage across the primary winding of transformer T1 when switch M1 or M2 is ON; $N_s$ and $N_p$ are, respectively, the number of turns on the secondary and primary windings of transformer T1; $R_o$ is the equivalent output resistance of the SAC; and $I_o$ is the output current delivered by the SAC to the load 339. In the half-bridge topology of FIG. 51, $V_p$ is approximately equal to $V_{in}/2$.

In operation, an error amplifier 400 compares the SAC output voltage, $V_{out}$, to a reference voltage 401 having a value $V_{ref}$ indicative of the desired DC value of $V_{out}$. The output of the error amplifier, $V_{er}$, is delivered to a voltage regulator 402 as a means of varying the voltage, $V_{cc}$, delivered by the voltage regulator to gate driver circuitry 409 (which is of the kind shown in FIG. 35, comprising switches M3, M4 and transformer T2). The magnitude of the voltages $V_{g1}$ and $V_{g2}$, delivered to the gate control terminals of primary switches M1 and M2, vary in proportion to $V_{cc}$.

Varying $V_{g1}$ and $V_{g2}$ causes the ON resistance of the switches M1 and M2 to vary. For a given load current, $I_o$, this variation in ON resistance will result in a variation in the voltage drop across the MOSFET which will be reflected as a variation in both $V_p$ and $V_{out}$. Thus, if $V_{out}$ drops below its desired set point, the regulation circuitry 406 will act to increase $V_{g1}$ and $V_{g2}$, thereby causing the ON resistances of M1 and M2 to decrease. The decrease in ON resistance causes $V_p$ and $V_{out}$ to increase, thereby counteracting the change in $V_{out}$. Because this means of regulation is dissipative, it is primarily useful for controlling variations of output voltage over a relatively narrow band.

The technique described above, in which the equivalent output resistance of a power converter is varied by varying the ON resistance of primary switches in the power converter, can also be used to perform "soft-start" (in which the magnitudes of the converter input current and output voltage are controlled to rise smoothly when power is applied to the converter) and output current limiting. This is of particular importance in SACs because the currents which flow at startup (when the output filter capacitance is being charged from zero volts to the final value of the converter output voltage) or under short-circuit conditions, can be very large owing to the very low output impedance of the SAC.

Soft-start may be achieved by controlling the rate of rise of the peak voltage applied to the gate control inputs of the primary switches. For example, in the converter of FIG. 51, soft-start may be achieved by incorporating circuitry (not shown) in the $V_{cc}$ regulator 402 for controlling the rate at which $V_{cc}$ rises when input voltage, $V_{in}$, is applied to the converter. This will result in a controlled rise in the amplitudes of $V_{g1}$ and $V_{g1}$. As the peak values of $V_{g1}$ and $V_{g2}$ pass through a range near the threshold voltage of the primary switches M1 and M2, the ON resistance of the switches, and the equivalent output resistance of the converter, will vary smoothly from a relatively high value to a relatively low value. This will reduce the peak currents that flow as the converter output filter capacitors (part of filter in 339) charge to their final values.

Current limiting may be accomplished by measuring the output current of the converter and controlling the gate voltages of the main switches in order to keep the current at or below a predetermined level. One way to measure the output current is to place a resistive element in series with the load. This, however, adds additional loss. Alternatively, a current transformer may be placed in series with the secondary or primary winding of power transformer T1. Another way to measure the output current is to sense the leakage flux in the power converter transformer (e.g., transformer T1, FIG. 51) as described in Vinciarelli et al, U.S. Pat. No. 5,659,460, "Switch Control in Quantized Power Converters" (incorporated in its entirety by reference)(the "'460 patent"). As explained in the '460 patent, a sense loop may be placed adjacent to the core of a power converter transformer (e.g., a loop formed by a conductive trace on a printed circuit board adjacent the transformer may be used) so that the leakage flux emanating from the transformer core couples the sense loop. The sense voltage induced in the sense loop by the leakage flux will be proportional to the rate-of-change of current in the transformer. Since the rate-of-change of transformer current and the converter output current will vary in proportion to each other, the sense voltage in the sense loop may be used to indicate the magnitude of the output current. Current limiting may therefore be accomplished as shown in FIG. 52.

Figure 52:
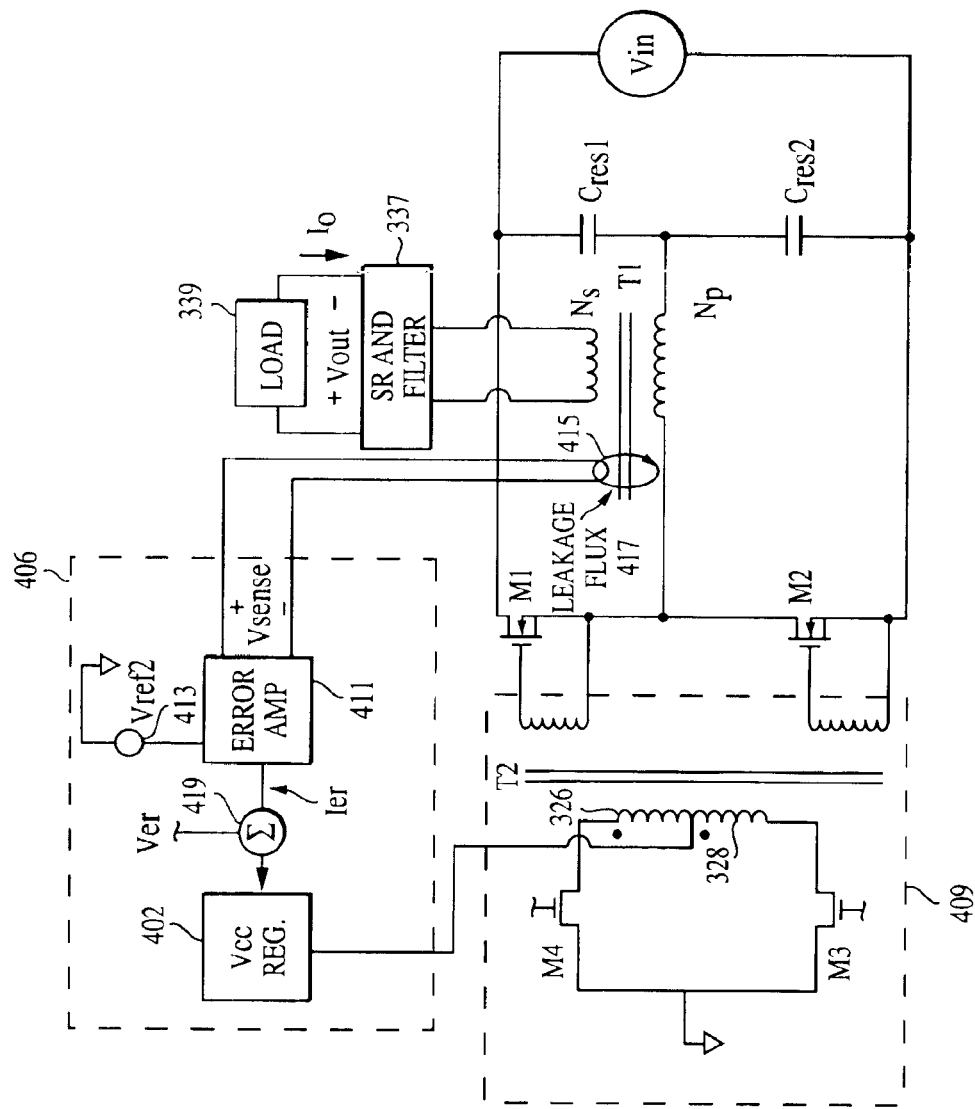
FIG. 52 shows a partial schematic of a SAC comprising current limit circuitry according to the invention.

In FIG. 52, leakage flux 417 from transformer T1 couples sense loop 415, generating a sense voltage, $V_{sense}$, as described above and in the '460 patent. Error amplifier 411 compares the magnitude of $V_{sense}$ to a reference 413, $V_{ref2}$, which is indicative of the value to which the output current is to be limited. The output of the error amplifier, $I_{er}$, is delivered to the $V_{cc}$ regulator 402 to control the value of $V_{cc}$ as a means of controlling the ON resistance of the primary switches M1, M2, and thus the output current, $I_{out}$, of the power converter, in a manner similar to that described for the voltage controller of FIG. 51.

The technique of controlling $V_{cc}$, as a means of controlling ON resistance may be used for both output voltage control and current limiting, as indicated in FIG. 52 by the use of a summing junction 419 for combining the voltage error signal, $V_{er}$, and the current error signal, $I_{er}$. To avoid excessive power dissipation due to continuous operation of M1 and M2 in a linear mode, a time out function may be used to latch down the converter in response to a persistent abnormal condition.

A number of embodiments of the invention have been described. Nevertheless, it will be understood that various modifications may be made without departing from the spirit and scope of the invention. Accordingly, other embodiments are within the scope of the following claims.

What is claimed is:

1. A method of converting power from an input source for delivery to a load, where the load may vary over a normal operating range, comprising:
   providing a transformer;
   forming a resonant circuit including the transformer having a Q less than 13 and having a characteristic resonant frequency and period;
   providing output circuitry connected to the transformer for delivering a rectified output voltage to the load;
   providing two or more primary switches to drive the resonant circuit;
   providing a switch controller to operate the primary switches in a series of converter operating cycles, each converter operating cycle characterized by two power transfer intervals of essentially equal duration each interval having a duration less than the characteristic resonant period, during which one or more of the primary switches are ON and power is transferred from the input to the output via the transformer; and
   providing a conversion efficiency from the source to the load having a peak greater than 90% within the normal operating range.

2. The method of claim 1 wherein the Q is less than or equal to 3.

3. The method of claim 1 further comprising:
   canceling reactive impedances in the resonant circuit; and
   providing an essentially resistive output impedance over a bandwidth approaching the resonant frequency.

4. The method of claim 1 wherein the power transfer intervals are further characterized by a resonant current at the characteristic resonant frequency and a magnetizing current flowing through a winding of the transformer and a duration that results in cancellation of reactive impedances in the resonant circuit.

5. The method of claim 1 wherein a resonant portion of current through the primary switches at the beginning and end of the power transfer intervals is essentially zero.

6. The method of claim 1 further comprising sensing current in the transformer and controlling the primary switches as a function of the sensing.

7. The method of claim 1 wherein
   the power transfer intervals are separated in time by energy-recycling intervals during which the primary switches are OFF; and
   currents in the converter are used to charge and discharge capacitances in the converter during the energy-recycling intervals.

8. The method of claim 1 wherein the Q is less than 8 and the characteristic resonant frequency is greater than 500 KHz.

9. Apparatus for converting power from an input source for delivery to a load, where the load may vary over a normal operating range, comprising:
   a transformer;
   a resonant circuit including the transformer having a Q less than 13 and having a characteristic resonant frequency and period;
   output circuitry connected to the transformer for delivering a rectified output voltage to the load;
   two or more primary switches connected to drive the resonant circuit;
   a switch controller adapted to operate the primary switches in a series of converter operating cycles, each converter operating cycle characterized by two power transfer intervals of essentially equal duration each interval having a duration less than the characteristics resonant period, during which one or more of the primary switches are ON and power is transferred from the input to the output via the transformer; and
   a conventional efficiency from the source to the load having a peak greater than 90% within the normal operating range.

10. The apparatus of claim 9 wherein the switch controller is adapted to turn the primary switches ON and OFF essentially at times when a resonant portion of current is zero.

11. The apparatus of claim 9 wherein each power transfer interval is essentially equal to one half of the charatiestic resonant period and the controller turns the switches ON and OFF at times essentially when a resonant portion of current in the switches is zero.

12. Apparatus for converting power comprising a plurality of apparatus as defined in claimed 11 connected in parallel in a power sharing array, wherein an open-loop output resistance of each apparatus determines its respective share of the power delivered to the load.

13. The apparatus of claim 11 wherein the output voltage is regulated by feedback to the input source.

14. The apparatus of claim 9 wherein the switch controller is further adapted to sense current in the transformer and control the primary switches as a function of the sensing.

15. The apparatus of claim 9 wherein the power transfer intervals are further characterized by a resonant current at the charateristic resonant frequency and a magnetizing current flowing through a winding of the transformer and a duration that results in cancellation of impedances in the resonant circuit.

16. The apparatus of claim 9 wherein:
reactive impedances in the resonant circuit are essentially cancelled; and
the apparatus comprises an essentially resistive output impedance over a bandwidth approaching the resonant frequency.

17. The apparatus of claim 9 wherein the Q is less than or equal to 3.

18. A method of converting power from an input source for delivery to a load, where the load may vary over a normal operating range, comprising:
providing a transformer;
forming a resonant circuit including the transformer and having a characteristic resonant frequency and period;
providing output circuitry connected to the transformer for delivering a rectified output voltage to the load;
providing two or more primary switches to drive the resonant circuit; and
providing a switch controller to sense current in the transformer and to operate the primary switches in a series of converter operating cycles, each converter operating cycle characterized by
(a) two power transfer intervals of essentially equal duration, during which one or more of the primary switches are ON, a resonant current at the charateristic resonant frequency and a magnetizing current flow through a winding of the transformer, and power is transferred between the input and the output via the transformer, each power transfer interval having a duration that results in essentially canceling reactive impedances in the resonant circuit; and
(b) two energy-recycling intervals each having an essentially constant duration over the normal operating range during which the primary switches are OFF; and
using the switch controller to turn the primary switches OFF essentially a times when the resonant current returns to zero;
using the magnetizing current to charge and discharge capacitances during the energy-recycling intervals; and
providing an essentially resistive output impedance over a bandwidth approaching the resonant frequency.

19. The method of claim 18 wherein the duration of the energy-recycling interval varies when the normal operating range is exceeded.

20. A method of converting power from an input source for delivery to a load, where the load may vary over a normal operating range, in a converter having two or more primary switches connected to drive a resonant circuit including a transformer and having a charateristic resonant frequency and period, output circuitry connected to the transformer for delivering a rectified output voltage to the load, and a switch controller to operate the switches, the method comprising:
sensing current in the transformer;
operating the switches in a series of converter operating cycles, each converter operating cycle charaterized by:
(a) first and second power transfer intervals during which one or more of the primary switches are ON, a resonant current at the characteristic resonant frequency flows a through a winding of the transformer, and power is transferred between the input source and the load via the transformer; the first and second power transfer intervals having a duration that results in essentially canceling reactive impedances in the resonant circuit; and
(b) two energy-recycling intervals during which the primary switches are OFF;
wherein the switch controller turns the primary switches OFF at times essentially when the resonant current returns to zero; and
wherein currents in the converter are used to charge and discharge capacitances in the converter during the energy-recycling intervals;
providing an essentially constant voltage gain $K=V_{out}/V_{in}$ at a load current for the power conversion, where $V_{in}$ is the input source voltage and $V_{out}$ is the rectified output voltage accross the load; and
providing an essentially resistive output impedance over a bandwidth approaching the resonant frequency.

21. A method of converting power from an input source for delivery to a load, where the load may vary over a normal operating range, in a converter having two or more primary switches connected to drive a resonant circuit including a transformer and having a characteristic resonant frequency and period, output circuitry connected to the transformer for delivering a rectified output voltage, and a switch controller to operate the switches the method comprising:
operating the primary switches in a series of converter operating cycles, each converter operating cycle being characterized by:
(a) first and second power transfer intervals during which one or more of the primary switches are ON, a resonant current at the characteristic resonant frequency and a magnetizing current flow through a winding of the transformer, and power is transferred between the source and the load via the transformer; the first and second power transfer intervals having a duration that results in essentially canceling reactiveimpedances in the resonant circuit over the normal operating range; and
(b) two energy-recycling intervals during which the primary switches are OFF; and
(c) a period having an essentially constant duration over the normal operating range;
sensing current in the transformer;
controlling the primary switches as a function of the sensing;
using the magnetizing current to charge and discharge capacitances during the energy recycling intervals; and
providing an essentially resistive output impedance over a bandwidth approaching the resonant frequency.

22. Apparatus for converting power from an input source for delivery to a load, where the load may vary over a normal operating range, comprising:
a transformer;
a resonant circuit including the transformer and having a characteristic resonant frequency and period;
output circuitry connected to the transformer for delivering a rectified output voltage to the load;
two or more primary switches connected to drive the resonant circuit; and a switch controller adapted to sense current in the transformer and operate the primary switches in a series of converter operating cycles, each converter operating cycle characterized by
(a) two power transfer intervals of essentially equal duration, during which one or more of the switches are ON, a resonant current at the characteristic resonant frequency and a magnetizing current flow through a winding of the transformer, and power is transferred between the input and the output via the transformer, the power transfer intervals having a duration that results in essentially canceling reactive impedances in the resonant circuit; and (b) two energy-recycling intervals each having an essentially constant duration over the normal operating range during which the primary switches are OFF;

wherein the switch controller is adapted to turn the primary switches OFF essentially at times when the resonant current returns to zero;

wherein the magnetizing current is used to charge and discharge capacitances during the energy-recycling intervals; and wherein the apparatus comprises an essentially resistive output impedance over a bandwidth approaching the resonant frequency.

23. The apparatus fo claim 22 wherein the duration of the energy-recycling interval varies when the normal operating range is exceeded.

24. Apparatus for converting power from an input source for delivery to a load, where the load may vary over a normal operating range, comprising;

a transfomer;

a resonant circuit including the transfermor and having a characteristic resonant frequency and period;

output circuitry connected to the transformer for delivering a rectified output voltage to the load;

two or more primary switches connected to drive a resonant circuit; and a switch controller adapted to sense current in the transformer and operate the primary switches in a series of converter operating cycles as a function of the sensing, each converter operating cycle characterized by (a) first and second power transfer intervals during which one or more of the primary switches are ON, a resonant current at the characteristic resonant frequency and a magnetizing current flow through a winding of the transformer, and power is transferred between the source and the load via the transformer, the first and second power transfer intervals having a duration that results in essentially canceling reactive impedances in the resonant circuit over the normal operating range; and (b) two energy-recycling intervals during which the primary switches are OFF; and (c) a period having an essentially constant duration over the normal operating range; and an essentially constant voltage gain $K=V_{out}/V_{in}$ at a load current for the power conversion, where $V_{in}$ is the input source voltage and $V_{out}$ is the rectified output voltage;

wherein the magnetizing current is used to charge and discharge capacitance during the energy-recycling intervals; and wherein the apparatus comprises an essentially resistive output impedance over a bandwidth approaching the resonant frequency.

25. The method of claim 1, 18, or 20 wherein the converter operating cycles further comprise a period which has an essentially constant duration over the normal operating range.

26. The method of claim 1, 18, 20, or 21 wherein the converter operating cycles comprise a power conversion duty cycle greater than 80% over the normal operating range and the characteristic resonant frequency is greater than 1.5 MHz.

27. The method of claim 1, 18, 20, or 21 wherein the converter operating cycles comprise a power conversion duty cycle greater than 90% over the normal operating range and the characteristic resonant frequency is greater than 1.0 MHz.

28. The method of claim 1, 18, 20, or 21 wherein the converter operating cycles comprise a power conversion duty cycle greater than 94% over the normal operating range and the characteristic resonant frequency is greater than 500 MHz.

29. The method of claim 1, 18, 20, or 21 further comprising providing two or more secondary switches in the output circuitry for rectifying power from the transformer; and providing a switch controller to turn the secondary switches ON and OFF at times of essentially zero current.

30. The method of claim 29 wherein the controller is further adapted to turn the secondary switches ON and OFF at times of essentially zero voltage across the secondary switches.

31. The method of claim 1, 18, 20, or 21 wherein the transformer comprises a number of primary turns $N_p$, a number of secondary turns $N_s$, and a ratio of $N_s/N_p$ which determines teh voltage gain $K=V_{out}/V_{in}$ of the conversion, where $V_{in}$ is the input source voltage to the apparatus and $V_{out}$ is the rectified output voltage.

32. The method of claim 1, 18, 20, or 21 wherein the resonant circuit comprises a series resonant circuit.

33. The method of claim 1, 18, 20, or 21 wherein the resonant circuit comprises a series-resonant circuit having a Q less than 10.

34. The method of claim 1, 18, 20, or 21 wherein the duration of the energy-recycling intervals are essentially equal to a time interval sufficient to minimize losses due to charging and discharging of parasitic circuit capacitances when the primary switches are turned ON.

35. The method of claim 1, 18, 20, or 21 wherein the period of the converter operating cycles is greater than the characteristic resonant period by a time interval sufficient to minimize losses due to charging and discharging of parasitic circuit capacitances when the primary switches are turned ON.

36. The method of claim 1, 18, 20, or 21 further comprising:

providing a magnetizing inductance for the transformer using a transformer core having an effective permeability less than 100 and wherein the charateristic resonant frequency is greater than 500 kHz.

37. The method of claim 36 wherein the effective permeability of the transformer core is less than 25 and the characteristic resonant frequency is greater than 1 MHz.

38. The method of claim 1, 18, 20, or 21 further comprising clamping voltage excursions across a capacitive element in the resonant circuit to limit output current.

39. The method of claim 1, 18, 20, or 21 further comprising providing a main output for supplying power at an output voltage $V_{out}$ to the load, and a regulated auxiliary output for supplying power at an auxiliary voltage $V_{aux}$;

connecting the regulated auxiliary output in series with the input source; adjusting the auxiliary output voltage, $V_{aux}$, to maintain a desired input voltage $V_{in}$ to the converter.

40. The method of claim 39 further comprising: sensing the output voltage $V_{out}$, adjusting the auxiliary voltage to regulate the output voltage $V_{out}$ of the converter.

41. A method of converting power comprising:
providing a first power conversion stage comprising a buck regulator having an input connected to receive power from the input source and an output for delivering a regulated voltage to a second power conversion stage;
wherein the second power conversion stage comprises the method of claim 1, 18, 20, or 21.

42. A method of converting power comprising:
providing a first power conversion stage comprising a boost regulator having an input connected to receive power from the input source and an output for delivering a regulated voltage to a second power conversion stage;
wherein the second power conversion stage comprises the method claim 1, 18, 20, or 21.

43. The method of claim 1, 18, 20, or 21 further comprising using a symmetrical power train to reduce common-mode noise.

44. The method of claim 1, 18, 20, or 21 further comprising a power conversion duty cycle that is essentially constant and greater than 80 percent over the normal operating range and decreases when the range is exceeded.

45. The method of claim 1, 18, or 20 further comprising a converter operating period that is essentially constant over the normal operating range and increases when the range is exceeded.

46. The method of claim 1, 18, 20, or 21 wherein the load comprises a microprocessor.

47. The method of claim 1, 18, or 21 wherein:
the resonant circuit has a Q of less than 10;
the characteristic resonant frequency is greater than 1 MHz; and the load comprises a microprocessor.

48. The method of claim 47 further comprising a transient response time shorter than 4 converter operating cycles for a step change in load.

49. The method of claim 1, 18, 20, or 21 further comprising:
using a secondary winding of a drive transformer to drive control inputs of the two or more primary switches;
using a plurality of switches to drive the drive transformer;
connecting a control terminal of each switch to reference a common signal reference for turning the switch ON and OFF,
using a first switch and a second switch in the plurality of switches to respectively induce a magnetic flux in the drive transformer in a first and in a second direction when ON;
operating the first and second switches in a series of control cycles each characterized by:
(a) two ON intervals during which one of the first and second switches is ON;
(b) two OFF intervals during which both of the first and second switches is OFF and energy stored in the drive transformer is used to charge and discharge parasitic output capacitances of the plurality of switches and a parasitic input capacitance of the two or more primary switches.

50. A method of converting power comprising:
providing a first power conversion stage comprising a pre-regulator having an input connected to receive power from the input source and an output for delivering a regulated voltage to a second power conversion stage;
wherein the second power conversion stage comprises the method of claim 1, 18, 20, or 21.

51. The method of claim 50 wherein the pre-regulator comprises a buck-boost switching regulator.

52. The method of claim 50 wherein the pre-regulator comprises a ZVS buck-boost regulator.

53. The apparatus of claim 9, 22, or 24 wherein
the output circuitry further comprises two or more secondary switches for rectifying power from the transformer; and
the switch controller is adapted to turn the secondary switches ON and OFF essentially at times of zero current.

54. The apparatus of claim 9, 22, or 24 wherein the output circuitry further comprises two or more secondary switches for rectifying power from the transformer and the switch controller is adapted to turn the secondary switches ON and OFF essentially at times of zero voltage across the secondary switches.

55. The apparatus of claim 9, 22, or 24 wherein the transformer further comprises a number of primary turns $N_p$, a number of secondary turns $N_s$, and a ratio of $N_s/N_p$ which determines the voltage gain $K=V_{out}/V_{in}$ of the apparatus, where $V_{in}$ is the input source voltage to the apparatus and $V_{out}$ is the rectified output voltage of the apparatus.

56. The apparatus of claim 9, 22, or 24 wherein the resonant circuit has a Q less than 8.

57. The apparatus of claim 9, 22, or 24 wherein the resonant circuit has a characteristic resonant frequency greater than 500 kHz and a Q less than 10.

58. The apparatus of claim 9, 22, or 24 wherein the resonant circuit comprises a series-resonant circuit.

59. The apparatus claim 58 wherein the resonant circuit comprises a resonant inductance and a resonant capacitance connected in series with a primary winding of the transformer forming a primary circuit, and wherein the resonant inductance comprises a leakage inductance of the transformer.

60. The apparatus of claim 59 wherein
exactly two primary switches drive the transformer; a first end of the primary circuit is connected to a positive input terminal via a first primary switch and connected to a negative input terminal via a second primary switch; and
the resonant capacitance comprises a first capacitor having one end connected to the positive input terminal and a second capacitor having one end connected to the negative input terminal.

61. The apparatus of claim 59 wherein a first end of the primary circuit is connected to a positive input terminal via a first primary switch and connected to a negative input terminal via a second primary switch; and
a second end of the primary circuit is connected to the positive input terminal via a third primary switch and connected to the negative input terminal via a fourth primary switch.

62. The apparatus of claim 59 wherein
a first end of the primary circuit is connected to a first primary switch; and a second end of the primary circuit is connected to a second primary switch; and
a second primary switch is connected to the first primary switch.

63. The apparatus of claim 9 or 22 wherein the converter operating cycles further comprise a period having an essentially constant duration over the normal operating range.

64. The apparatus of claim 63 wherein the period of the converter operating cycles is greater than the characteristic resonant period by a time interval sufficient to minimize losses due to charging and discharging of parasitic circuit capacitances when the primary switches are turned ON.

65. The apparatus of claim 9, 22, or 24 further comprising a power conversion duty cycle greater than 80% over the normal operating range and the characeristic resonant frequency is greater than 1.5 MHz.

66. The apparatus of claim 9, 22, or 24 further comprising a power conversion duty cycle greater than 90% over the normal operating range and the characeristic resonant frequency is greater than 1.0 MHz.

67. The apparatus of claim 9, 22, or 24 further comprising a power conversion duty cycle greater than 94% over the normal operating range and the characeristic resonant frequency is greater than 0.5 MHz.

68. The apparatus of claim 9, 22, or 24 wherein the transformer comprises a magnetic core having an effective permeability less than 100 and the characteristic resonant frequency is greater than 500 kHz.

69. The apparatus of claim 68 wherein the effective permeability is less than 25 and the characteristic resonant frequency is greater than 1 MHz.

70. The apparatus of claim 9, 22, or 24 further comprising one or more clamp diodes connected across aa capacitive element in the resonant circuit to limit output current.

71. The apparatus of claim 9, 22, or 24 further comprising control circuitry for sensing a rate of change of voltage across a capacitive element in the resonant circuit to control output current or voltage.

72. The apparatus of claim 9, 22, or 24 wherein the output circuitry comprises two separate output circuits for delivering two rectified output voltages.

73. The apparatus of claim 9, 22, or 24 wherein the output circuitry comprises synchronous-rectifier devices each controlled by a synchronous rectifier controller.

74. The apparatus of claim 9, 22, or 24 wherein the output circuitry further comprises:
2 or more synchronous rectifier devices;
a snubber circuit connected to the synchronous rectifiers; and
a control circuit connected to the synchronous rectifiers for turning the synchronous rectifiers OFF;
wherein the snubber circuit is adapted to dampen ringing in the output circuit as a first one of the synchronous rectifiers is turned OFF and use energy recovered from dampening to charge a control terminal of a second one of the synchronous rectifiers biasing the second synchronous rectifier toward ON.

75. The apparatus fo claim 9, 22, or 24 further comprising a filter capacitor and a damping circuit connected across the filter capacitor.

76. The apparatus of claim 9 or 24 wherein the switch controller is adapted to sense completion of a power transfer interval and to turn the primary switches OFF at the completion of the power transfer interval.

77. The apparatus of claim 76 wherein the power transfer interval is equal to one half of the charateristic period of the resonant circuit.

78. The apparatus of claim 9, 22, or 24 wherein the apparatus comprises a switching frequency greater than 500 kHz and provides a power density greater than 200 Watts/cubic-inch.

79. The apparatus of claim 9, 22, or 24 wherein the apparatus comprises a switching frequency greater than 1 kHz and provides a power density greater than 300 Watts/cubic-inch.

80. The apparatus of claim 9, 22, or 24 further comprising: a main output for supplying power at an output voltage $V_{out}$ to the load, and a regulated auxiliary output for supplying power at an auxiliary voltage $V_{aux}$;
the regulated auxiliary output connected in series with the input source; a control circuit adapted to adjust the auxiliary voltage $V_{aux}$ to maintain a desired input voltage $V_{in}$ to the converter.

81. The apparatus of claim 80 wherein:
the control circuit further comprises an input for sensing the output voltage, $V_{out}$, and is adapted to adjust the auxiliary voltage $V_{aux}$ to regulate the output voltage $V_{out}$ of the converter.

82. Apparatus for converting power comprising:
a first power conversion stage including a buck converter having an input connected to receive power from the input source and an output for delivering a regulated voltage to a second power conversion stage; and
wherein the second power conversion stage comprises the apparatus of claim 9, 22, or 24.

83. Apparatus for converting power comprising:
a first power conversion stage including a boost converter having an input connected to receive power from the input source and an output for delivering a regulated voltage to; and
wherein the second power conversion stage comprises the apparatus of claim 9, 22, or 24.

84. The apparatus of claim 9, 22, or 24 wherein the transformer and resonant circuit are configured with symmetry to reduce common-mode noise coupled by parasitic capacitances into the output circuitry.

85. The apparatus of claim 84 wherein
the transformer comprises first and second primary windings; and
the two or more primary switches drive the first and second primary windings out of phase.

86. The apparatus of claim 84 wherein
the primary switches form a full-bridge circuit to drive the transformer; the transformer comprises two primary windings; and
the resonant circuit comprises a resonant capacitor connected in series with and between the two primary windings.

87. The apparatus of claim 84 wherein
the primary switches form a full-bridge circuit to drive the transformer; the transformer comprises a primary windings; and
the resonant circuit comprises first and second resonant capacitors connected at a respective end of the primary winding.

88. The apparatus of claim 84 wherein
the transformer comprises a center-tapped primary winding; and
the primary switches form a push-pull driver to drive the primary winding.

89. The apparatus of claim 84 further comprising two half-bridges driven out of phase.

90. The apparatus of claim 9, 22, or 24 wherein the two or more primary switches have control inputs; and
the apparatus further comprises;
a drive transformer having a secondary winding;
a plurality of switches each having a control terminal referenced to a common signal reference for turning the switch ON and OFF and an output connected to drive the transformer;

the plurality of switches including a first switch and a second switch being respectively poled to induce a magnetic flux in the drive transformer in a first and in a second direction when ON;

the secondary winding being connected to drive the control inputs of the two or more primary switches;

a control circuit connected to the control terminals and configured to operate the first and second switches in a series of control cycles each characterized by:

(a) two ON intervals during which one of the first and second switches is ON;

(b) two OFF intervals during which both of the first and second switches is OFF and energy stored in the drive transformer is used to charge and discharge parasitic output capacitances of the plurality of switches and a parasitic input capacitance of the two or more primary switches.

91. Apparatus for converting power comprising:

a first power conversion stage including a pre-regulator having an input connected to receive power from the input source and an output for delivering a regulated voltage to a second power conversion stage; and wherein the second power conversion stage comprises the apparatus of claim 9, 22, or 24.

92. The apparatus of claim 91 wherein the pre-regulator comprises a buck-boost switching regulator.

93. The apparatus of claim 91 wherein the pre-regulator comprises a ZVS buck-boost switching regulator.

94. Teh apparatus of claim 9, 22, or 24 further comprising a power conversion duty cycle that is essentially constant and greater than 80 percent over the normal operating range and decreases when the range is exceeded.

95. The apparatus of claim 9 or 22 further comprising a converter operating period that is essentially constant over the normal operating range and increases when the range is exceeded.

96. The apparatus of claim 9, 22, or 24 wherein the load comprises a microprocessor.

97. The apparatus of claim 9, 22, or 24 wherein:

the resonant circuit has a Q of less than 10;

the characteristic resonant frequency is greater than 1 MHz; and the load comprises a microprocessor.

98. The apparatus of claim 97 further comprising a transient response time shorter than 4 converter operating cycles for a step change in load.

99. The method of claim 1, 18, 20, or 21 wherein the resonant circuit comprises a series-resonant circuit having a Q less than 10.

100. The method of claim 18, 20, 21, or 6 wherein the sensing current in the transformer comprises sensing leakage flux of the transformer.

101. The method of claim 18, 20, 21, or 6 further comprising providing two or more secondary switches in the output circuitry; and wherein the sensing current in the transformer comprises sensing a voltage drop across at least one of the two or more secondary switches.

102. The method of claim 101 further comprising turning the primary switches OFF essentially at times when the voltage drop returns below a predetermined value.

103. The method of claim 18, 20, 21, or 6 wherein the sensing current in the transformer comprises sensing current in a secondary winding of the transformer.

104. The method of claim 103 further comprising turning the primary switches OFF essentially at times when the current in the secondary winding returns to zero.

105. The method of claim 18, 20, 21, or 6 wherein the sensing current in the transformer comprises sensing current in a primary winding of the transformer.

106. The method of claim 105, wherein the resonant circuit further comprises a resonant capacitor and the sensing current in the transformer comprises sensing current in the resonant capacitor.

107. The method of claim 18, 20, or 21 wherein the resonant portion of current through the primary switches at the beginning and end of the power transfer intervals is essentially zero.

108. The method of claim 18, 20, or 21 wherein the resonant circuit comprises a Q less than or equal to 3.

109. The apparatus fo claim 22 or 24 wherein the duration of the energy-recycling intervals are essentially equal to a time interval sufficient to minimize losses due to charging and discharging of parasitic circuit capacitances when the primary switches are turned ON.

110. The apparatus of claim 22 or 24 wherein the resonant circuit has a Q less than 13.

111. The apparatus of claim 22, 24, or 14 wherein the current in the transformer is sensed by sensing leakage flux of the transformer.

112. The apparatus of claim 22, 24, or 14 further comprising two or more secondary switches in the output circuitry; and wherein the current in the transformer is sensed by sensing a voltage drop across at least one of the two or more secondary switches.

113. The apparatus of claim 12 wherein the switch controller is adapted to turn the primary switches OFF essentially at times when the voltage drop returns below a predetermined value.

114. The apparatus of claim 22, 24, or 14 wherein the current in the transformer is sensed by sensing current in a secondary winding of the transformer.

115. The apparatus of claim 114, wherein the switch controller is adapted to turn the primary switches OFF essentially at times when the current in the secondary winding returns to zero.

116. The apparatus of claim 22, 24, or 14 wherein the current in the transformer is sensed by sensing current in a primary winding of the transformer.

117. The apparatus of claim 116 wherein the resonant circuit further comprises a resonant capacitor and the current in the transformer is sensed by sensing current in the resonant capacitor.

118. The apparatus of claim 22 or 24 wherein the switch controller is adapted to turn the primary switches ON and OFF essentially at times when the resonant current is zero.

119. The apparatus of claim 22 or 24 wherein each power transfer interval is essentially equal to one half of the characteristic resonant period and the controller turns the switches ON and OFF at times essentially when the resonant current is zero.

120. Apparatus for converting power comprising a plurality of apparatus as defined in claim 119 connected in parallel in a power sharing array, wherein an open-loop output resistance of each apparatus determines its respective share of the power delivered to the load.

121. The apparatus of claim 119 wherein the output voltage is regulated by feedback to the input source.

122. The apparatus of claim 22 or 24 wherein the resonant circuit comprises a Q less than or equal to 3.

* * * * *

UNITED STATES PATENT AND TRADEMARK OFFICE
CERTIFICATE OF CORRECTION

PATENT NO. : 6,930,893 B2 Page 1 of 1
APPLICATION NO. : 10/264327
DATED : August 16, 2005
INVENTOR(S) : Patrizio Vinciarelli It is certified that error appears in the above-identified patent and that said Letters Patent is hereby corrected as shown below:

In column 30, line 41, please delete "SB" and insert --5B-- therefor.

In column 35, line 46, please delete "1,2" and insert --$I_{s2}$-- therefor.

In column 75, line 29, please delete "Teh" and insert --The-- therefor.

Signed and Sealed this

Eighth Day of July, 2008

JON W. DUDAS
*Director of the United States Patent and Trademark Office*